(12) United States Patent
Marty et al.

(10) Patent No.: US 9,632,514 B2
(45) Date of Patent: Apr. 25, 2017

(54) ELECTRONIC SHOWER SYSTEM

(75) Inventors: Garry R. Marty, Fishers, IN (US); Todd Huffington, Avon, IN (US); Kyle R. Davidson, Noblesville, IN (US); Brian W. Johnson, Muncie, IN (US); Larry D. O'Cull, Westfield, IN (US); Patrick B. Jonte, Zionsville, IN (US)

(73) Assignee: Delta Faucet Company, Indianapolis, IN (US)

( * ) Notice: Subject to any disclaimer, the term of this patent is extended or adjusted under 35 U.S.C. 154(b) by 890 days.

(21) Appl. No.: 13/698,944

(22) PCT Filed: May 23, 2011

(86) PCT No.: PCT/US2011/037614
§ 371 (c)(1),
(2), (4) Date: Nov. 19, 2012

(87) PCT Pub. No.: WO2011/146941
PCT Pub. Date: Nov. 24, 2011

(65) Prior Publication Data
US 2013/0062422 A1 Mar. 14, 2013

Related U.S. Application Data

(60) Provisional application No. 61/487,271, filed on May 17, 2011, provisional application No. 61/347,377, filed on May 21, 2010.

(51) Int. Cl.
*G05D 23/13* (2006.01)
*G05D 11/13* (2006.01)
*E03C 1/05* (2006.01)

(52) U.S. Cl.
CPC .............. *G05D 11/13* (2013.01); *E03C 1/057* (2013.01); *G05D 11/132* (2013.01); *G05D 23/13* (2013.01); *G05D 23/1306* (2013.01)

(58) Field of Classification Search
CPC ...... G05D 11/13; G05D 11/132; G05D 11/16; G05D 23/13; G05D 23/1306
(Continued)

(56) References Cited

U.S. PATENT DOCUMENTS 4,243,063 A * 1/1981 Parkison ................. 137/100
4,696,428 A   9/1987 Shakalis
(Continued)

FOREIGN PATENT DOCUMENTS

CN  2126355 U  12/1992
EP  0626164    11/1994
(Continued)

OTHER PUBLICATIONS

PCT International Search Report and Written Opinion, International Application No. PCT/US2011/037614, dated Dec. 7, 2011, 10 pgs.

*Primary Examiner* — Marc Norman
*Assistant Examiner* — Daniel C Comings
(74) *Attorney, Agent, or Firm* — Faegre Baker Daniels LLP

(57) ABSTRACT

An electronic shower system including a mixing valve operably coupled to a mixing valve drive, and a diverter valve operably coupled to a diverter valve drive and in fluid communication with the mixing valve. A controller is in communication with the mixing valve drive and the diverter valve drive. A user interface includes a removable module in communication with the controller.

34 Claims, 68 Drawing Sheets

(58) Field of Classification Search
USPC .................. 236/12.1, 12.12, 12.14, 12.17
See application file for complete search history.

(56) References Cited

U.S. PATENT DOCUMENTS

| | | | |
|---|---|---|---|
| 4,711,392 | A | 12/1987 | Kidouchi et al. |
| 4,842,191 | A * | 6/1989 | Bergmann ................. 236/12.12 |
| 4,844,333 | A | 7/1989 | Davis et al. |
| 4,854,498 | A | 8/1989 | Stayton |
| 4,867,375 | A | 9/1989 | Ueki et al. |
| 4,945,943 | A | 8/1990 | Cogger |
| 4,974,636 | A | 12/1990 | Cogger |
| 5,092,560 | A | 3/1992 | Chen |
| D344,901 | S | 3/1994 | Conforti |
| 5,294,045 | A | 3/1994 | Harris |
| 5,329,650 | A | 7/1994 | Zaccai et al. |
| 5,358,177 | A | 10/1994 | Cashmore |
| 5,414,879 | A | 5/1995 | Hiraishi et al. |
| 5,725,010 | A | 3/1998 | Marty et al. |
| 5,938,551 | A * | 8/1999 | Warner ........................ 474/111 |
| 5,944,255 | A | 8/1999 | Shirmohamadi |
| 5,979,776 | A | 11/1999 | Williams |
| 6,029,094 | A | 2/2000 | Diffut |
| 6,059,192 | A | 5/2000 | Zosimadis |
| 6,250,558 | B1 | 6/2001 | Dogre Cuevas |
| 6,315,208 | B1 | 11/2001 | Doyle |
| 6,317,717 | B1 | 11/2001 | Lindsey et al. |
| 6,322,005 | B1 | 11/2001 | Kern et al. |
| D457,442 | S | 5/2002 | Schuler |
| 6,446,875 | B1 | 9/2002 | Brooks et al. |
| D469,743 | S | 2/2003 | Bergmann |
| 6,575,377 | B1 * | 6/2003 | Graves .......................... 236/12.2 |
| 6,604,687 | B2 | 8/2003 | Goncze et al. |
| 6,676,024 | B1 | 1/2004 | McNerney et al. |
| 6,691,338 | B2 | 2/2004 | Zieger |
| 6,705,534 | B1 | 3/2004 | Mueller |
| 6,724,873 | B2 | 4/2004 | Senna Da Silva |
| 6,880,565 | B2 | 4/2005 | Ouyoung |
| 6,892,952 | B2 | 5/2005 | Chang et al. |
| 6,913,203 | B2 | 7/2005 | DeLangis |
| 6,925,661 | B1 | 8/2005 | Anger |
| 7,100,630 | B2 | 9/2006 | Vu et al. |
| 7,124,452 | B1 | 10/2006 | Bauza |
| 7,168,628 | B2 | 1/2007 | Sheeran et al. |
| 7,198,059 | B2 | 4/2007 | Kempf et al. |
| 7,308,724 | B2 | 12/2007 | Ho |
| 7,325,747 | B2 | 2/2008 | Jonte |
| 7,458,520 | B2 | 12/2008 | Belz et al. |
| D591,182 | S | 4/2009 | Schoenherr et al. |
| 7,520,445 | B2 | 4/2009 | Feinleib et al. |
| 7,669,776 | B2 | 3/2010 | Beck et al. |
| 7,857,234 | B2 | 12/2010 | Daley et al. |
| 2001/0044954 | A1 | 11/2001 | DiCarlo |
| 2002/0007510 | A1 | 1/2002 | Mann |
| 2002/0153425 | A1 * | 10/2002 | Mountford et al. ........ 236/12.12 |
| 2003/0080194 | A1 | 5/2003 | O'Hara |
| 2004/0041033 | A1 | 3/2004 | Kemp |
| 2004/0060107 | A1 | 4/2004 | Eisenberg |
| 2004/0193326 | A1 | 9/2004 | Phillips et al. |
| 2005/0072850 | A1 | 4/2005 | Cornwall et al. |
| 2005/0121529 | A1 | 6/2005 | Delangis |
| 2006/0138246 | A1 | 6/2006 | Stowe et al. |
| 2006/0186215 | A1 | 8/2006 | Logan |
| 2006/0214016 | A1 | 9/2006 | Erdely et al. |
| 2007/0001018 | A1 | 1/2007 | Schmitt et al. |
| 2007/0246550 | A1 | 10/2007 | Rodenbeck et al. |
| 2008/0000997 | A1 | 1/2008 | Smith |
| 2008/0006707 | A1 | 1/2008 | Nobili |
| 2008/0083893 | A1 | 4/2008 | Rubenstein |
| 2008/0156889 | A1 | 7/2008 | Shapira et al. |
| 2008/0164331 | A1 | 7/2008 | Schmitt |
| 2008/0251145 | A1 | 10/2008 | Brunkhardt |
| 2008/0271238 | A1 * | 11/2008 | Reeder et al. ..................... 4/597 |
| 2009/0106891 | A1 | 4/2009 | Klicpera |
| 2009/0108223 | A1 | 4/2009 | Deutsch et al. |
| 2009/0148268 | A1 | 6/2009 | Nobili |
| 2009/0211644 | A1 | 8/2009 | Wylie et al. |
| 2009/0314358 | A1 | 12/2009 | Stimpson et al. |
| 2010/0127087 | A1 | 5/2010 | Lin |
| 2010/0276500 | A1 | 11/2010 | Rivlin |
| 2010/0288386 | A1 | 11/2010 | Westarp |
| 2011/0174888 | A1 * | 7/2011 | Lin .................... G05D 23/1353 236/12.1 |
| 2011/0186138 | A1 * | 8/2011 | Hanna et al. ..................... 137/1 |
| 2011/0203690 | A1 * | 8/2011 | Veros .................. F16K 11/0743 137/605 |

FOREIGN PATENT DOCUMENTS

| | | | |
|---|---|---|---|
| EP | 909998 | 4/1999 | |
| EP | 1094378 | 4/2001 | |
| EP | 1 657 367 | 5/2006 | |
| EP | 1757260 | 2/2007 | |
| EP | 1850202 | 10/2007 | |
| EP | 2004330 | 12/2008 | |
| EP | 2169510 | 3/2010 | |
| JP | 04126951 A * | 4/1992 | ............... F24H 1/10 |
| WO | WO 03/067133 | 8/2003 | |
| WO | WO 2005/054972 | 6/2005 | |
| WO | WO 2006/086863 | 8/2006 | |
| WO | WO 2007/082301 | 7/2007 | |
| WO | WO 2008/130349 | 10/2008 | |
| WO | WO 2011/146943 | 11/2011 | |

* cited by examiner

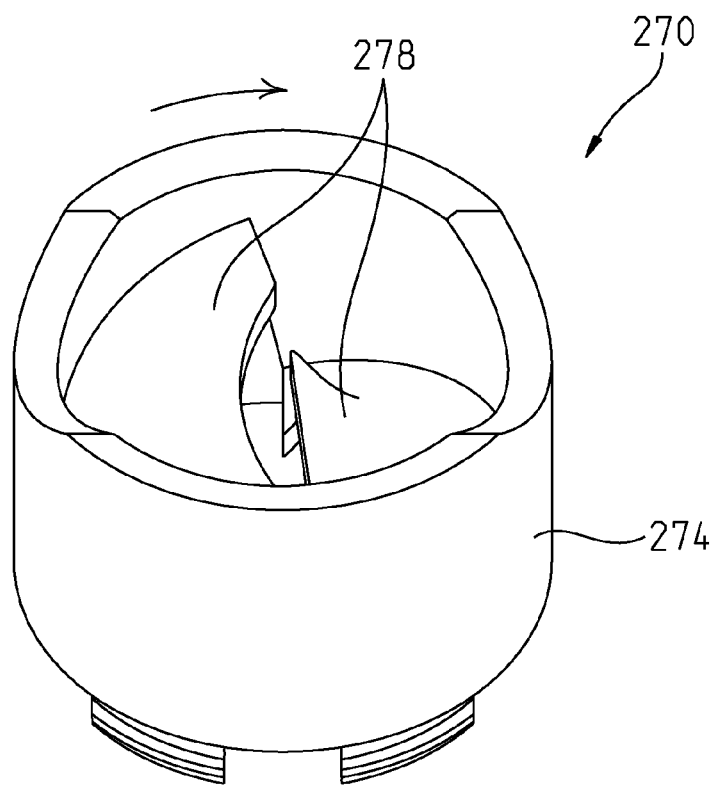
Fig. 13
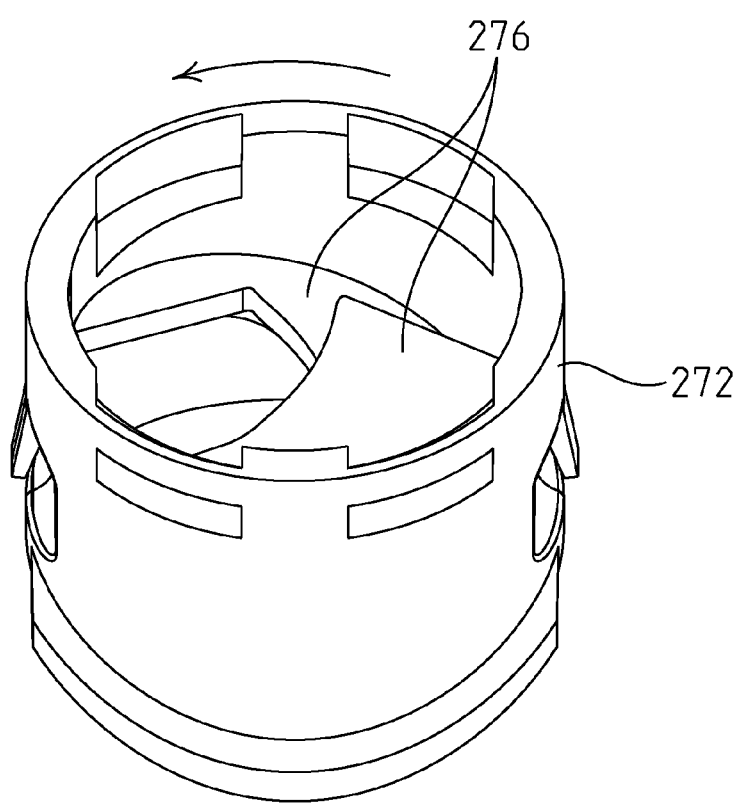

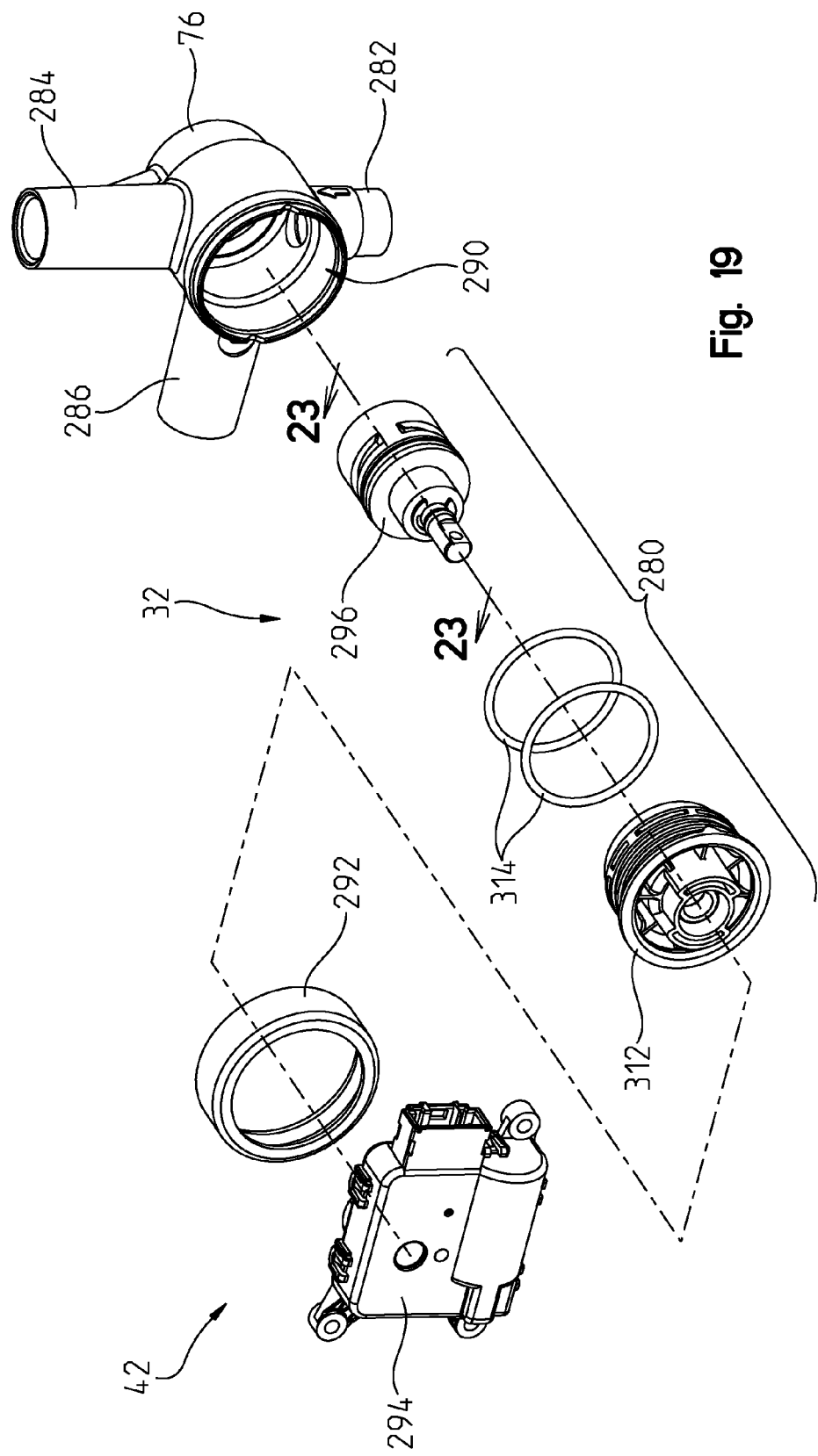

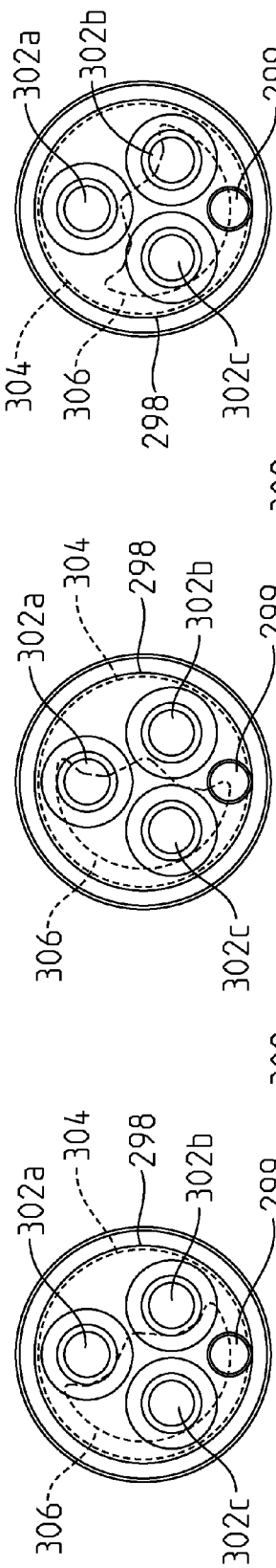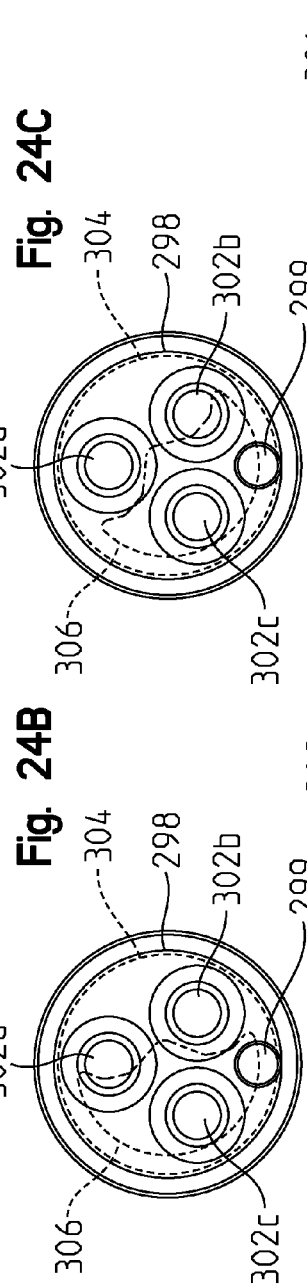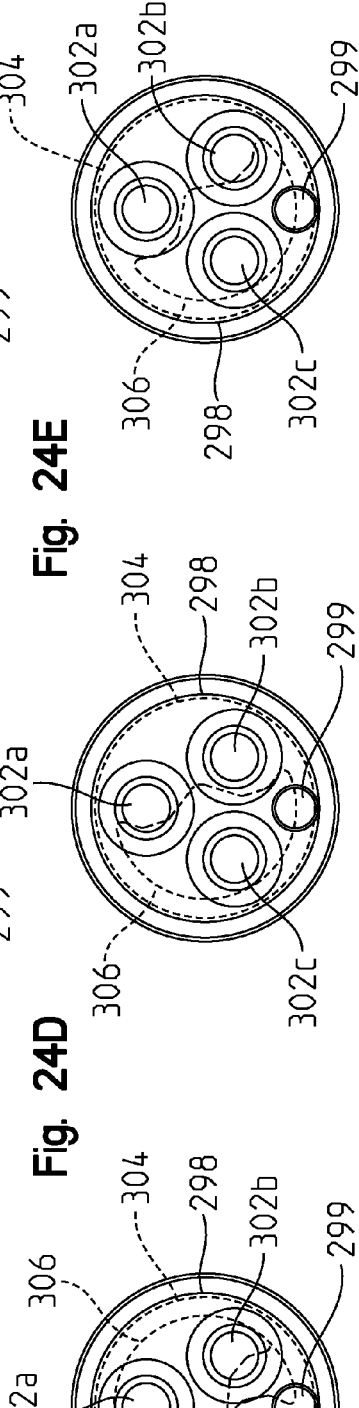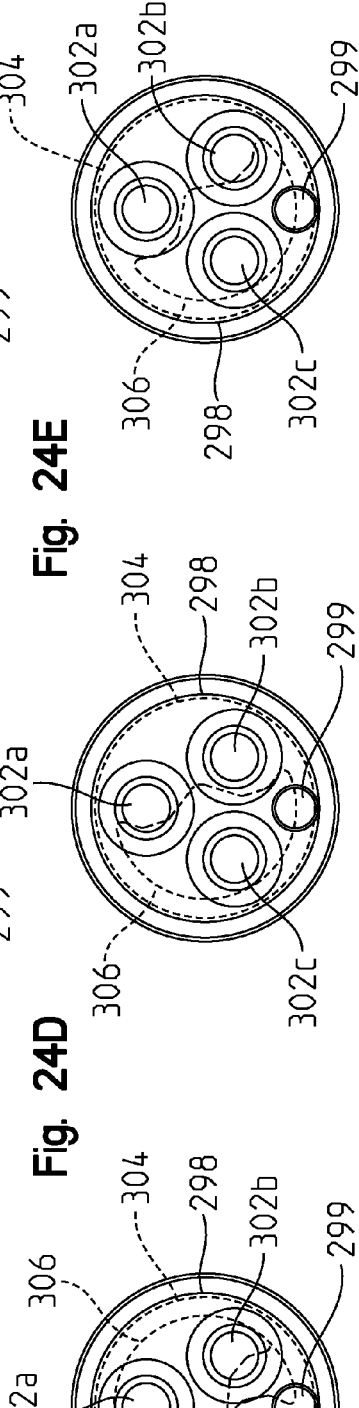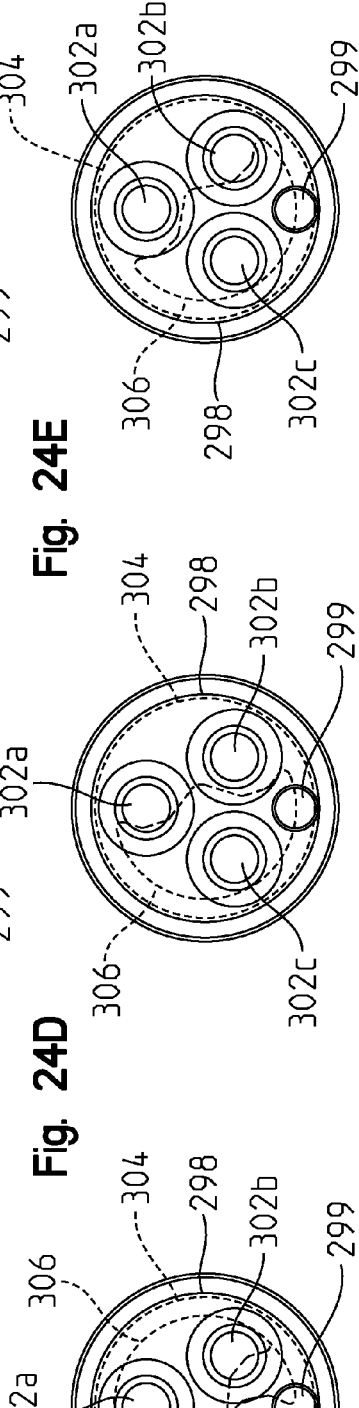

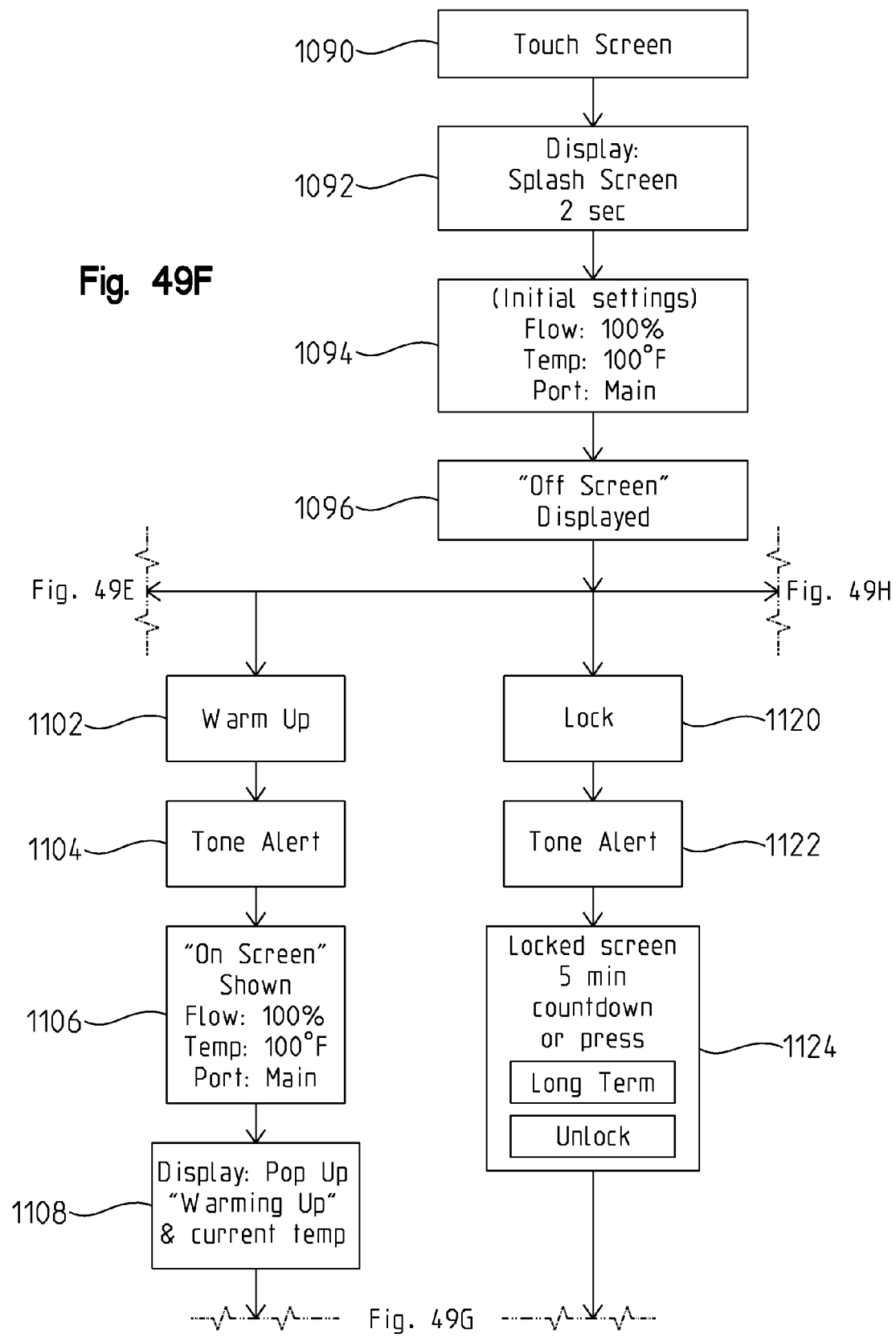

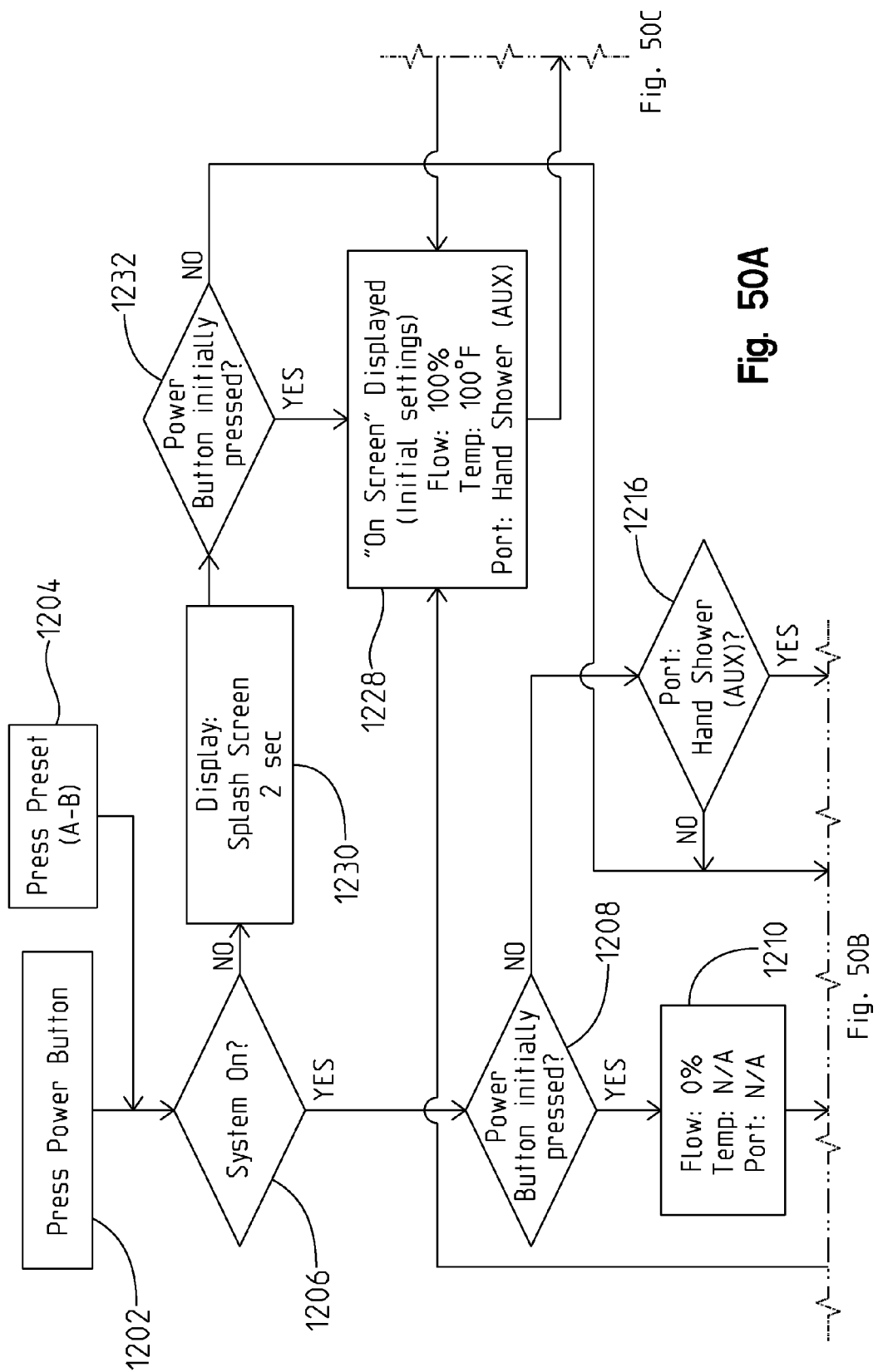

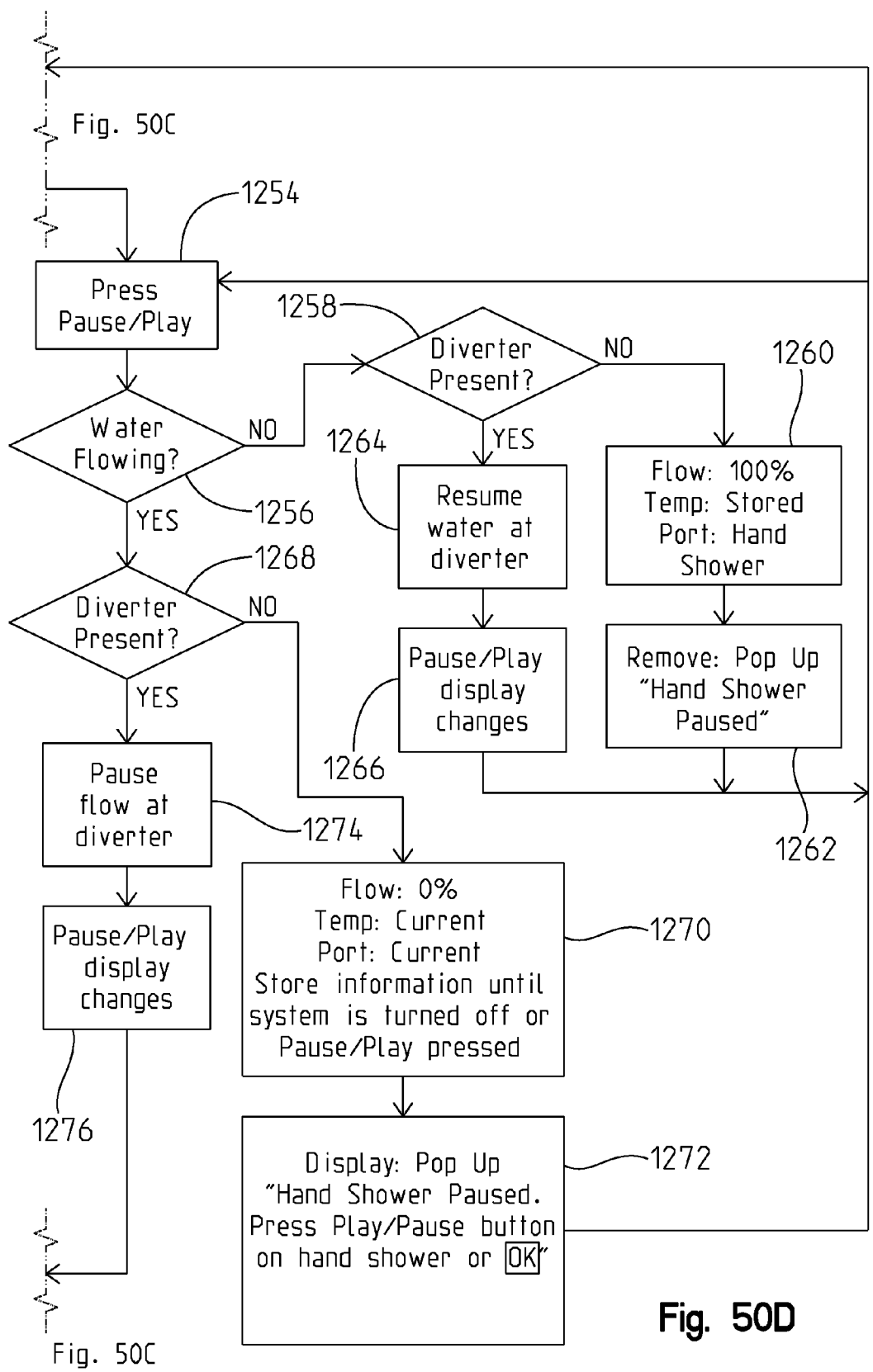

ELECTRONIC SHOWER SYSTEM

CROSS-REFERENCE TO RELATED APPLICATIONS

The present application is a 371 national phase filing of International Application No. PCT/US2011/037614, filed May 23, 2011, which claims the benefit of U.S. Provisional Patent Application Ser. No. 61/347,377, filed May 21, 2010, and U.S. Provisional Patent Application Ser. No. 61/487,271, filed May 17, 2011, the disclosures of which are expressly incorporated by reference herein.

BACKGROUND AND SUMMARY OF THE INVENTION

The present invention relates to an electronic shower system and, more particularly, to an electronic shower system including a user interface operably coupled to a controller for controlling the delivery of water to at least one water outlet.

According to an illustrative embodiment of the present disclosure, the electronic shower system includes a mixing valve operably coupled to a mixing valve drive, and a diverter valve operably coupled to a diverter valve drive and in fluid communication with the mixing valve. The mixing valve is configured to be in fluid communication with a hot water supply and a cold water supply, and is configured to control the proportion of hot water and cold water supplied to the diverter valve. A temperature sensor is configured to measure the temperature of water exiting from the mixing valve. The diverter valve is configured to control the supply of water to a plurality of fluid outlets and the flow rate of water supplied thereto. A controller is in communication with the mixing valve drive, the diverter valve drive, and the temperature sensor. A user interface is in communication with the controller.

According to an illustrative embodiment of the present disclosure, an electronic shower system includes a rough assembly having a housing, and a mixing valve body supported by the housing. The rough assembly is received within a cavity of a shower wall and is coupled behind an outer surface of the shower wall. A valve assembly includes a mixing valve received within the mixing valve body. A drive assembly includes a mixing valve drive operably coupled to the mixing valve. A main user interface includes a controller in electrical communication with the drive assembly and is coupled in front of the outer surface of the shower wall. The main user interface covers the cavity of the shower wall receiving the rough assembly.

According to another illustrative embodiment of the present disclosure, an electronic shower user interface includes a mount configured to be secured to a vertical wall, a user interface module having a touch sensor received within a sealed enclosure, a controller in communication with the user interface, and a coupler to releasably secure the user interface to the mount.

According to a further illustrative embodiment of the present disclosure, an electronic shower system includes a diverter valve, a diverter valve drive operably coupled to the diverter valve for controlling the delivery of water from the diverter valve to at least one of a plurality of outlets, and a controller operably coupled to the diverter valve drive. The diverter valve includes a rotatable valve plate configured to be moved between a plurality of rotational positions to direct flow from an inlet to at least one selected first and second fluid outlets and to control flow rate to the at least one selected first and second fluid outlet.

According to another further illustrative embodiment of the present disclosure, an electronic shower system includes a mixing valve fluidly coupled to a hot water supply and a cold water supply, and a mixing valve drive operably coupled to the mixing valve for controlling the proportion of water from the hot water supply and the cold water supply provided to an outlet. A diverter valve is fluidly coupled to the mixing valve, and a diverter valve drive is operably coupled to the diverter valve for controlling the delivery of water from the mixing valve to at least one of a plurality of outlets. A controller is operably coupled to the mixing valve drive and the diverter valve drive.

According to another illustrative embodiment of the present disclosure, an electronic shower system includes a mixing valve fluidly coupled to a hot water supply and a cold water supply, and a mixing valve drive operably coupled to the mixing valve for controlling the proportion of water from the hot water supply and the cold water supply provided to an outlet. A controller is in electrical communication with the mixing valve drive. A position sensor is operably coupled to the mixing valve drive for detecting a position of the mixing valve, the position sensor being in electrical communication with the controller. A temperature sensor is configured to measure the temperature of water supplied by the mixing valve, and is in electrical communication with the controller, wherein the controller associates the sensed position of the mixing valve from the position sensor with the measured temperature of water from the temperature sensor to predict valve position for a desired outlet water temperature.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which:

FIG. 13 is a partially exploded perspective view of the fluid mixer shown in FIG. 10;

FIG. 19 is a partially exploded perspective view of the diverter valve drive and diverter valve of the electronic shower system of FIG. 5;

FIGS. 24A-24H are views illustrating relative rotational orientations of the flow control plate of the diverter valve of FIG. 22 for different flow conditions;

FIGS. 49A-49J are flow charts showing an illustrative operation of the main user interface;

FIGS. 50A-50D are flow charts showing an illustrative operation of the hand shower user interface;

DETAILED DESCRIPTION OF THE DRAWINGS

The embodiments of the invention described herein are not intended to be exhaustive or to limit the invention to precise forms disclosed. Rather, the embodiments selected for description have been chosen to enable one skilled in the art to practice the invention.

Figure 1:
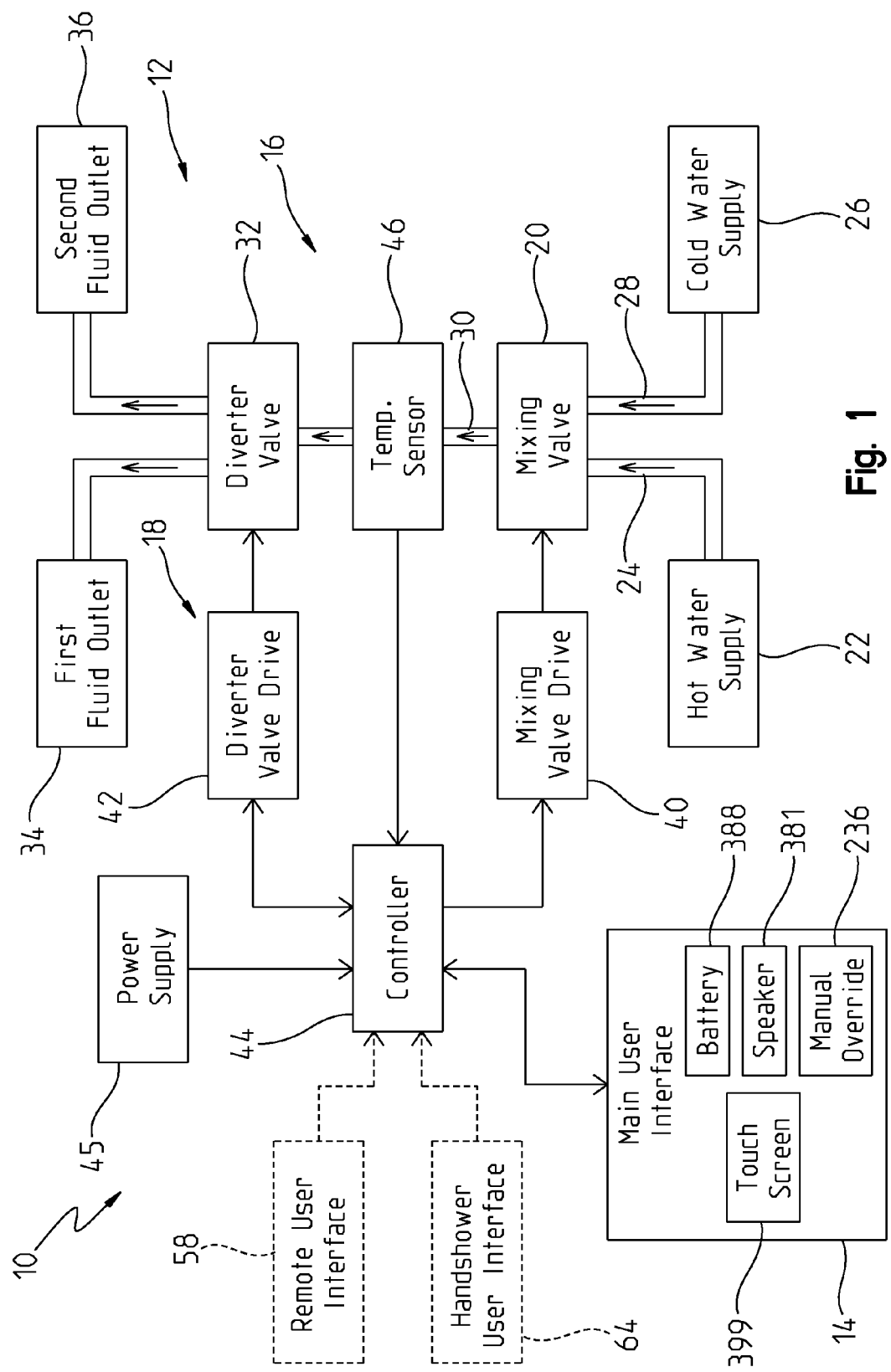
FIG. 1 is a schematic view of an illustrative electronic shower system of the present disclosure.

Referring initially to FIG. 1, an electronic shower system 10 is shown as including a flow control assembly 12 and a main user interface 14 operably coupled to the flow control assembly 12. The flow control assembly 12 illustratively includes a valve assembly 16 operably coupled to a drive assembly 18.

The valve assembly 16 illustratively includes a mixing valve 20 fluidly coupled to a hot water supply 22 through a hot water inlet conduit 24, and to a cold water supply 26 through a cold water inlet conduit 28. As is known and further detailed herein, the mixing valve 20 includes a rotatable valve member (e.g. a valve plate or disc) configured to control the flow of hot water and cold water (including the relative proportions therebetween) supplied to a mixed water outlet 30. A diverter valve 32 is fluidly coupled to the mixing valve 20 through the mixed water outlet 30. The diverter valve 32 is configured to control the flow of water from the mixed water outlet 30 to a first fluid outlet 34 and a second fluid outlet 36. More particularly, the diverter valve 32 directs water selectively to one or both of the outlets 34 and 36. The diverter valve 32 may also control the rate of water flow to the selected outlet(s) 34 and 36.

The drive assembly 18 illustratively includes a mixing valve drive 40 and a diverter valve drive 42. The mixing valve 20 is operably coupled to the mixing valve drive 40, and the diverter valve 32 is operably coupled to the diverter valve drive 42. A controller 44 is in communication with both the mixing valve drive 40 and the diverter valve drive 42. More particularly, the controller 44 communicates with the user interfaces (including main user interface 14) and controls operation of the mixing valve drive 40 and the diverter valve drive 42 and, hence, the mixing valve 20 and the diverter valve 32, respectively. Controller 44 illustratively includes a microprocessor and memory for processing and storing data. An external power supply 45 is coupled to the controller 44. As further detailed herein, the controller 44 is configured to detect when power is being provided to the system 10 by external power supply 45. A temperature sensor 46 is configured to measure the temperature of water within the mixed water outlet 30 after exiting from the mixing valve 20, and is in communication with the controller 44.

Figure 2:
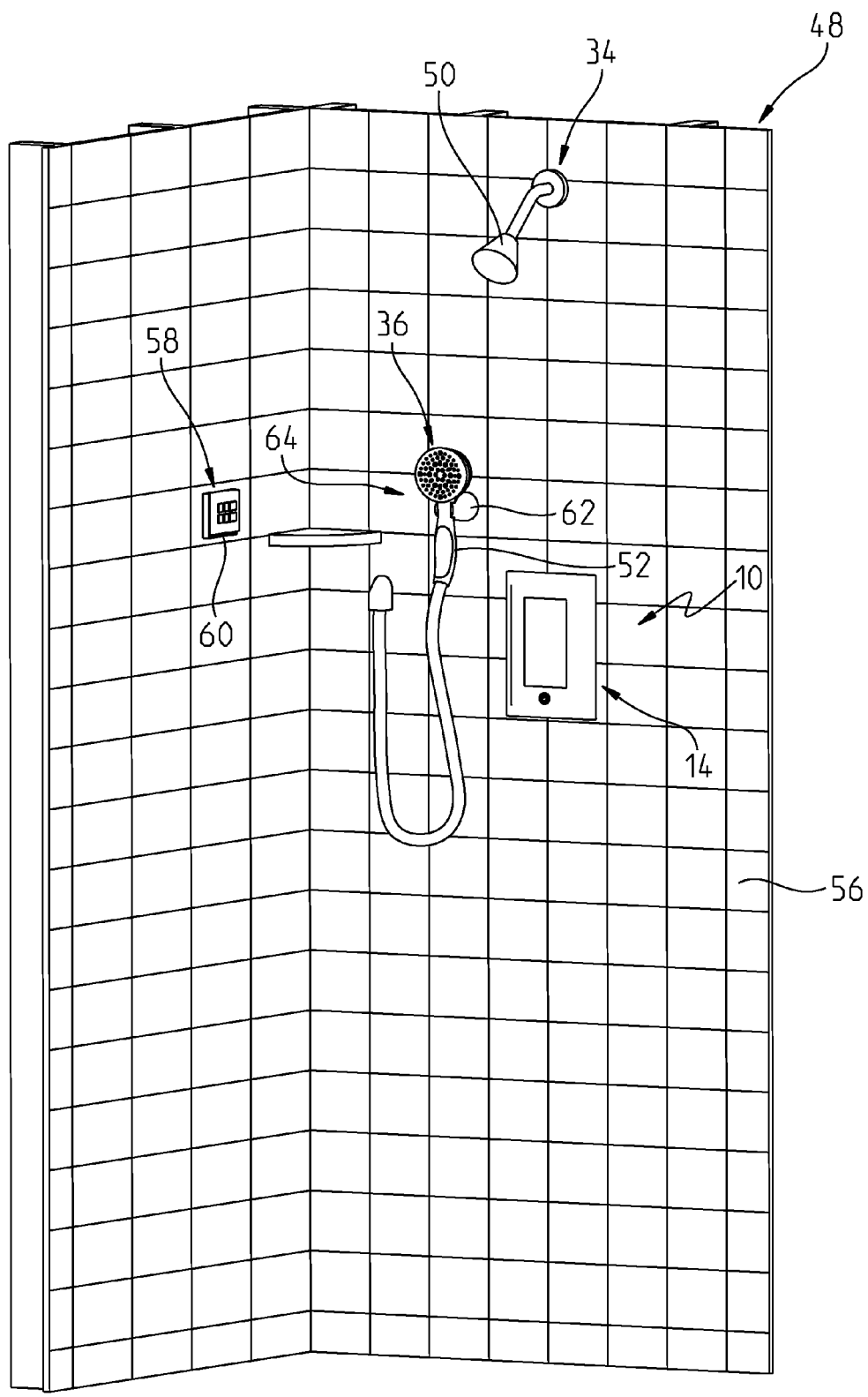
FIG. 2 is a perspective view of the electronic shower system of FIG. 1, shown installed in a shower enclosure.
Figure 3:
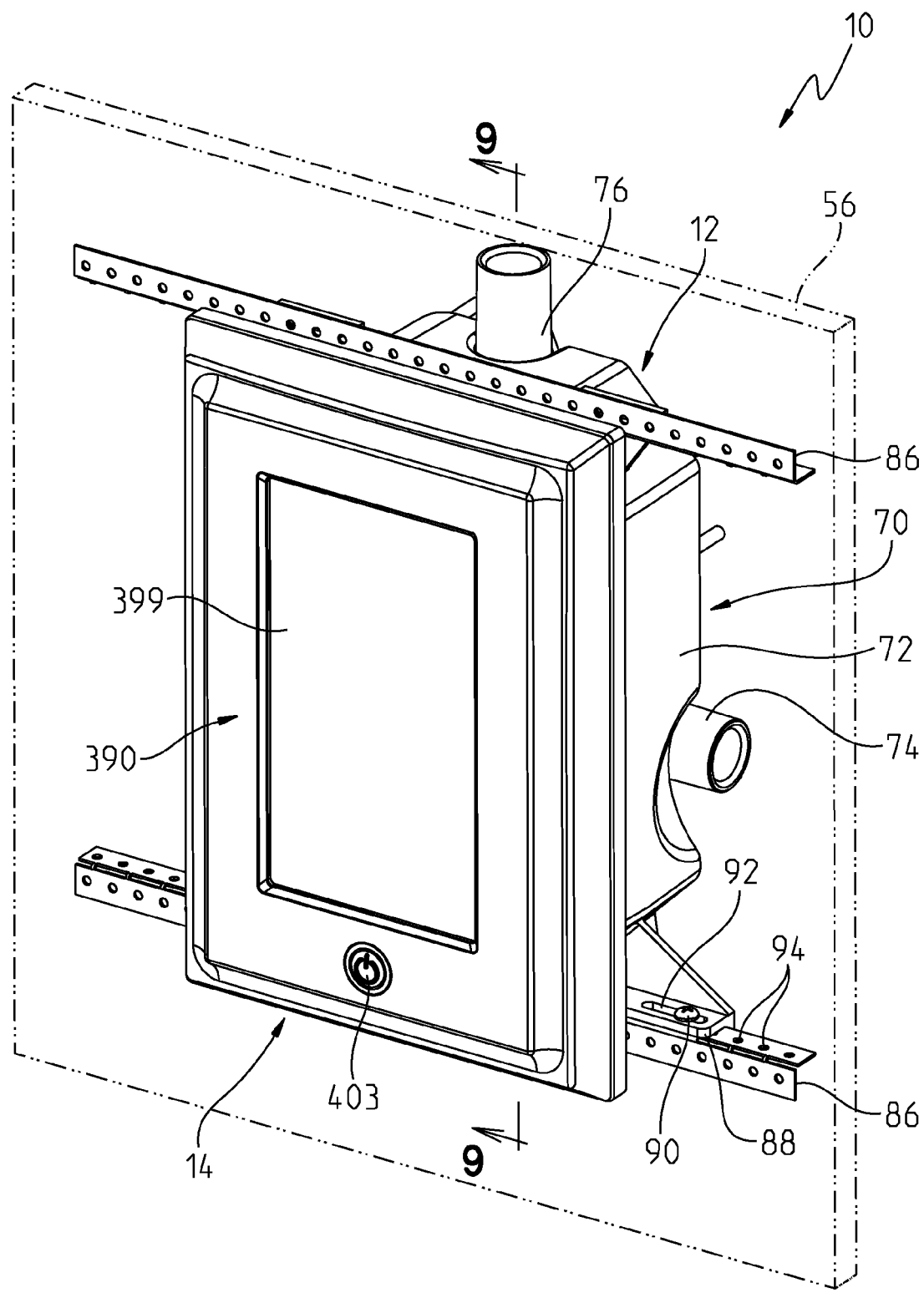
FIG. 3 is a front perspective view of the electronic shower system of FIG. 1, showing a shower wall in phantom.
Figure 4:
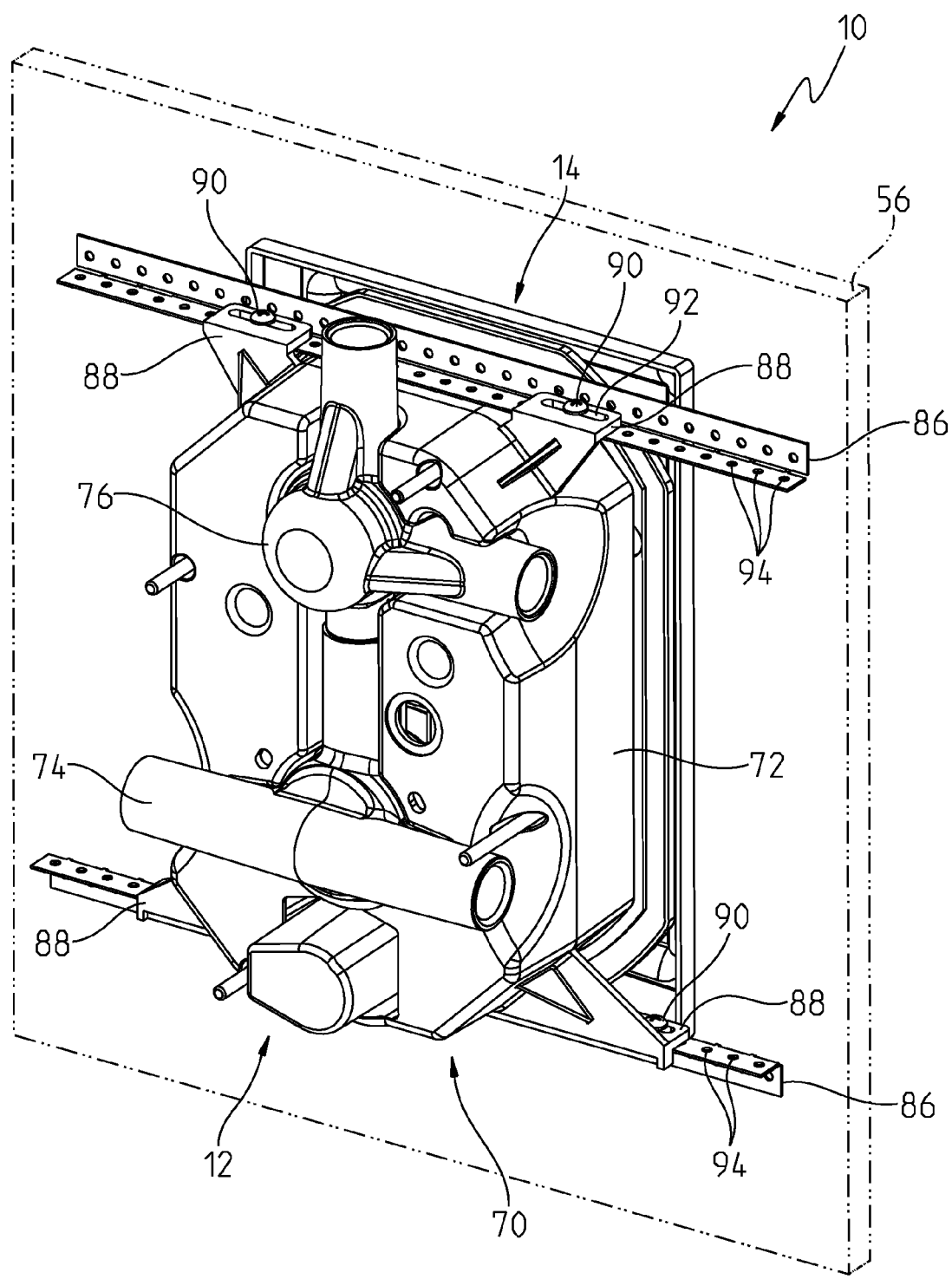
FIG. 4 is a rear perspective view of the electronic shower system of FIG. 1, showing the shower wall in phantom.

As shown in FIG. 2, the electronic shower system 10 may be received within a conventional shower enclosure 48, wherein the first fluid outlet 34 comprises an overhead showerhead 50 and the second fluid outlet 36 comprises a hand shower 52. The main user interface 14 may be coupled to a vertical shower wall 56 and is in communication with the controller 44. In certain illustrative embodiments, the controller 44 may be received within the main user interface 54. A remote user interface 58 may be in wireless communication with the controller 44 and removably coupled to a bracket 60 supported by the shower wall 56. The hand shower 52 may be removably coupled to a cradle 62 supported by the shower wall 56. In certain illustrative embodiments, the hand shower 52 may include a user interface 64 in wireless communication with the main controller 44.

Figure 5:
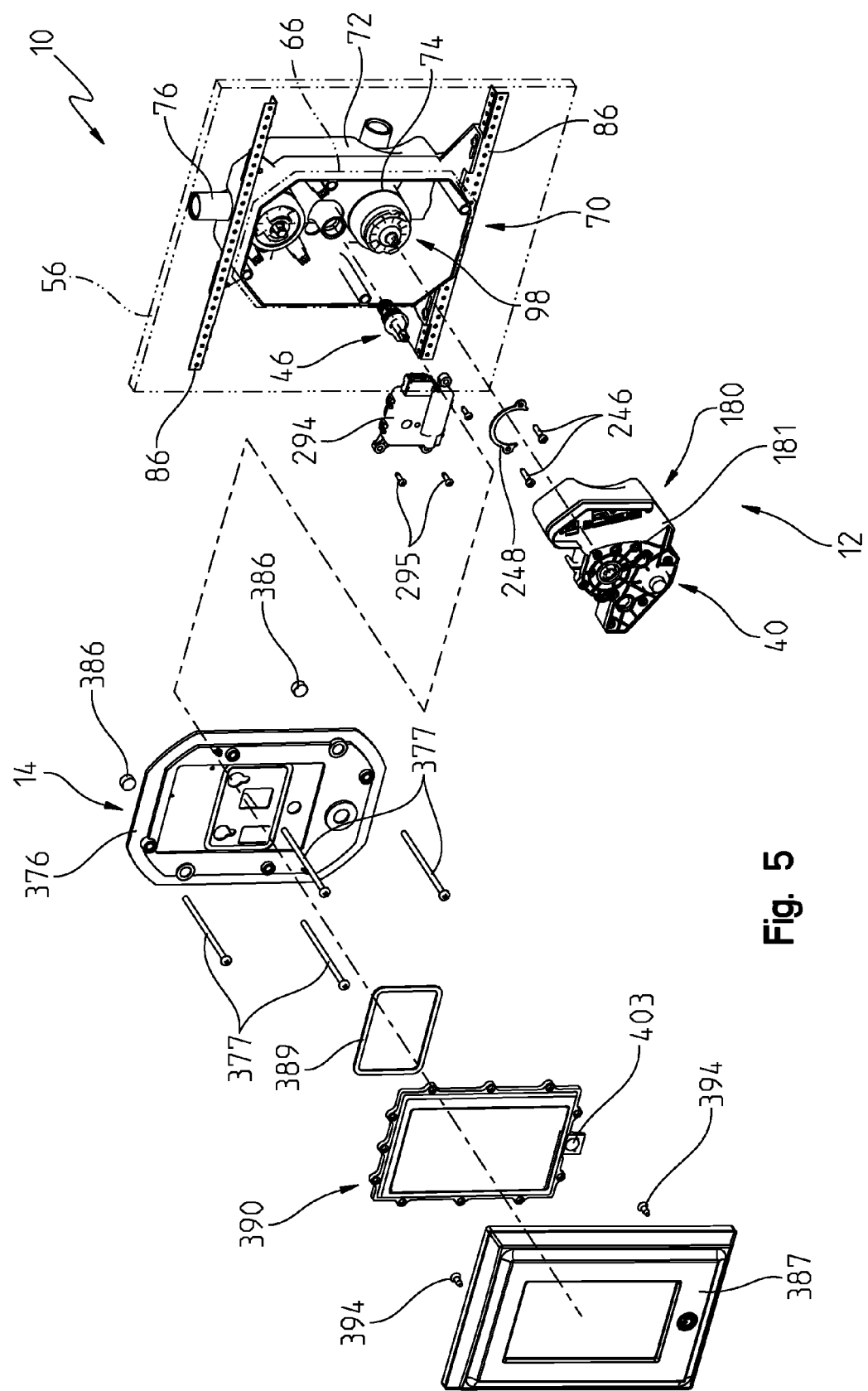
FIG. 5 is an exploded front perspective view of the electronic shower system of FIG. 3, showing the shower wall in phantom.
Figure 6:
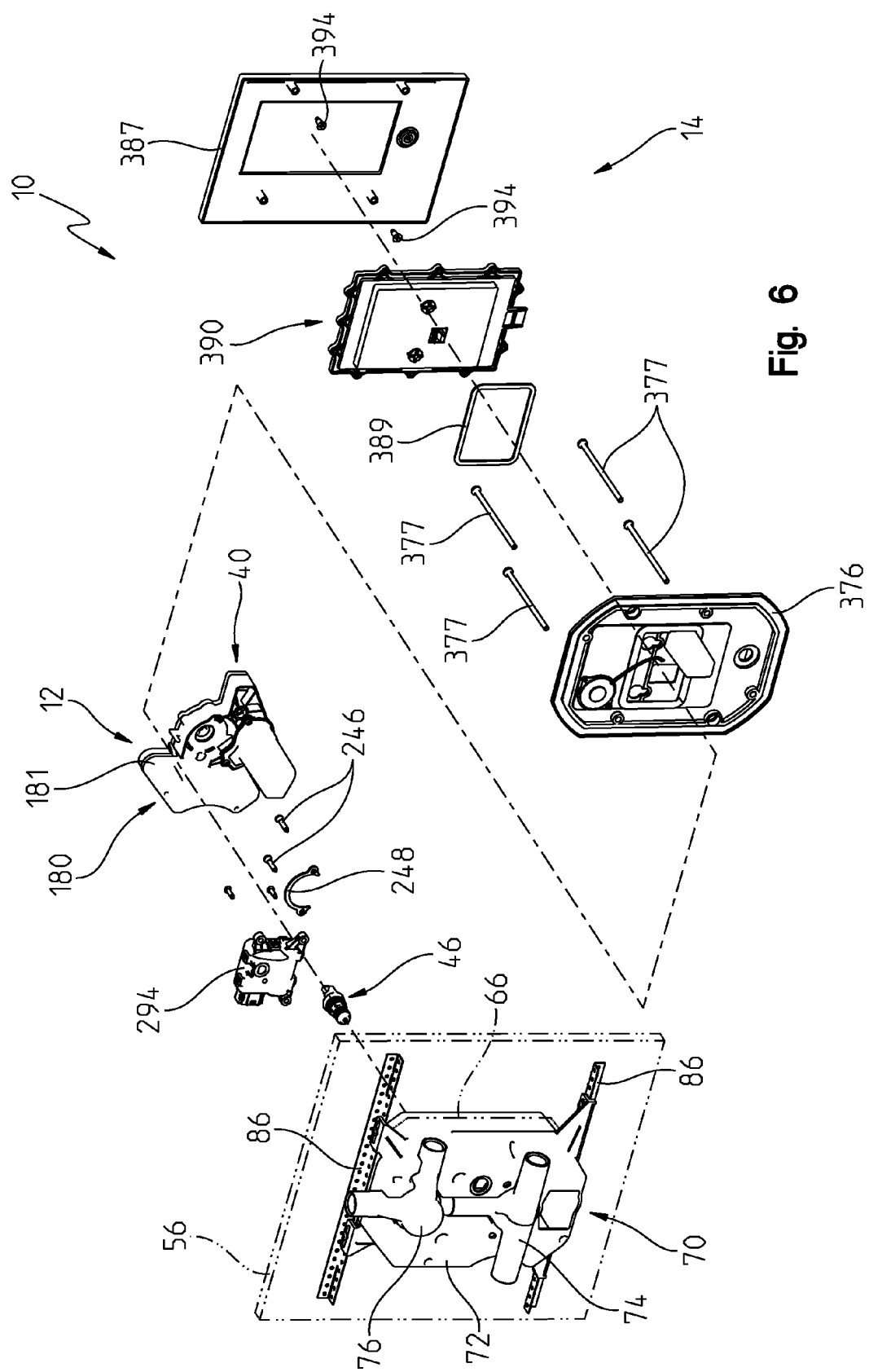
FIG. 6 is an exploded rear perspective view of the electronic shower system of FIG. 3, showing the shower wall in phantom.
Figure 8:
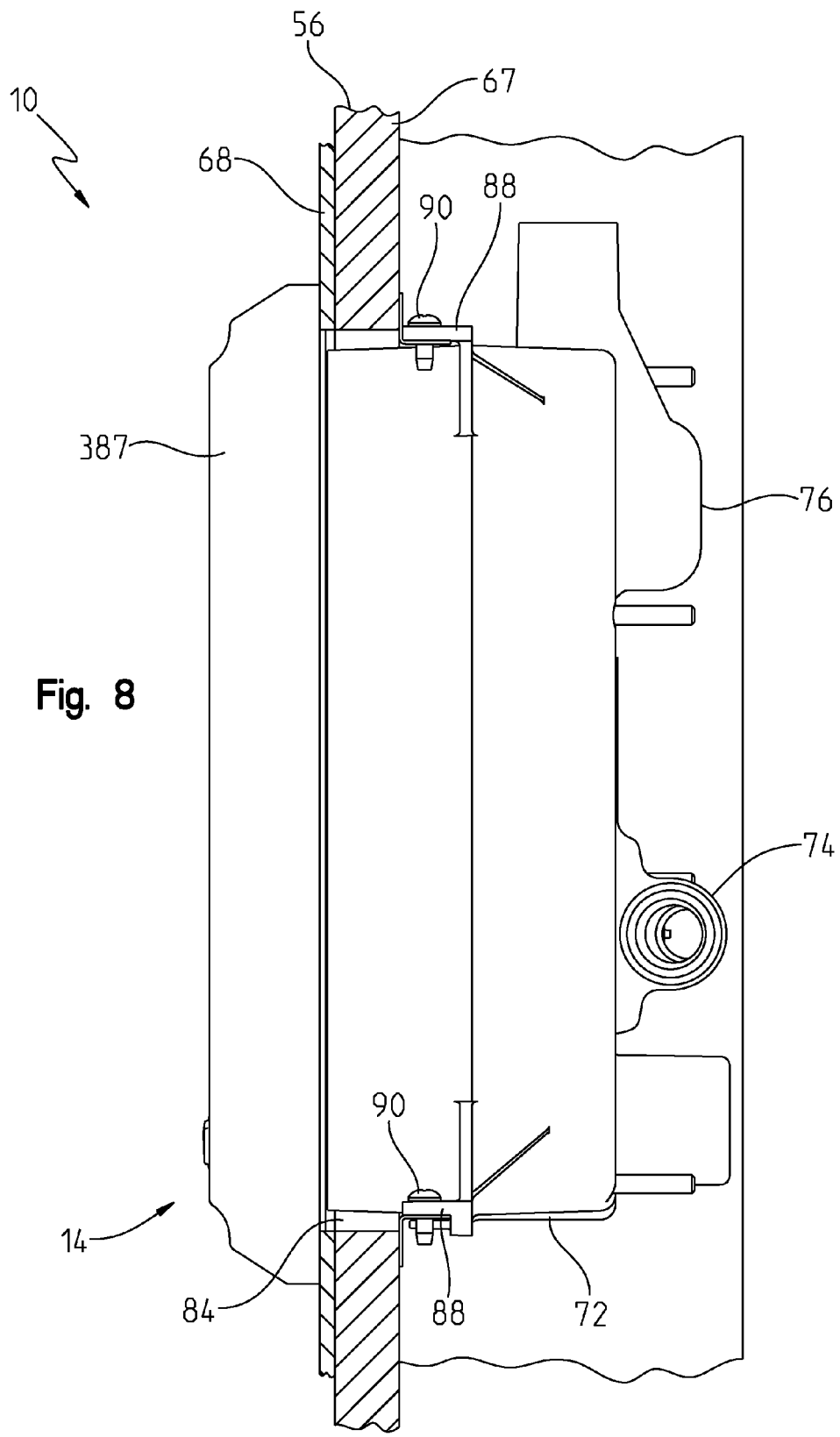
FIG. 8 is a side elevational view of the electronic shower system of FIG. 1, showing a shower wall in cross-section.
Figure 9:
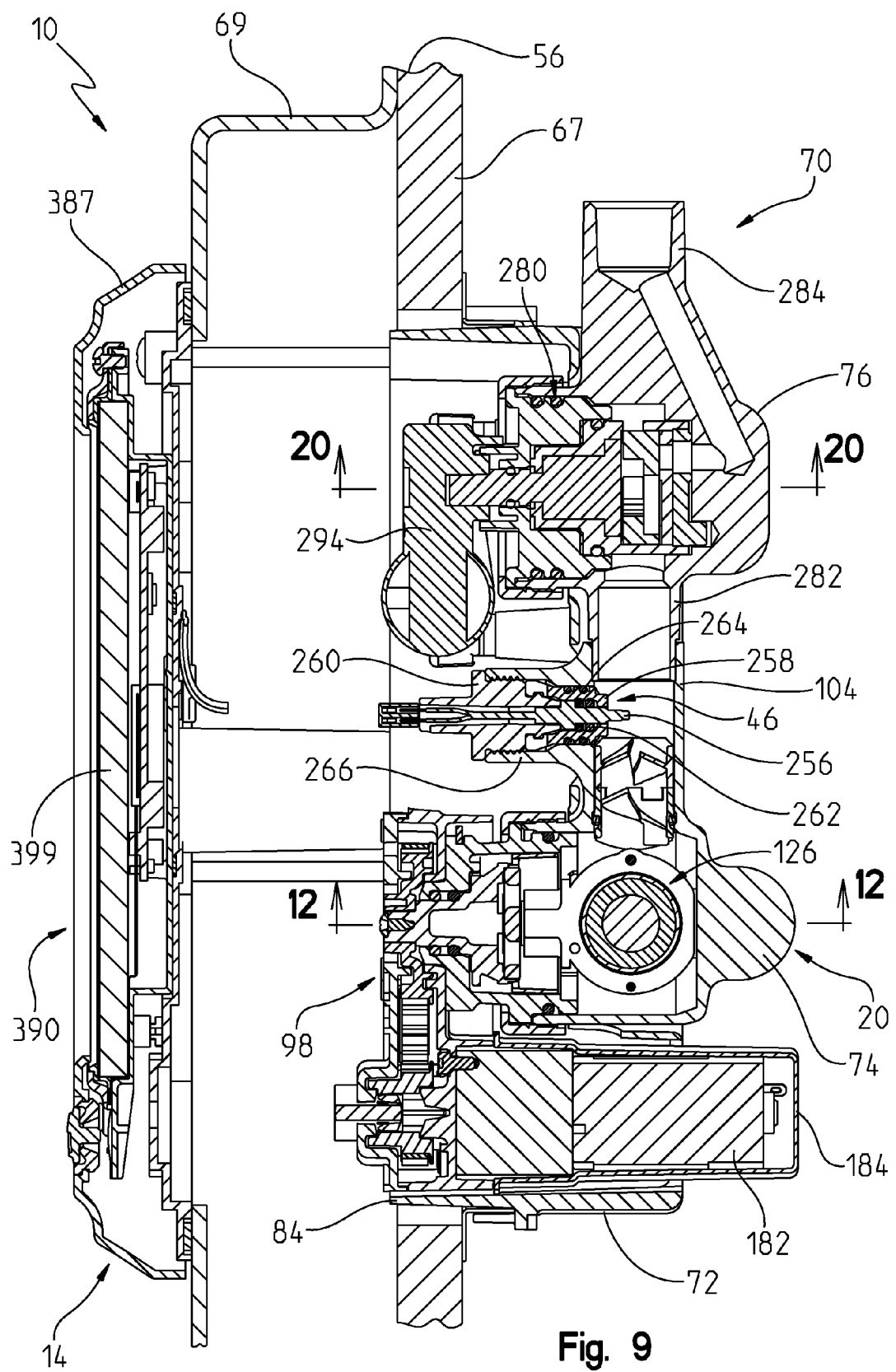
FIG. 9 is a cross-sectional view taken along line 9-9 of FIG. 2, showing a shower wall and liner.

With reference to the illustrative embodiment of FIGS. 3-6, the flow control assembly 12 and the main user interface 14 are shown in their relative positions with respect to the shower wall 56. More particularly, the flow control assembly is configured to be supported substantially behind the shower wall 56, while the main user interface 14 is configured to be supported substantially in front of the shower wall 56. The flow control assembly 12 is configured to be received substantially within a conventional shower valve footprint defined by an opening or wall cavity 66 behind the shower wall 56 and to be covered by the main user interface 14 (FIGS. 5 and 6). As further detailed herein, the main user interface 14 is illustratively releasably coupled to the shower wall 56 to provide access to the flow control assembly 12. In other words, the main user interface 14 is supported axially in front of the flow control assembly 12. As shown in FIG. 2, the main user interface 14 and the flow control assembly 12 may be positioned vertically below the overhead showerhead 50. The electronic shower system 10 detailed herein may be used in connection with a wide variety of shower walls 56 including, for example, relatively thin shower walls 56 (illustratively formed of wall board 67 covered by tile 68 as shown in FIG. 8) and relative thick shower walls 56' (illustratively formed of a surround liner 69 coupled to wall board 67 as shown in FIG. 9).

Figure 7:
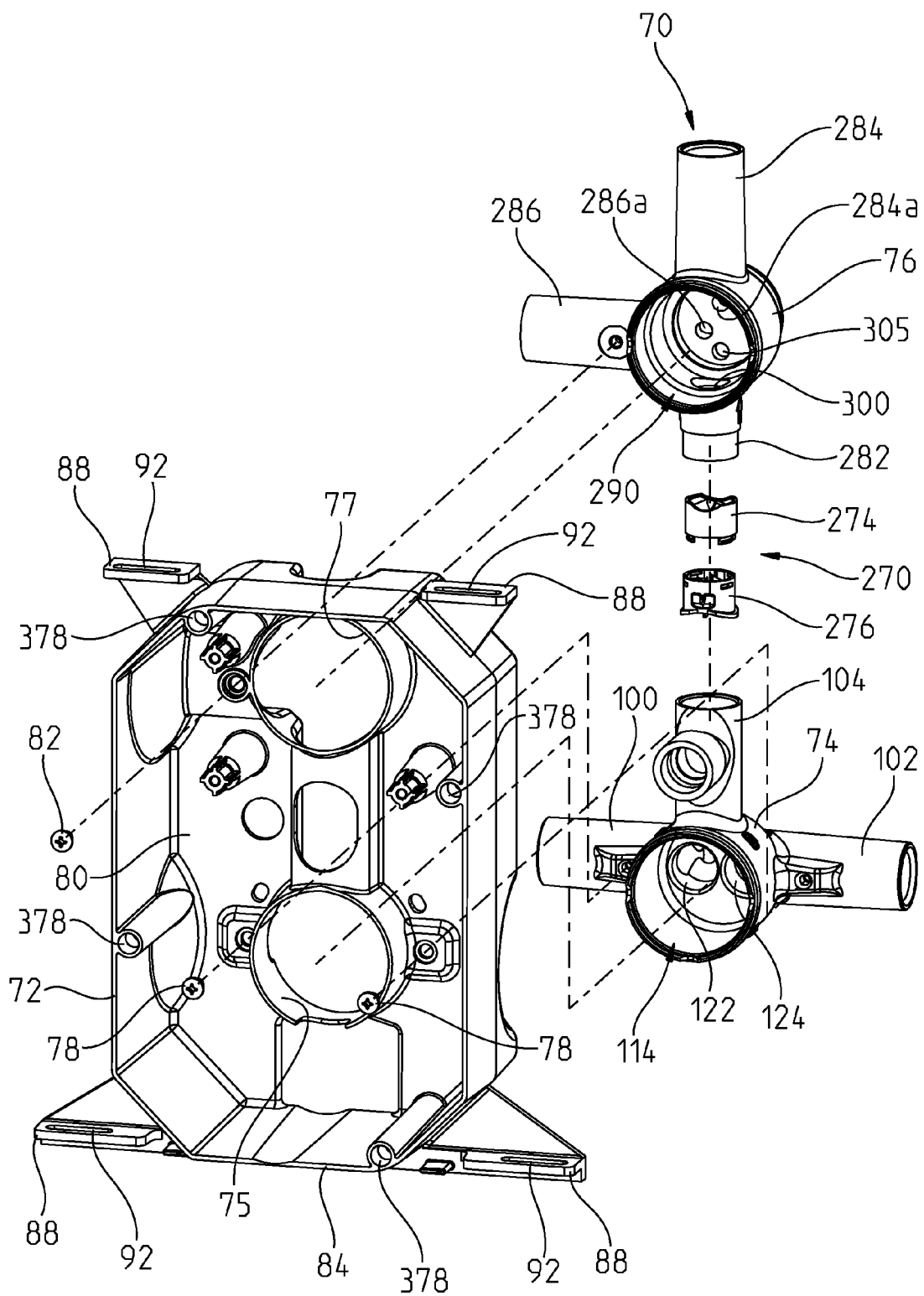
FIG. 7 is a partially exploded perspective view of the rough assembly of FIG. 5, showing the diverter valve body and the mixing valve body removed from the housing.

Referring to FIGS. 3, 4, 7, and 9, the mixing valve 20 and the mixing valve drive 40 are shown in their relative positions with respect to the shower wall 56, located vertically below the diverter valve 32 and the diverter valve drive 42. In the illustrative embodiment, the valve assembly 16 includes a rough assembly 70 having a housing 72 supporting a mixing valve body 74 and a diverter valve body 76. The housing 72 may be molded from a polymer, such as a thermoplastic, to conform to the shape of the valve bodies 74 and 76 (FIG. 7). Openings 75 and 77 within the housing 72 receive the valve bodies 74 and 76, respectively.

With further reference to FIG. 7, the mixing valve body 74 is illustratively mounted within housing 72 by screws 78 extending through a rear wall 80 of the housing 72. Similarly, diverter valve body 76 may be mounted within housing 72 by screw 82 extending through rear wall 80 of the housing 72. The housing 72 not only receives the mixing valve body 74 and the diverter valve body 76, but may also be configured to catch water drips or leaks that might occur within the valve assembly 16 or fluid outlets 34 and 36. The housing 72 illustratively includes a wall or lip 84 extending forwardly of the rear wall 80. The lip 84 may extend past the rear surface of the shower wall 56 (forwardly about ¼ inch to the front surface of the wall board 67 (FIGS. 8 and 9), thereby allowing water to run out in front of the wall 56 (in case of a leak) instead of behind it. The lip 84 may also act as a template for cutting wall board 67, surround liner 69 and/or tile 68.

With reference to FIGS. 3-6, the housing 72 is coupled to the wall 56 by L-shaped mounting brackets 86. The housing 72 includes upper and lower mounting tabs 88 proximate its covers and secured to the mounting brackets 86 by conventional fasteners, such as bolts 90. More particularly, the bolts 90 are received within slots 92 in the tabs 88 of the housing 72 and holes 94 in the brackets 86. The brackets 86 are then mounted to a rear surface of the wall 56 to position the rough assembly 70 properly in the wall cavity 66.

Figure 10:
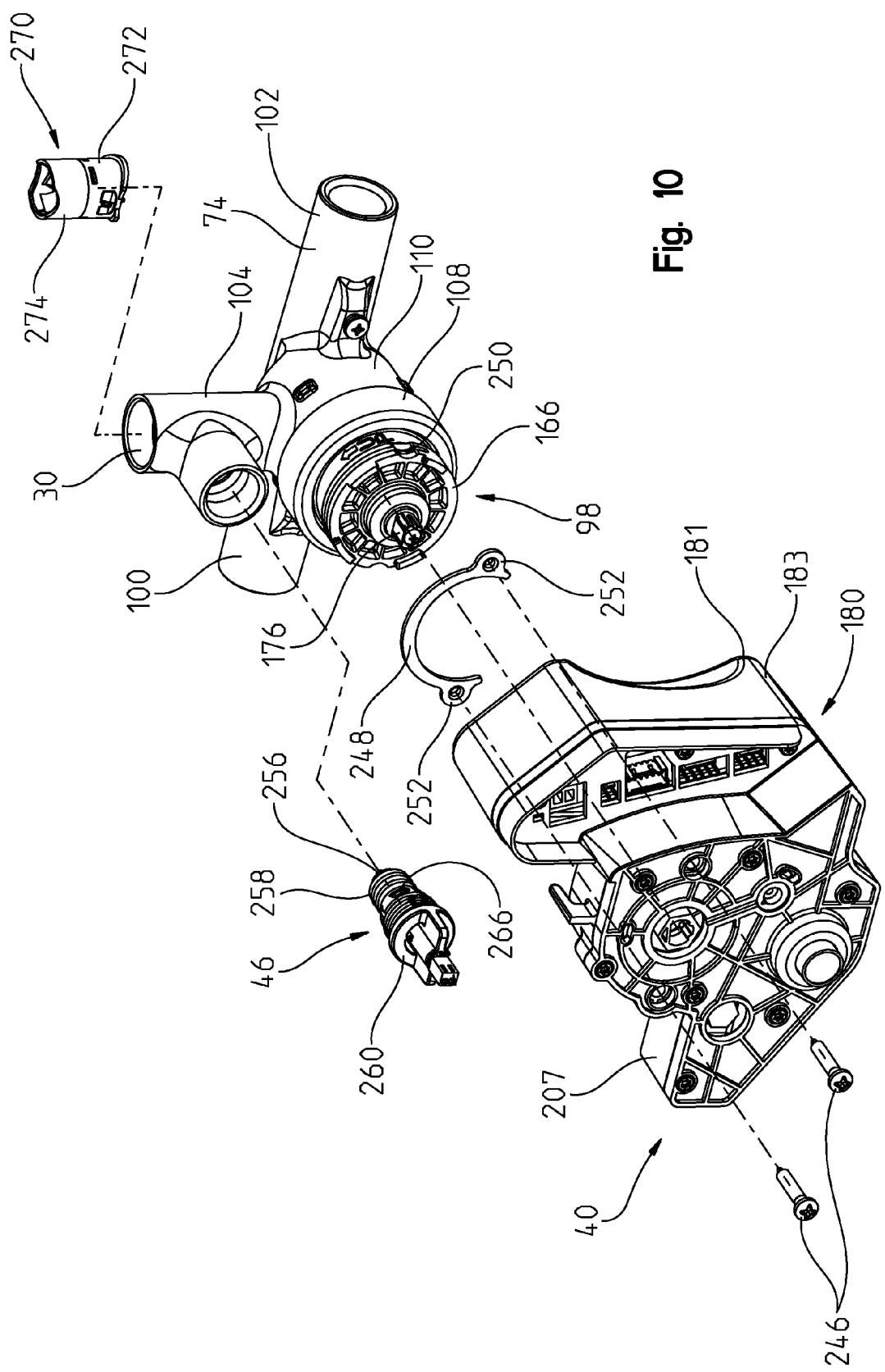
FIG. 10 is a partially exploded perspective view of the mixing valve drive and mixing valve of the electronic shower system of FIG. 5.
Figure 11:
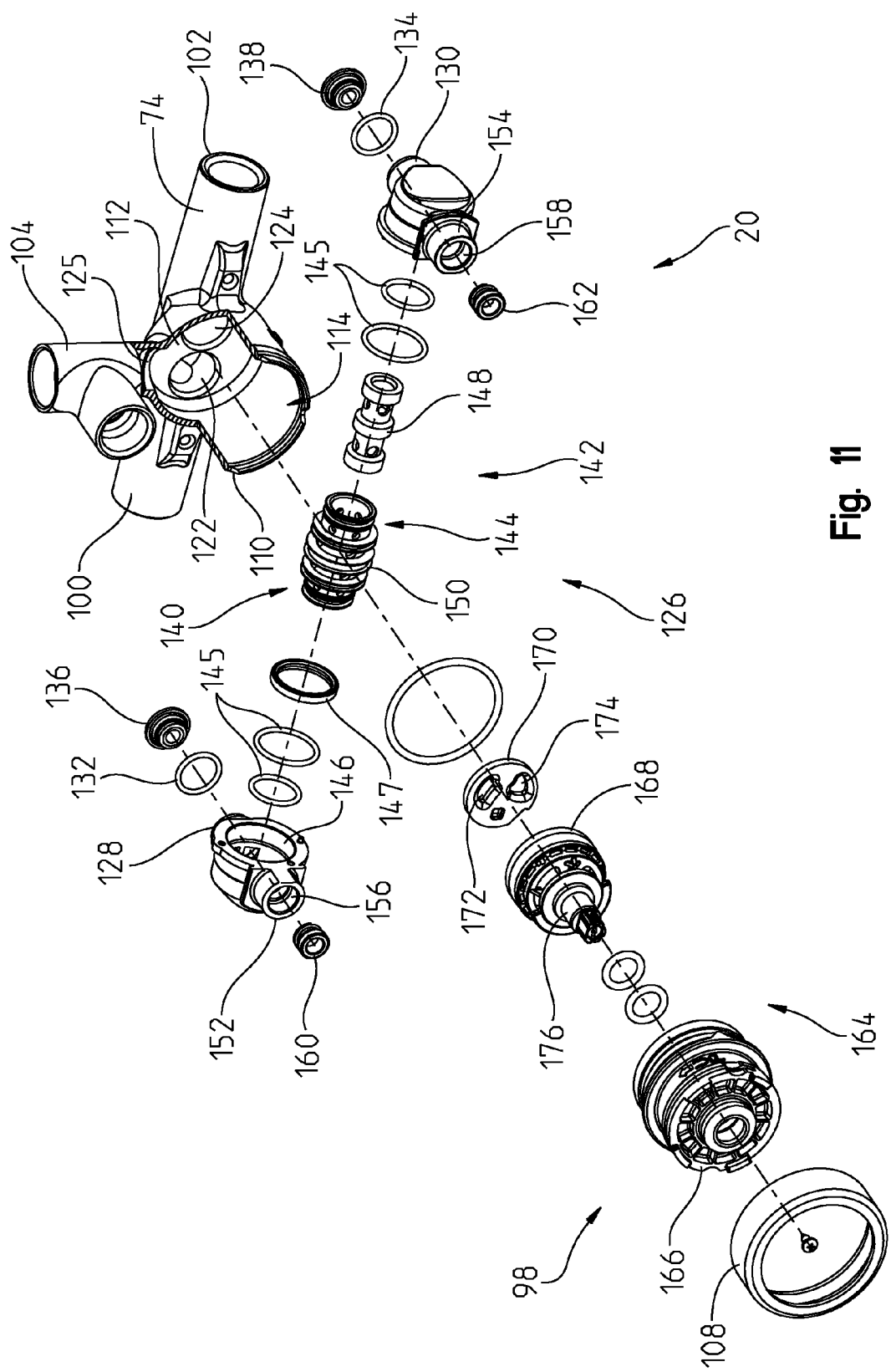
FIG. 11 is an exploded perspective view of the mixing valve of FIG. 10.

Referring to FIGS. 10 and 11, the mixing valve 20 includes a mixing valve cartridge 98 received within mixing valve body 74. Valve body 74 includes hot and cold water inlets 100 and 102 configured to be fluidly coupled to hot and cold water inlet conduits 24 and 28, and outlet 104 defining mixed water outlet conduit 30 and configured to be fluidly coupled in series with the diverter valve body 76. Valve body 74 is illustratively formed of brass and may be of conventional design.

The mixing valve cartridge 98 may be a pressure balance cycling valve of conventional design, including a valve member (e.g., valve disc or plate) rotatable by operation of a stem, and a pressure balance device (e.g., a spool), to accommodate pressure variations of water supplied to the inlets 100 and 102 and thereby maintain desired water temperature at the outlet 104. As the valve member of the valve cartridge 98 is rotated by the stem, the temperature of water delivered to the outlet 104 varies while the flow rate remains substantially constant (following initiation of flow as detailed herein). In the illustrative embodiment, rotation of the stem in a counter-clockwise direction from a closed position causes water flow activation and water temperature to increase from cold to hot. A bonnet nut 108 threadably engages the mixing valve body 74 to secure the mixing valve cartridge 98 therein.

Figure 12:
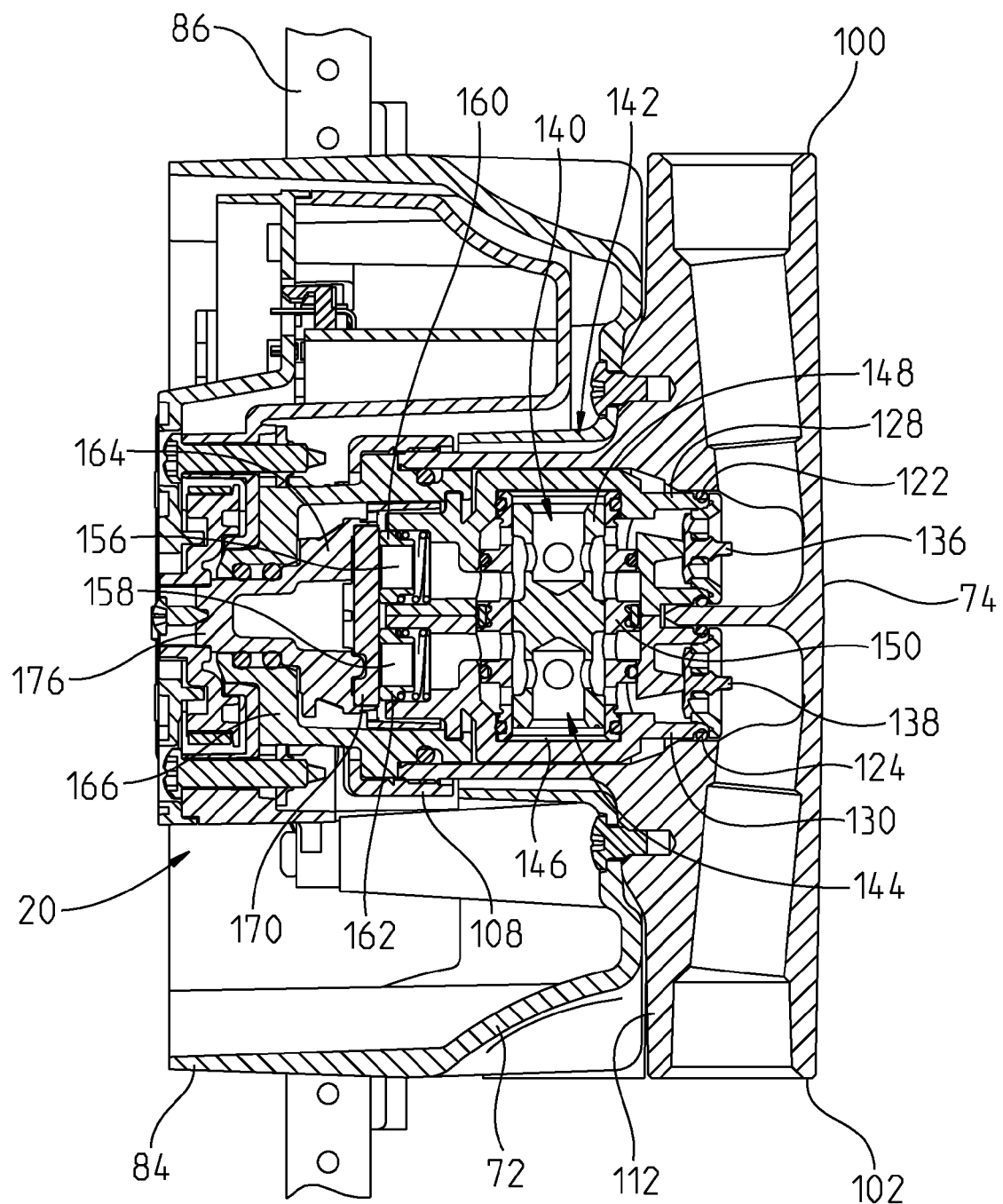
FIG. 12 is a cross-sectional view taken along line 12-12 of FIG. 9.

With reference to FIGS. 11 and 12, the valve body 74 includes a cylindrical sidewall 110 defining a central housing and extending axially along a longitudinal axis from a bottom or rear wall 112 and defining a chamber or cavity 114. Tubular hot water inlet 100 and tubular cold water inlet 102 are fluidly coupled to cavity 114. Tubular outlet 104, which illustratively defines mixed water outlet conduit 30, fluidly couples cavity 114 with diverter valve body 76.

More particularly, the bottom wall 112 includes a hot water supply port 122 in fluid communication with the hot water inlet 100, and a cold water supply port 124 in fluid communication with the cold water inlet 102. At least one discharge or outlet port 125 also extends through the side wall 110 and is in fluid communication with outlet 104.

The mixing valve cartridge 98 illustratively includes a pressure balance device 126 which is illustratively non-rotatably disposed in the cavity 114. The pressure balance device 126 includes laterally spaced apart axially inwardly projecting first and second tubes 128 and 130. The first tube 128 is illustratively sealingly received into port 122 of body 74, while the second tube 130 is illustratively sealingly received into port 124 of the body 74. Seals, illustratively o-rings 132 and 134, are provided to sealingly engage the sidewalls of ports 122 and 124 to prevent water from supply ports 122 and 124 from leaking into the cavity 114 and unintentionally reaching the outlet port 125.

With further reference to FIGS. 11 and 12, check valves 136 and 138 are illustratively coupled to the tubes 128 and 130 and are configured to prevent cross-flow of hot water from the hot water inlet 100 into the cold water inlet 102 and vice versa. Such a cross-flow could occur if there is a pressure differential between the hot and cold water inlets 100 and 102.

The first tube 128 is fluidly coupled to a first section 140 of a spool-type pressure balancing valve 142. Similarly, the second tube 130 is fluidly coupled to a second section 144 of the pressure balancing valve 142. The pressure balancing valve 142 is illustratively disposed in a chamber 146 of the device 126. Seals, such as o-rings 145 and gasket 147, may prevent water leakage from the valve 142. The pressure balancing valve 142 may be of conventional design and illustratively includes a piston 148 which is slidably mounted within an outer spool 150. Such illustrative spool-type pressure balancing valves are known in the art and may be of the type shown in U.S. Pat. No. 5,725,010 to Marty et al.

The pressure balance device 126 further includes laterally spaced apart axially outwardly extending first and second tubes 152 and 154. The first tube 152 defines a first outlet passageway 156, and the second tube 154 defines a second outlet passageway 158. Outlet passageways 156 and 158 are in fluid communication with the chamber 146. Tubes 152 and 154 receive seals, illustratively spring and seat assemblies 160 and 162, respectively.

Referring further to FIG. 11, the pressure balance device 126 is operably coupled to an outer valve assembly 164. More particularly, the outer valve assembly 164 includes a housing cap 166 which may be secured to the pressure balance device 126 through a bayonet lock 168.

A volume and temperature control valve plate 170, illustratively formed of stainless steel, is operably coupled to a stem 176. The valve plate 170 includes a hot water control aperture 172 and a cold water control aperture 174. As the stem 176 rotates about its longitudinal axis, the temperature control valve plate 170 rotates the control apertures 172 and 174 for selective alignment with the hot and cold water outlet passageways 156 and 158, respectively, of the pressure balance device 126.

As is known, when the stem 176 is in an off (home) position, neither control aperture 172, 174 is in fluid communication with fluid passageways 156, 158, such that no water flows therethrough. Rotation of the stem 176 in a counter-clockwise direction from the off position moves the valve plate 170 such that the cold water passageway 158 is in fluid communication with the cold water control aperture 174 to initiate a cold water flow. As rotation of the stem 176 continues, the hot water control aperture 172 of the valve plate 170 begins to align with hot water passageway 156 to start hot water flow through hot water passageway 156. At a full counter-clockwise orientation, maximum hot water flow is provided through hot water control aperture 172. The control apertures 172 and 174 in the valve plate 170 are in communication with the outlet port 125. More particularly, water flowing through control apertures 172 and 174 mixes within the cap 166 and flows around pressure balance device 126 to the outlet port 125.

Figure 14:
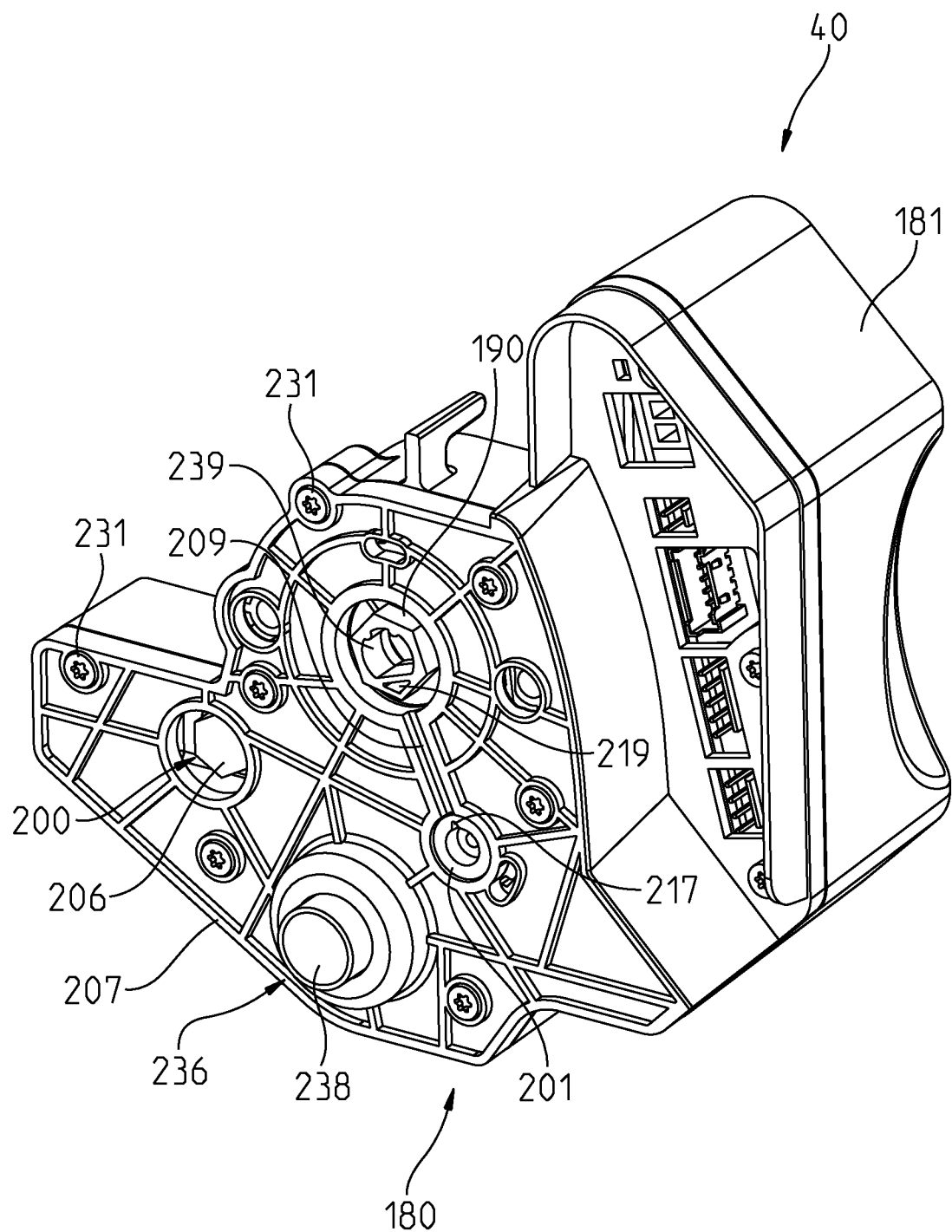
FIG. 14 is a front perspective view of the mixing valve drive of FIG. 5.
Figure 15:
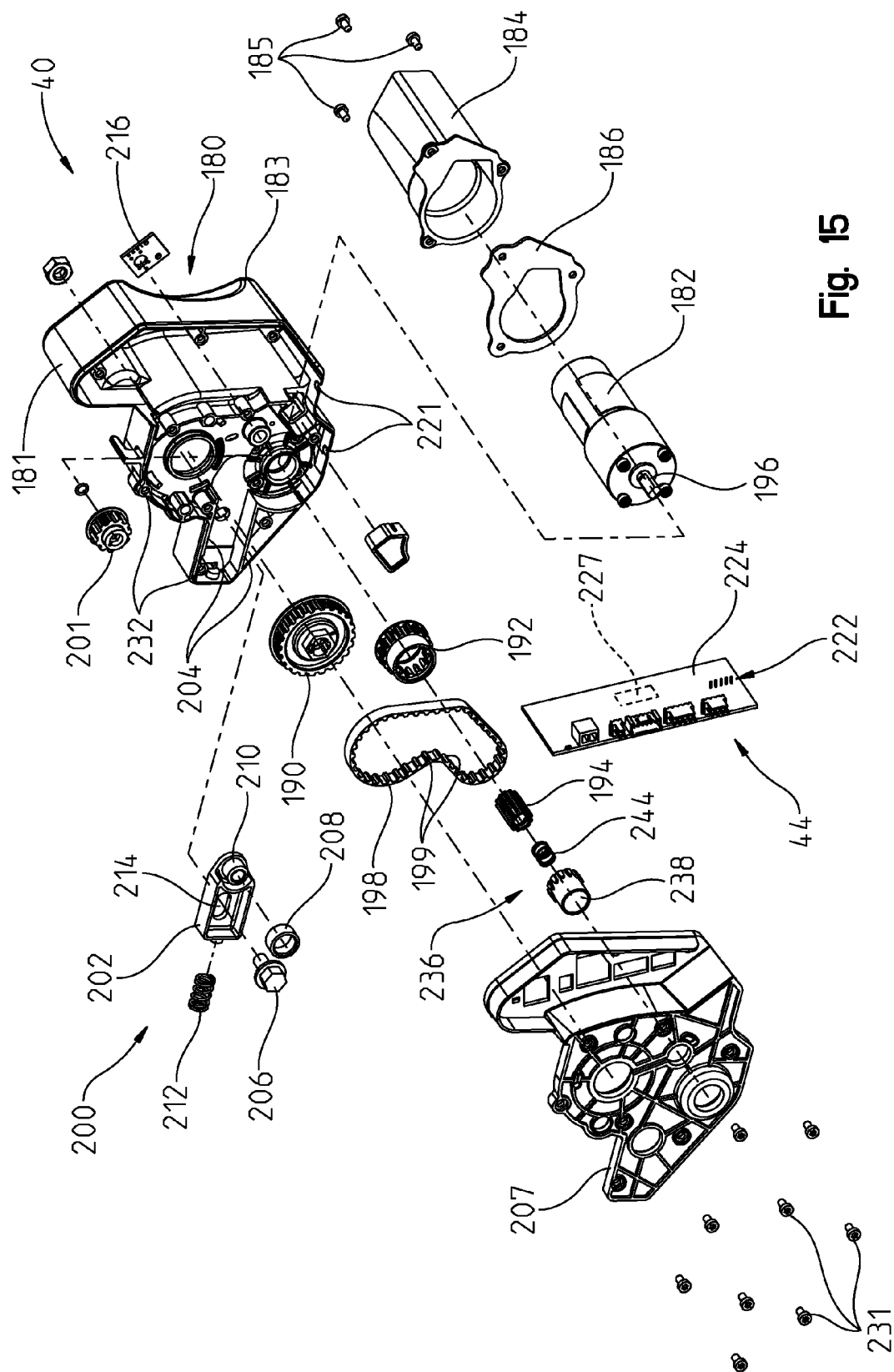
FIG. 15 is an exploded front perspective view of the mixing valve drive of FIG. 14.
Figure 16:
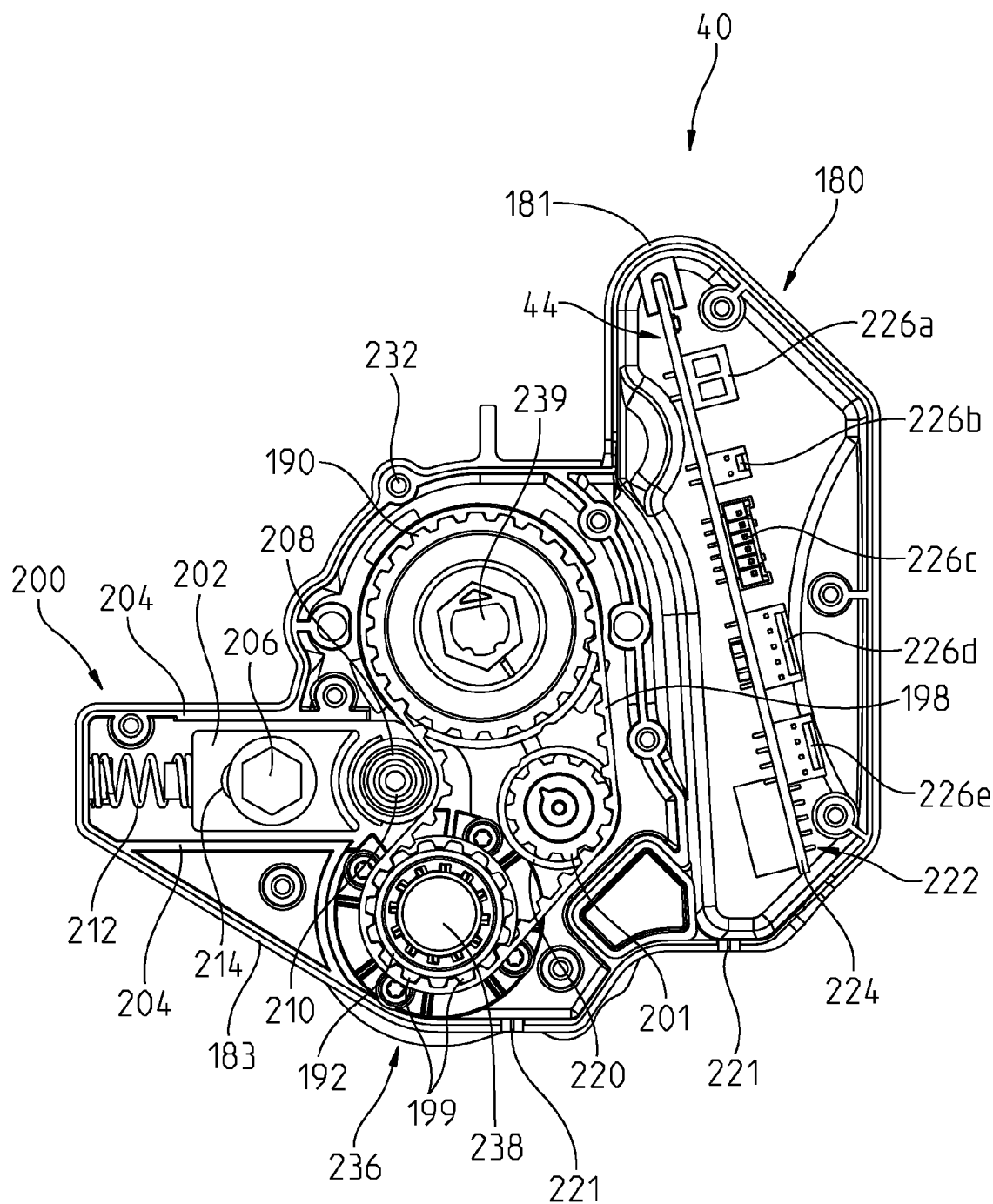
FIG. 16 is a front plan view of the mixing valve drive of FIG. 14.

Referring now to FIGS. 5, 6, and 10, rough assembly 70 is configured to be operably coupled to the mixing valve drive 40. The mixing valve drive 40 illustratively includes a motor/gear box assembly 180, having a housing 181 supported by the mixing valve body 74 through the mixing valve cartridge 98. As shown in FIGS. 14-16, the motor/gear box assembly 180 illustratively includes an electric motor 182 received within a sleeve 184. The sleeve 184 is illustratively molded from a thermoplastic and is coupled to a rear housing or base 183 of housing 181, illustratively through fasteners 185. A foam seal 186 is illustratively received intermediate the sleeve 184 and the housing 181 to prevent water from accessing the motor 182 itself. The bottom side of the sleeve 184 may include vents (not shown) to reduce the amount of heat built up by the motor 182. The stem 176 of the mixing valve cartridge 98 illustratively engages with a spline on a driven or valve gear 190, which is configured to turn the stem 176 and control the temperature of the water delivered to the outlet 30, through rotation of valve plate 170 in the manner further detailed herein.

The illustrative motor/gear box assembly 180 further includes a main drive gear 192. The main drive gear 192 is driven in rotation by a drive pinion 194 which connects directly to the motor driver or drive shaft 196 of motor 182. A drive belt 198 with teeth 199 engages with the main drive gear 192 and the driven or valve gear 190. Following counter-clockwise from the driven gear 190 in FIG. 16, the drive belt 198 engages with a tensioner 200, which applies tension to the belt 198 to accommodate tolerances in the mixing valve drive 40. A variety of tensioners 200 may be utilized, including an eccentric camming tensioner, a spring loaded arm, a piston or other suitable mechanism.

FIGS. 15 and 16 show an illustrative tensioner 200 for belt 198. Tensioner 200 includes a slide member 202 which is configured to slide horizontally between two guides 204 forming part of the base 183 of housing 181. A screw 206 loosely holds the tensioner 200 to the housing 181. A cylindrical roller 208 is rotatably supported on a shaft 210 which is a part of the slide member 202. A compression spring 212 pushes the tensioner 200 and roller 208 into the outer or smooth (no teeth) side of the drive belt 198. The spring 212 is held in place by the guides 204. A slot 214 in the slide member 202 receives the screw 206 and allows the slide member 202 to move horizontally toward the belt 198. The tension in the belt 198 is set automatically by the compression of the spring 212. The screw 206 is then tightened down to lock the tensioner 200 in place. The roller 208 is constrained by a front housing or cover 207 cooperating with the base 183 of the housing 181. The act of locking down or securing the belt 198 with its desired tension may be performed before (FIG. 16) or after (FIG. 14) the front cover 207 is attached.

The belt 198 engages with the valve or driven gear 190 which is connected to the mixing valve cartridge 98. A positioning gear 201 engages the belt 198 intermediate gears 190 and 192. The positioning gear 201 is connected to a position sensor, illustratively a potentiometer 216, which keeps track of the angular position of the stem 176 (and hence rotatable valve plate 170) of the mixing valve cartridge 98. In other words, the potentiometer 216 detects the rotational position of the positioning gear 201 which has a direct correlation with the position of the driven gear 190 through the belt 198. In turn, the rotational position of the driven gear 190 has a direct correlation with the position of the stem 176 and valve plate 170 of the mixing valve cartridge 98. In one illustrative embodiment, the potentiometer 216 may be a Trimmer Potentiometer part number SV01L103AEA11T00 available from Murata Manufacturing Co., Ltd. of Kyoto, Japan.

As shown in FIG. 14, both the positioning gear 201 and the driven gear 190 have indicators 217 and 219, respectively, which are visible to the user. During initialization or assembly of mixing valve drive 40, the initial or home position of the positioning gear 201 is set to be equivalent to the off position of the mixing valve cartridge 98 (i.e., when the plate 107 is in its furthermost clockwise position so that no water flows therethrough). When aligned and pointed toward each other, the indicators 217 and 219 define the home position of the positioning gear 201 and the driven gear 190. The housing cover 207 illustratively includes an alignment channel 209 to assist the user in changing the indicators 217 and 219.

The housing 181 is illustratively formed of a thermoplastic and receives the gears 190, 192 and 201, belt 198, and tensioner 200. Deflector or ribs 220 (FIG. 16) may be added inside the housing 181 to direct water potentially leaked from cartridge 98 away from electronics or other sensitive areas. Slots 221 may be provided in the bottom of the housing 181 to allow any water that might get into the motor/gear box assembly 180 to drain therefrom. In addition, a plug (not shown) may be added to the lower portion of housing 181 to prevent water from following wires and potentially damaging electrical components.

The main housing 181 may also house controller 44 including control electronics 222 supported on a printed circuit board (PCB) 224. The control electronics 222 may include individual connectors 226a, 226b, 226c, 226d and 226e (FIG. 16) for coupling with power supply 45, temperature sensor 46, diverter valve drive 42, main user interface 14, and battery/speaker, respectively. Conventional connector plugs and wires (not shown) may be used to make the appropriate electrical connections. The controller 44 may also include a transceiver 227 for wirelessly communicating with the remote user interface 58 and the hand shower user interface 64. Cover 207 is illustratively added to the front of the base 183 to define housing 218 and is attached with screws 231 which are threadably received within bosses 232 of the base 183.

Figure 17:
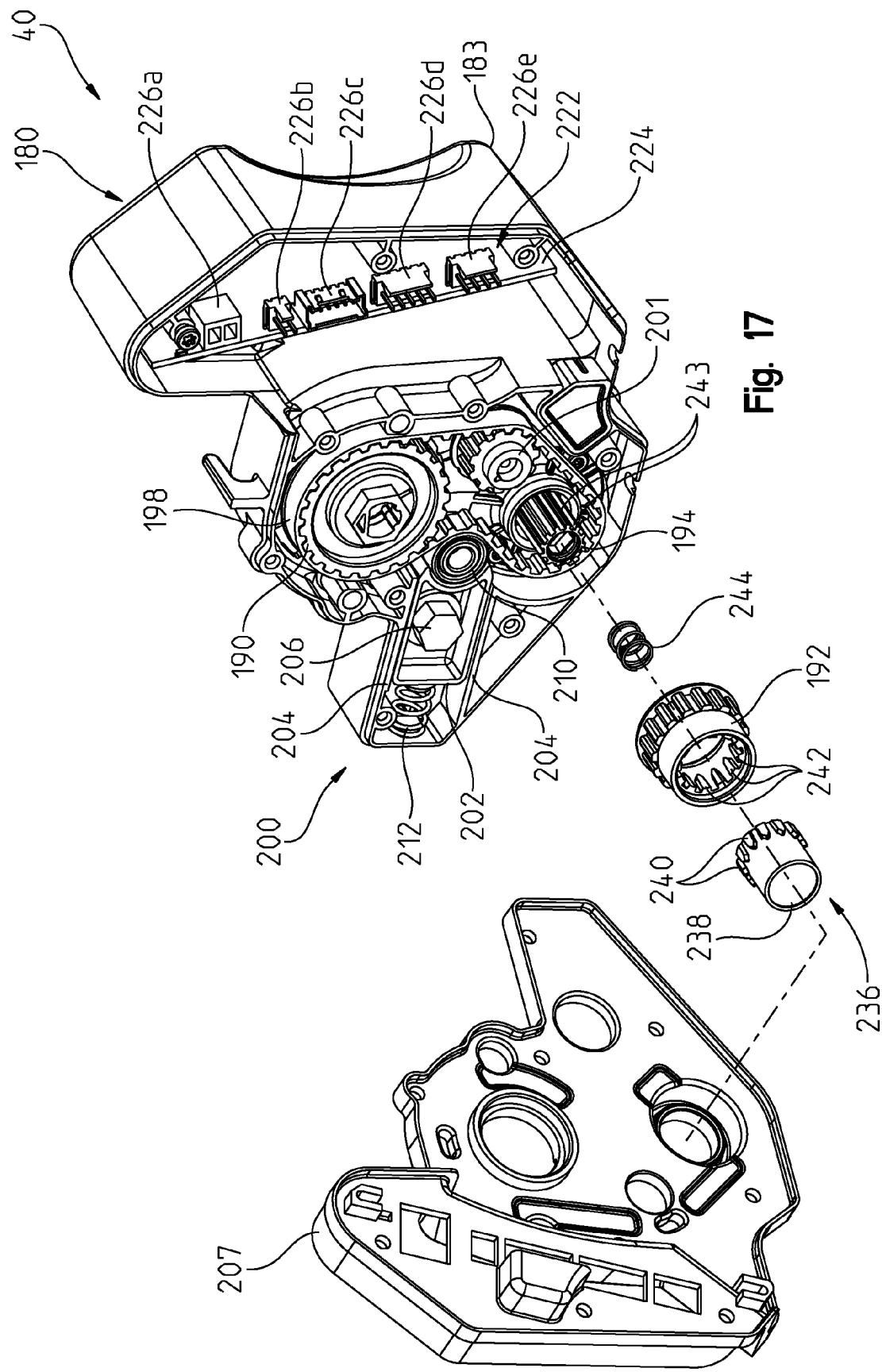
FIG. 17 is a perspective view of the mixing valve drive of FIG. 14, showing the front cover removed and the manual override partially exploded.
Figure 18A:
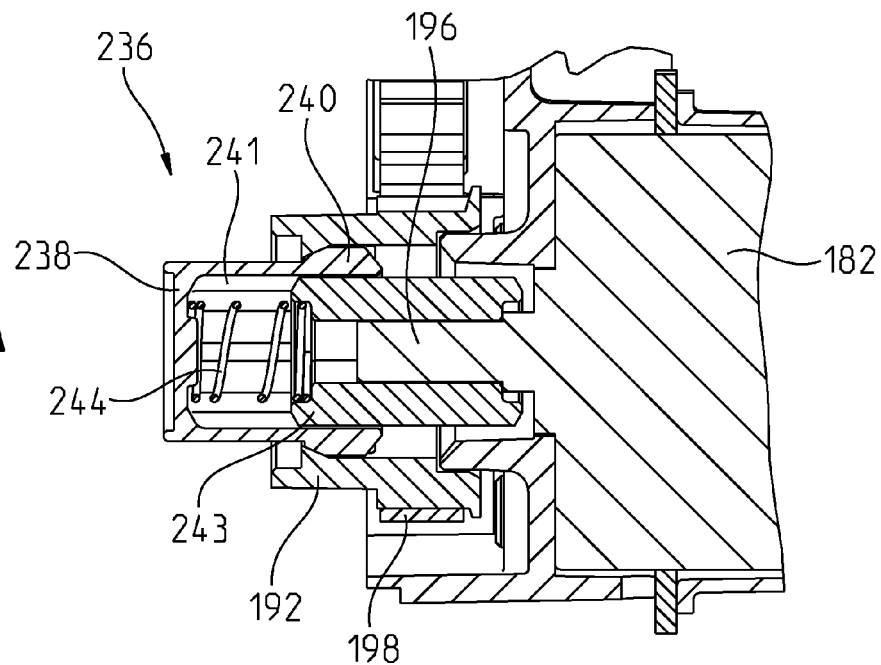
FIG. 18A is a cross-sectional view of the manual override of FIG. 17, showing the manual override operably coupled to the mixing valve drive motor.
Figure 18B:
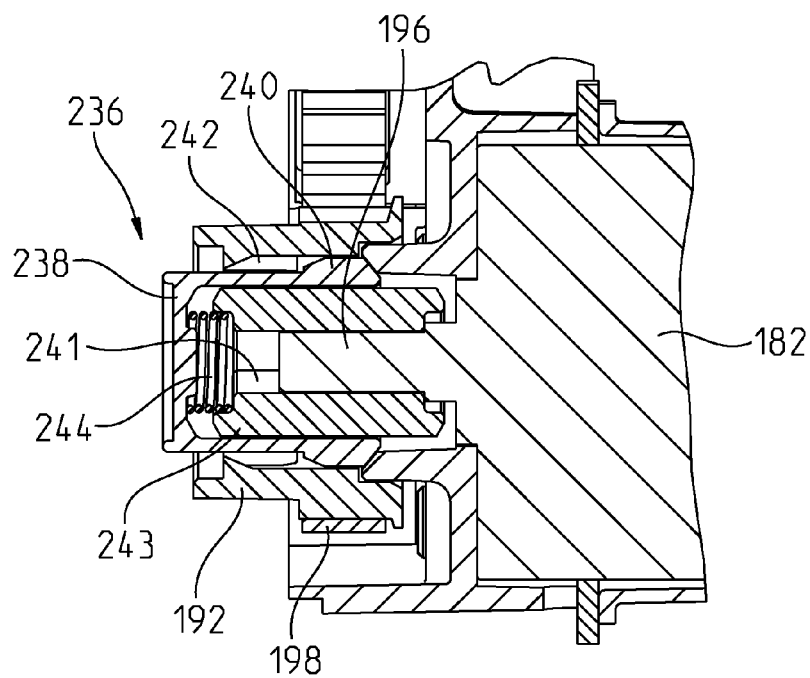
FIG. 18B is a cross-sectional view of the manual override of FIG. 17, showing the manual override uncoupled from the mixing valve drive motor.
Figure 20:
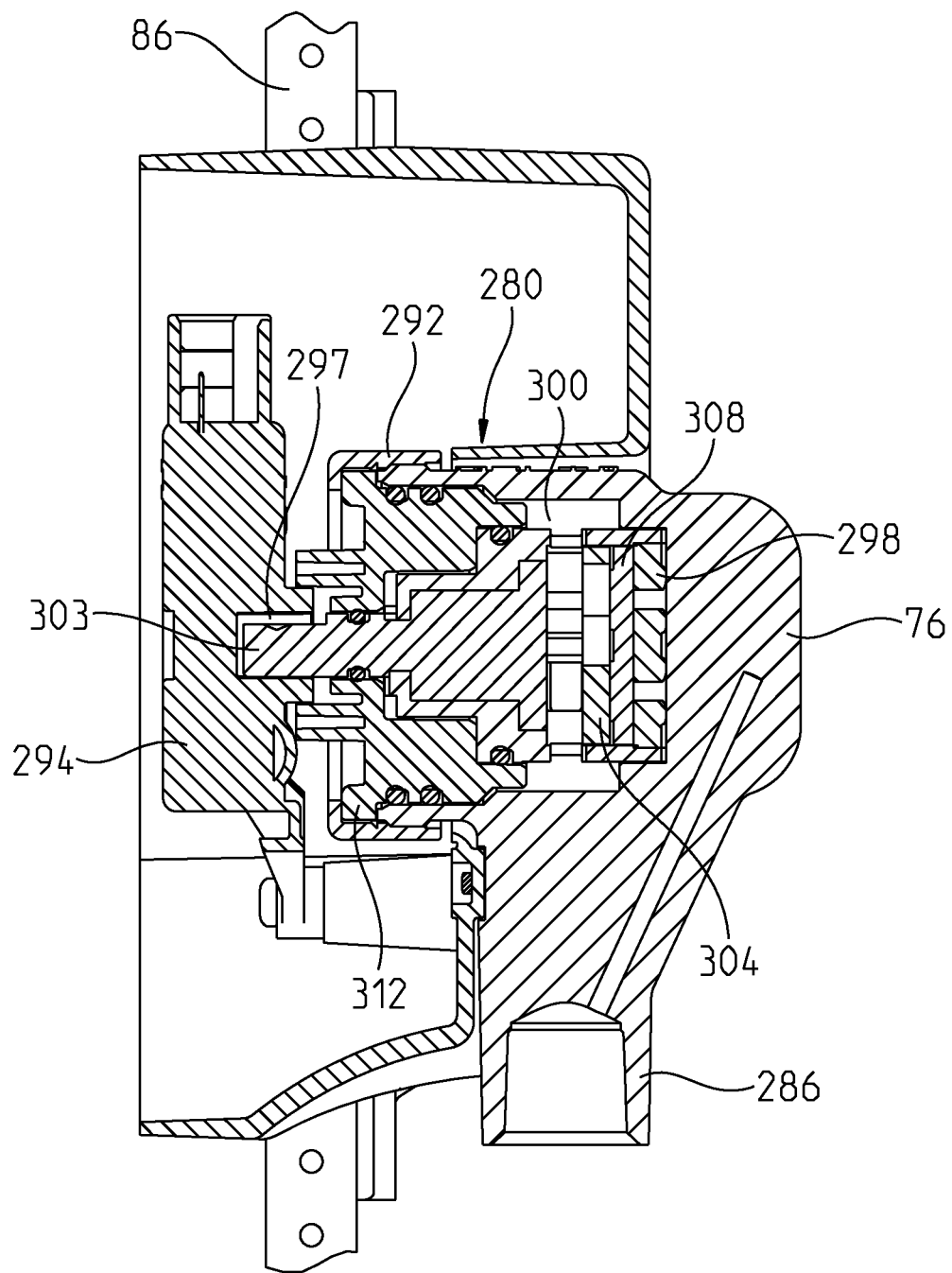
FIG. 20 is a cross-sectional view taken along line 20-20 of FIG. 9.

With reference to FIGS. 14-17, the motor/gear box assembly 180 includes a manual override 236 having an override button 238 that when pushed, disengages the gear train (i.e., belt 198 and drive gear 192) from the mixing valve cartridge 98, thereby allowing the user to manually turn the stem 176 of the valve cartridge 98 to an off position in case of a component (e.g., motor 182) failure or power outage. In other words, the button 238 selectively couples the drive gear 192 with the drive pinion 194 and the motor shaft 196. As seen in FIGS. 17-18B, external splines 240 on the button 238 selectively engage with mating internal splines 242 on a motor driver, illustratively drive gear 192 (FIG. 18A). Similarly, internal splines 241 on the button 238 continuously engage with mating external splines 243 on the drive pinion 194. By depressing button 238, splines 240 disengage from splines 242 (FIG. 18B). While button 238 remains rotatably coupled to the drive pinion 194, the button 238 is rotatably uncoupled from the drive gear 192, thereby allowing a tool, such as an Allen wrench (not shown), to engage with an auxiliary manual input, illustratively a hex opening 239 defined by driven gear 190. As such, a user may rotate stem 176 of valve cartridge 98. A spring 244 returns the button 238 to the initial or engaged position (FIG. 18A). Turning the hex opening 239 while pushing the button 238 will allow the user to close the mixing valve 20 (i.e., turned off water by disengaging motor 182 from the drive gear 192) should the electronics or power fail.

Referring to FIG. 10, the motor/gear box assembly 180 illustratively attaches to the mixing valve 20 by a pair of bolts 246 engaging a mounting clip 248. The mounting clip 248 is c-shaped and assembles to a groove 250 molded in the cap 166 of valve cartridge 98. The bolts 246 are supported in mounting tabs 252 extending radially outwardly from the clip 248. As the mounting clip 248 extends circumferentially more than 180 degrees within the groove 250 of cap 166, the clip 248 essentially snaps over the cap 166 and is retained within the groove 250. The mounting clip 248 facilitates assembly in the illustrative embodiment as the cartridge bonnet nut 108 will not pass over the mounting tabs 252 on the mounting clip 248.

Referring to FIG. 9, the temperature sensor or thermistor assembly 46 consists of a thermistor 256, a lower housing 258, an upper housing 260, inner o-rings 262, and outer o-rings 264. The lower and upper housings 258 and 260 are illustratively snapped together at a rotatable joint 266 to provide a rotation between the housings 258 and 260 as opposed to a threaded connection that may result in twisting of the connecting wires (not shown) and leading to a potential failure. The upper housing 260 threads into the valve body 74 and sets the depth of the thermistor 256 engagement in the outlet water stream and locks the thermistor 256 in place. The o-rings 262 and 264 seal water from exiting the body 74.

With reference to FIGS. 10 and 13, a fluid mixer 270 is illustratively received within the outlet 104 of mixing valve body 74. The fluid mixer 270 may include a lower portion 272 operably coupled to an upper portion 274. The lower portion 272 includes a pair of mixing blades or vanes 276 configured to impart a rotational motion in a first direction (illustratively counter-clockwise) to water in the outlet 104. Similarly, the upper portion 274 includes a pair of mixing blades or vanes 278 configured to impart a rotational motion of an opposite second direction (illustratively clockwise) to water in the outlet 104. The rotational motion imparted to the water in outlet 104 facilitates mixing of hot and cold water supplied from the mixing valve cartridge 98, thereby providing a more uniform temperature distribution therein and facilitating improved accuracy in measurements by the temperature sensor 46.

As detailed herein, the thermistor assembly 46 provides feedback to the controller 44 of the water temperature exiting the mixing valve 70 at outlet 104. In one illustrative embodiment, the controller 44 provides a redundant check on the temperature sensing loop. For example, mixing valve position as detected by potentiometer 216 may be utilized to calculate the actual position versus theoretical position of the cartridge 98, a secondary piezo-electric temperature sensor may be used to monitor an overheat condition (possibly a passive IR sensor that can be used in an overheat condition), or a dual circuit may be used to verify if the thermistor assembly 46 is working consistently.

With reference to FIGS. 7, 9, 19, and 20, the diverter valve 32 includes a diverter valve cartridge 280 received within diverter valve body 76. The valve body 76 includes an inlet 282 fluidly coupled to the outlet 104 of the mixing valve body 74, a first outlet 284 fluidly coupled to the first fluid outlet 34, and a second outlet 286 fluidly coupled to the second fluid outlet 36. The valve body 76 is received within the housing 72 and attached to rear wall 80 via screw 82 (FIG. 7). Diverter valve cartridge 280 may be retained within a bore 290 of the brass body by a bonnet 292. As further detailed herein, the diverter valve cartridge 280 may be of conventional design. In one illustrative embodiment, the diverter valve cartridge may be of the type available from Fluehs Drehtechnik of Luedenscheid, Germany.

The diverter valve drive 42 illustratively includes an actuator, such as an electric motor or solenoid drive 294, secured to the valve cartridge 280 via conventional fasteners, such as screws 295. The electric motor 294 illustratively includes a position sensing device, such as a potentiometer, to detect the rotational position of the drive shaft 297, and hence the diverter valve cartridge 280, in operation.

Figure 21:
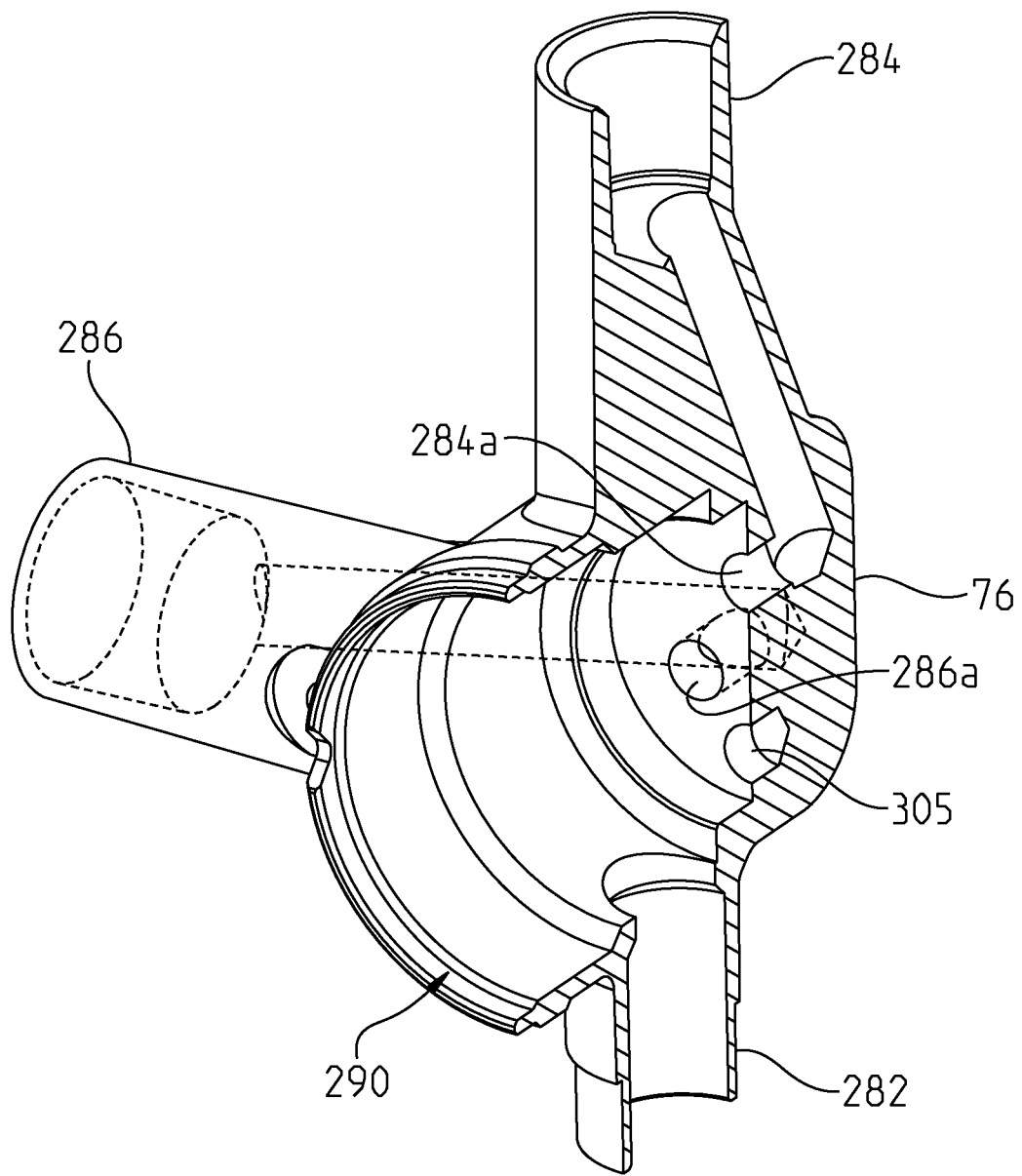
FIG. 21 is a perspective view, in partial cross-section, of the diverter valve body of FIG. 5.
Figure 22:
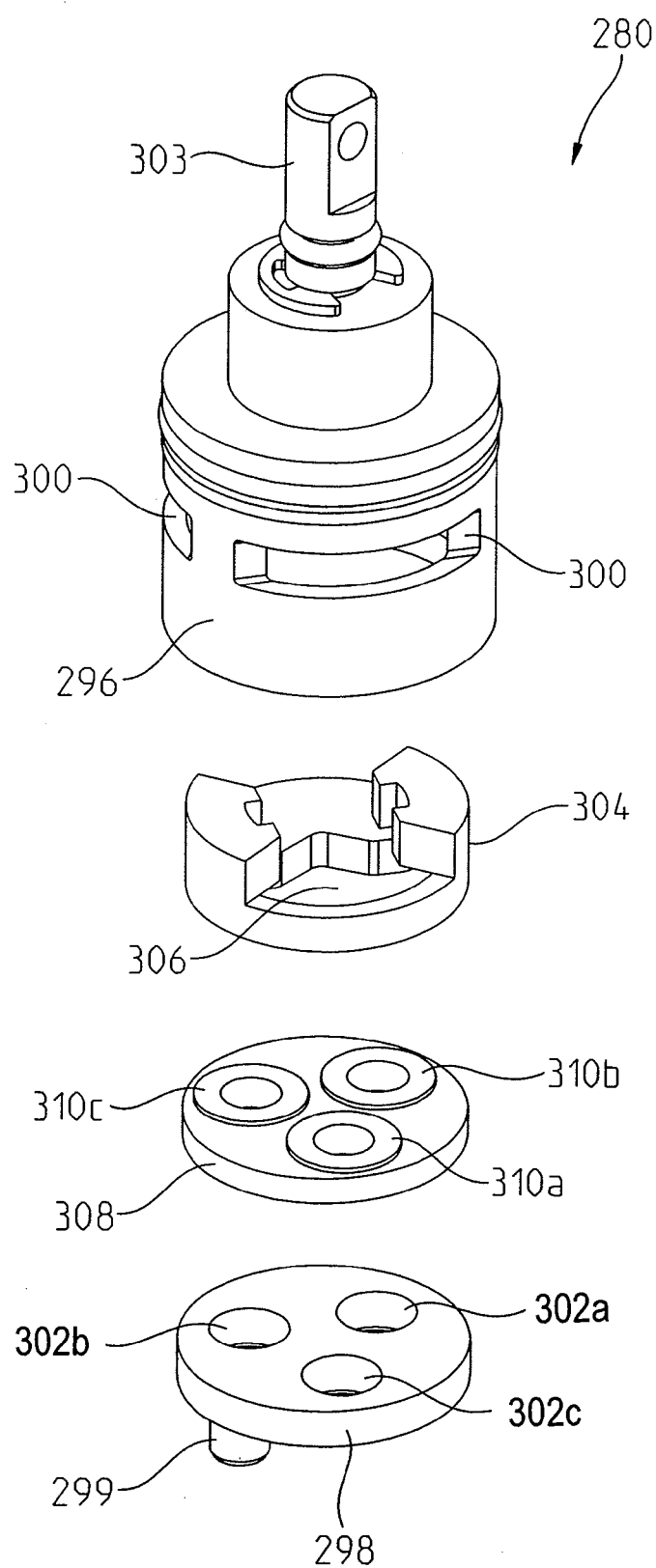
FIG. 22 is an exploded perspective view of the diverter valve of FIG. 19.
Figure 23:
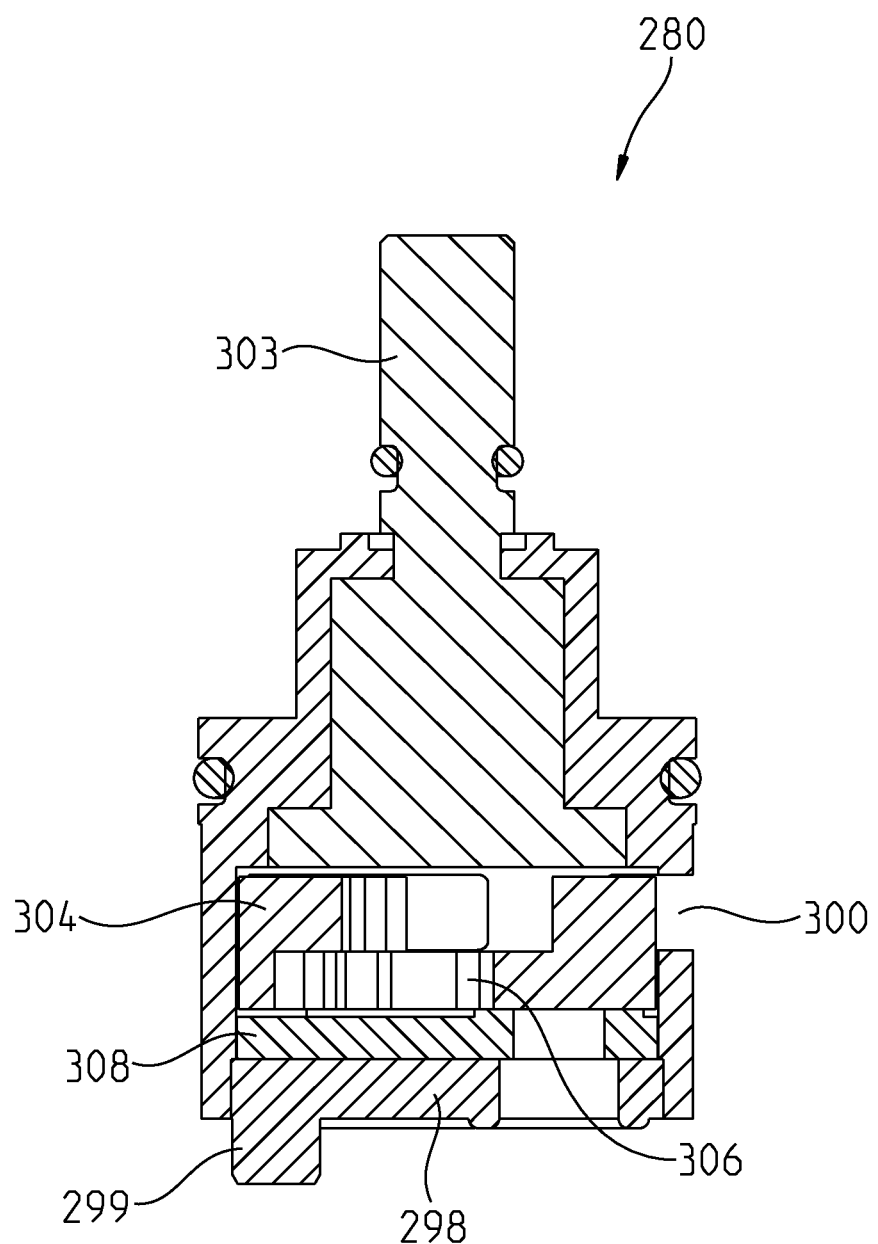
FIG. 23 is a cross-sectional view taken along line 23-23 of FIG. 19.

With reference to FIGS. 19-22, the diverter valve cartridge 280 is illustratively of an open design and includes a housing 296 having a plurality of radially disposed inlet ports 300, and an end wall 298 having three axially disposed outlet ports 302A, 302B, 302C. A rotatable flow control plate 304 includes a control opening 306 and is coupled to a stem 303 for rotation therewith. In an illustrative embodiment, outlet port 302A is in fluid communication with opening 284A of the first outlet 284, outlet port 302B is in fluid communication with opening 286A of the second outlet 286, and outlet port 302C is plugged or sealed by the valve body 76. A lower plate 308 sealingly engages the flow control plate 304 and includes openings 310A, 310B, and 310C aligned with outlets 302A, 302B, and 302C, respectively, of end wall 298. A post 299 extends from end wall 298 and is received within opening 305 in valve body 76 (FIGS. 7 and 21). Post 299 provides angular alignment for the ports 302 of the end wall 298 relative to the openings 284A and 286A of the valve body 76. A cap 312 cooperates with the housing 296 and is received within cavity 290 of the valve body 76. O-rings 314 provide a fluid seal between the cap 312 and the valve body 76.

During operation, the diverter valve drive 42 will cause plate 304 to rotate to various angular positions to control which openings 310A, 310B, 310C of lower plate 308 are in fluid communication with opening 306 of flow control plate 304, and thereby which outlet 302A, 302B, 302C, and corresponding fluid outlet 284, 286 is supplied with water. Also by controlling angular positions, flow rate may be controlled by using the control opening 306 to only partially overlap with respective openings 310A, 310B, 310C.

FIGS. 24A-24H are bottom views of the diverter valve cartridge 280 showing various rotational positions of the valve plate 304 and the corresponding locations of opening 306 (shown in hidden line) relative to outlets 302A, 302B, and 302C. With reference to FIG. 24A, the diverter valve cartridge 280 is shown in a pause mode of operation. This is the home or center potentiometer position where ports 302A and 302B are closed and port 302C is open. In other words, valve plate 304 blocks outlets 302A and 302B from fluid communication with inlet ports 300. While opening 306 of valve plate 304 is in fluid communication with port 302C, as noted above, port 302C is plugged such that no water flows therethrough.

FIG. 24B shows the diverter valve cartridge 280 in a first port full flow mode, where port 302A is fully open and ports 302B and 302C are closed. As used herein, fully open is defined when the respective port 302 permits unrestricted flow permitted by the system 10 (i.e., no additional restriction to water flow supplied to inlets 300). In this mode, the valve plate 304 has been rotated 37.9 degrees in a first direction (clockwise as shown in FIG. 24B), such that the valve plate 304 blocks outlet 302B from fluid communication with inlet ports 300. However, outlets 302A and 302C are in fluid communication with inlet ports 300 through opening 306 of valve plate 304. As detailed above, outlet 302A is in fluid communication with the first fluid outlet 34 (e.g. overhead shower 50), while outlet 302C is plugged.

FIG. 24C shows the diverter valve cartridge 280 in a second port full flow mode, where ports 302A and 302C are closed and port 302B is fully open. In this mode, valve plate 304 has been rotated 40.8 degrees in a second direction (counter-clockwise as shown in FIG. 24C) from the home position of FIG. 24A such that the valve plate 304 blocks outlet 302A from fluid communication with inlet ports 300. However, outlets 302B and 302C are in fluid communication with inlet ports 300 through opening 306 of valve plate 304. As detailed above, outlet 302B is in fluid communication with the second fluid outlet 36 (e.g., hand shower 52), while outlet 302C is plugged.

FIG. 24D shows the diverter valve cartridge 280 in a first port medium flow mode, where ports 302B and 302C are closed and port 302A is partially open. In this mode, valve plate 304 has been rotated 16.6 degrees in the first direction (clockwise as shown in FIG. 24D) from the home position of FIG. 24A such that the valve plate 304 completely blocks port 302B and partially blocks port 302A from fluid communication with inlet ports 300. Opening 306 of valve plate 304 provides for fluid communication between inlet ports 300 and ports 302A and 302C. As detailed above, outlet 302A is in fluid communication with the first fluid outlet 34 (i.e., overhead shower 50), while outlet 302C is plugged. Valve plate 304 provides a restriction to water flow through port 302A, thereby providing a medium flow rate to the first fluid outlet 34.

FIG. 24E shows the diverter valve cartridge 280 in a second port medium flow mode, where ports 302A and 302C are closed and port 302B is partially opened. In this mode, valve plate 304 has been rotated 19.6 degrees in the second direction (counter-clockwise as shown in FIG. 24E) from the home position of FIG. 24A such that the valve plate 304 completely blocks port 302A and partially blocks port 302B from fluid communication with inlet ports 300. Opening 306 of valve plate 304 provides for fluid communication between inlet ports 300 and ports 302B and 302C. As detailed above, outlet 302B is in fluid communication with the second fluid outlet 36 (i.e., hand shower 52), while outlet 302C is plugged. Valve plate 304 provides a restriction to water flow through port 302B, thereby providing a medium flow rate to the second fluid outlet 36.

FIG. 24F shows a shared mode of the diverter valve cartridge 280, where ports 302A and 302B are both fully open and port 302C is closed. In this mode, valve plate 304 has been rotated either 160 degrees in the first direction (clockwise in FIG. 24F) or 160 degrees in the second direction (counter-clockwise in FIG. 24F) from the home position of FIG. 24A. The valve plate 304 completely blocks port 302C, while the opening 306 provides for unrestricted flow from both ports 302A and 302B, such that water is provided to both the first fluid outlet 34 (i.e., overhead shower 50) and the second fluid outlet 36 (i.e., hand shower 52).

FIG. 24G shows a first port low flow mode of the diverter valve cartridge 280, where port 302A is partially open and ports 302B and 302C are closed. In this mode, valve plate 304 has been rotated 12.2 degrees in the first direction (clockwise as shown in FIG. 24G) from the home position of FIG. 24A such that the valve plate 304 completely blocks port 302B and substantially blocks port 302A from fluid communication with inlet ports 300. Opening 306 of valve plate 304 provides for fluid communication between inlet ports 300 and ports 302A and 302C. As detailed above, outlet 302A is in fluid communication with the first fluid outlet 34 (i.e., overhead shower 50), while outlet 302C is plugged. Valve plate 304 provides a restriction to water flow through port 302A, thereby providing a low flow rate to the first fluid outlet 34.

Finally, FIG. 24H shows a second port low flow mode of the diverter valve cartridge 280, where port 302B is partially open and ports 302A and 302C are closed. In this mode, valve plate 304 has been rotated 14.9 degrees in the second direction (counter-clockwise as shown in FIG. 24H) from the home position of FIG. 24A such that the valve plate 304 completely blocks port 302A and substantially blocks port 302B from fluid communication with inlet ports 300. Opening 306 of valve plate 304 provides for fluid communication between inlet ports 300 and ports 302B and 302C. As detailed above, outlet 302B is in fluid communication with the second fluid outlet 36 (i.e., hand shower 52), while outlet 302C is plugged. Valve plate 304 provides a restriction to water flow through port 302B, thereby providing a low flow rate to the second fluid outlet 36.

Figure 25:
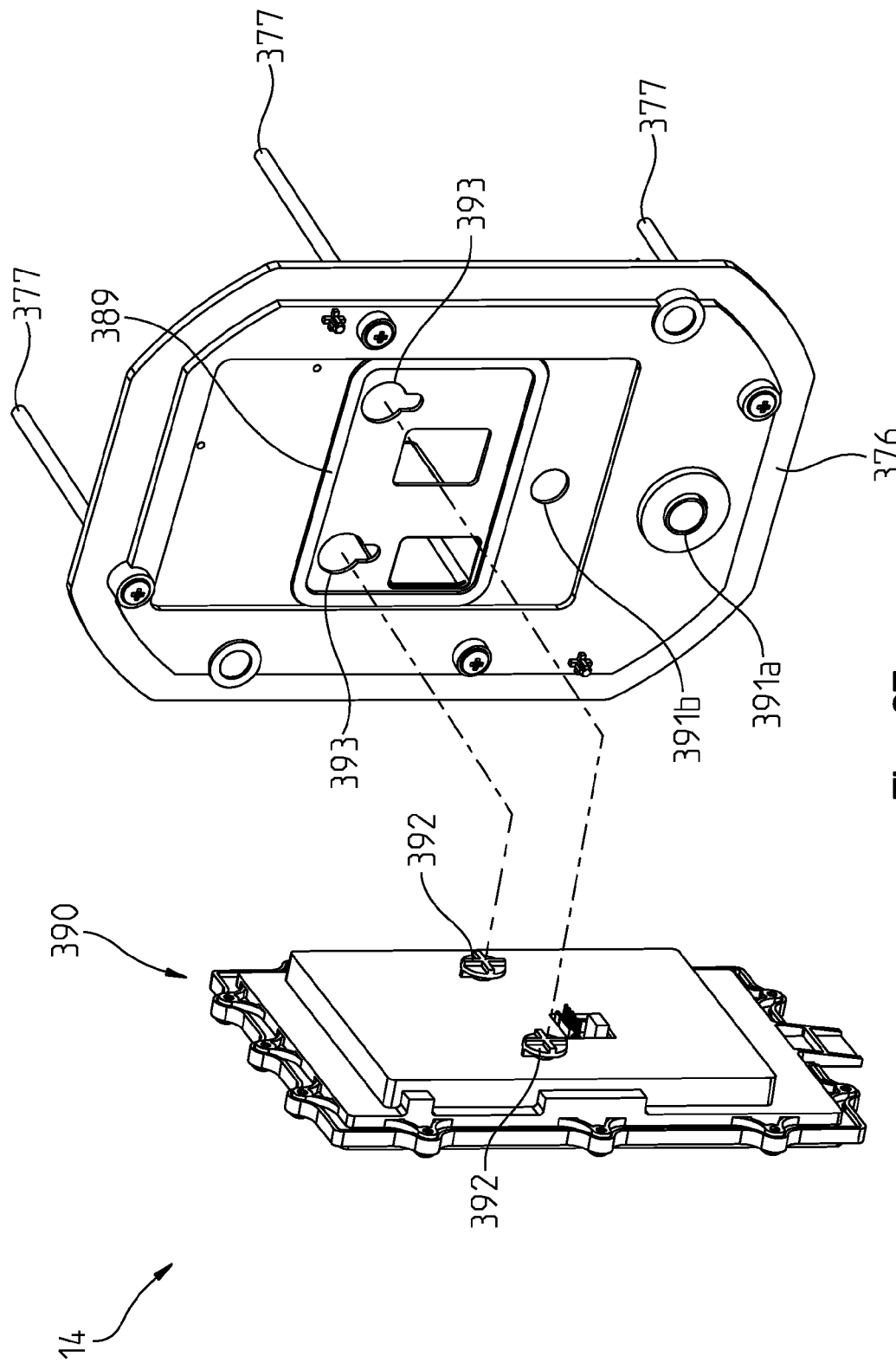
FIG. 25 is a perspective view showing the main user interface of FIG. 5 removed from the wall mounting bracket.
Figure 26:
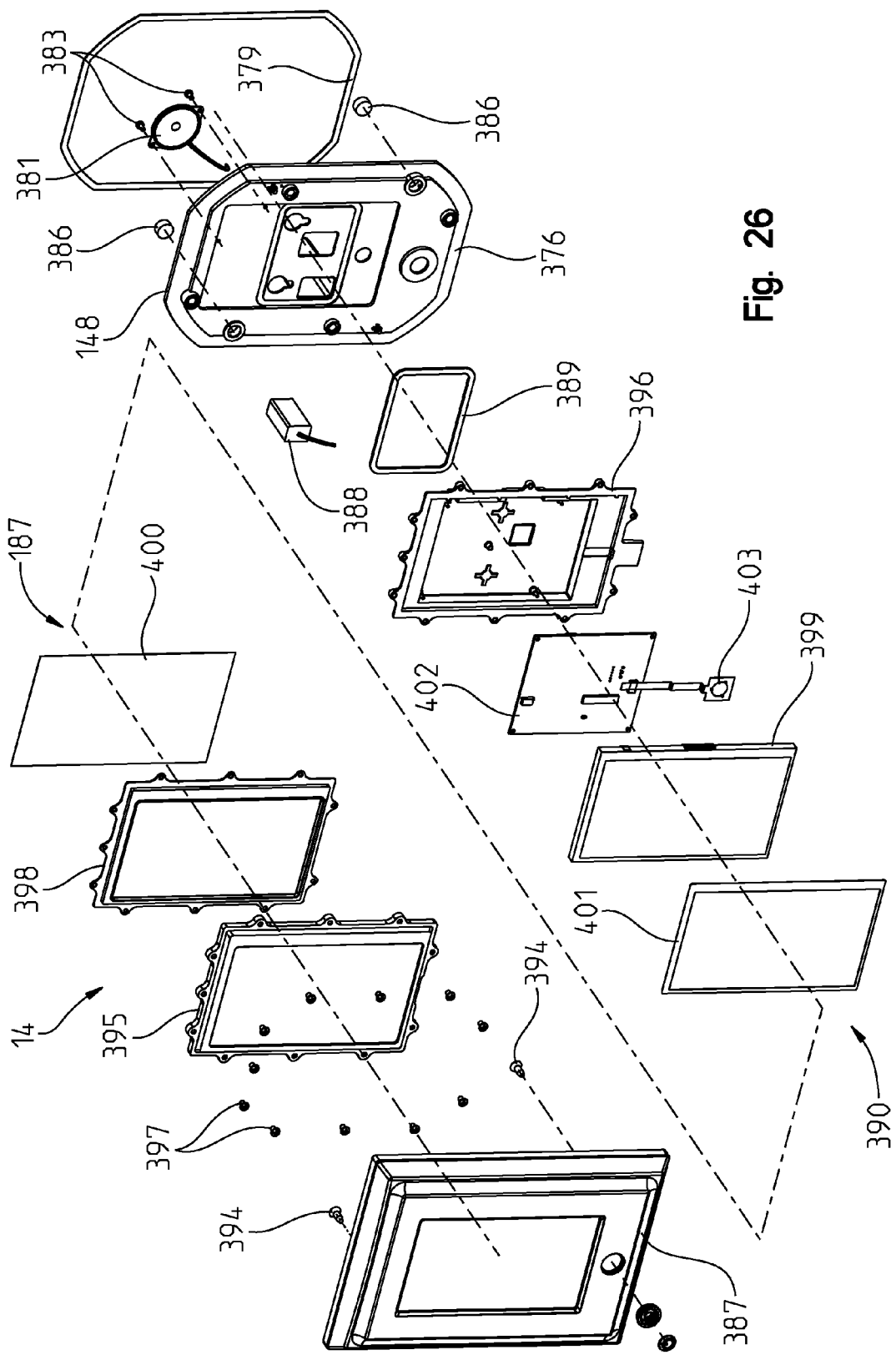
FIG. 26 is an exploded front perspective view of the main user interface of FIG. 5.

FIGS. 25 and 26 show the illustrative main user interface 14 (including illustrative mounting trim) for the electronic shower system 10. As detailed above, the flow control assembly 12 defines the behind the wall 56 portion of the electronic shower system 10. The following description focuses on the illustrative main user interface 14 mounting in front of the wall 56. As shown in FIGS. 5 and 6, hole or cavity 66 in the wall 56 provides access to the rough assembly 70. A mounting plate 376 attaches to the rough assembly 70 (behind the wall) with a plurality of mounting screws 377 into bosses 378, which may include metal inserts (not shown) mounted in the housing 72 (FIGS. 5-7 and 25). A sealing gasket 379 is preassembled to the back of the mounting plate 376 and seals against the finished wall 56. A speaker assembly 381 is attached to the mounting plate 376 as shown with screws 383 to provide audible output to the user. A pair of magnets 386 may be assembled into the back of the mounting plate 376 to lock an escutcheon 387 in place. The speaker assembly 381 illustratively includes an electrical connector (not shown) that may connect to a battery 388, illustratively a 9 volt battery. The battery 388 is configured to provide enough power to the system 10 so that in the case of a power outage, the user will have a predetermined time (illustratively two minutes) to rinse off and get out of the shower. More particularly, the controller 44 is configured to detect when power is not being supplied from the external power supply 45 and the mixing valve 20 is open and thereby providing water to the outlet 30. When both conditions are met, the controller 44 may provide a power loss warning to the user and the battery 388 provides back-up power to operate the mixing valve 20 to turn off water flow. In an illustrative embodiment, the controller 44 automatically closes the mixing valve 20 two minutes after the loss of external power is detected, after which further operation of the mixing valve 20 through the battery 388 is not permitted by the controller 44.

A second sealing gasket 389 provides for a seal between the mounting plate 376 and a removable user interface module 390. Access openings 391A and 391B are provided within the mounting plate 376 behind the user interface module 390 for emergency override 236. In the case of a failure, the user can disconnect the user interface module 390, depress the override button 238 through access opening 391A to free the gears 190 and 192, and pass a wrench (not shown) through access opening 391B to turn off the mixing valve 20, as further detailed herein. Protruding lugs 392 from the user interface module 390 engage with keyhole slots 393 in the mounting plate 376 to lock the user interface module 390 to the mounting plate 376. The escutcheon 387 may include two magnetic stainless steel screws 394 attached to the back of the escutcheon 387 configured to be magnetically coupled to magnets 386.

With further reference to FIG. 26, the interface module 390 is shown as including a front case 395 coupled to a rear case 396 through a plurality of screws 397. A liquid silicone rubber seal 398 is positioned intermediate the front case 395 and the rear case 396 to prevent water leakage therebetween. A resistive touch screen 399 is positioned intermediate the front case 395 and the rear case 396. As is known, resistive touch screen 399 is illustratively a user touch sensitive display screen including a pair of resistive material coated sheets separated by a gap. When touched, horizontal and vertical elements on the sheets are pressed together and detect the location of the touch. As further detailed herein, the touch screen 399 may display customized information and receive corresponding customized inputs as instructed by the controller 44. The resistive touch screen 399 may be of conventional design of the type available from Tianma Micro-electronics of Majialong, Nanshan, China. A protective clear sheet 400 is positioned in front of the resistive touch screen 399 and is spaced therefrom by a spacer 401. A printed circuit board (PCB) 402 is positioned behind the resistive touch screen 399 and may define the controller 44. A power push button 403 is in electrical communication with the PCB 402 along with the battery 388 and speaker assembly 381.

Figure 27:
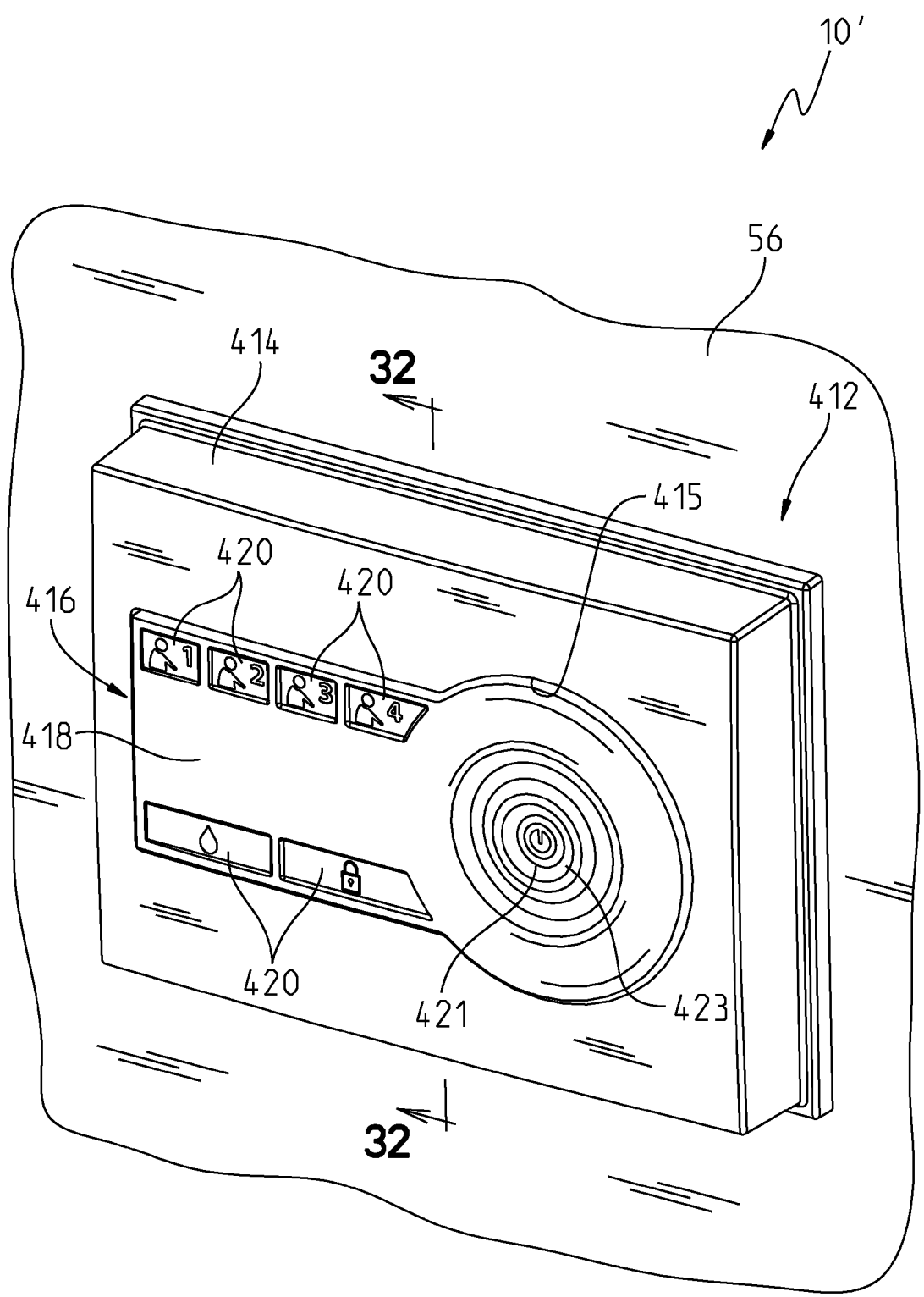
FIG. 27 is a perspective view of an illustrative main user interface module mounted to a shower wall.

FIGS. 27-37 show a further illustrative embodiment magnetic escutcheon mounting assembly 412 for use with mixing valve drive 40. As further detailed herein, the escutcheon mounting assembly 412 includes an escutcheon 414 having an opening 415 for receiving an electronic user interface 416 accessible to someone in the shower. With reference to FIG. 27, the user interface 416 illustratively includes an interface panel 418 with a plurality of push buttons 420 related to different fluid delivery options. Illustratively, a temperature control input 421, such as a capacitive touch slide sensor disposed on an arcuate path, is supported by the interface panel 418 to control outlet water temperature. In a further illustrative embodiment, a flow control input 423 may be positioned adjacent the temperature control input 421 and configured to control the rate of outlet water flow. Again, the flow control input 423 may comprise a capacitive touch slide sensor disposed along an arcuate path. In alternative embodiments, a rotatable knob (not shown) may be manipulated by the user to control the flow rate and/or temperature of water delivered to the shower. Moreover, the interface panel 418 is configured to receive inputs from a user and convert those inputs into an output that maybe transmitted to an electric valve (not shown) to provide for specific fluid temperature, flow rate, and/or outlet pattern.

Figure 28:
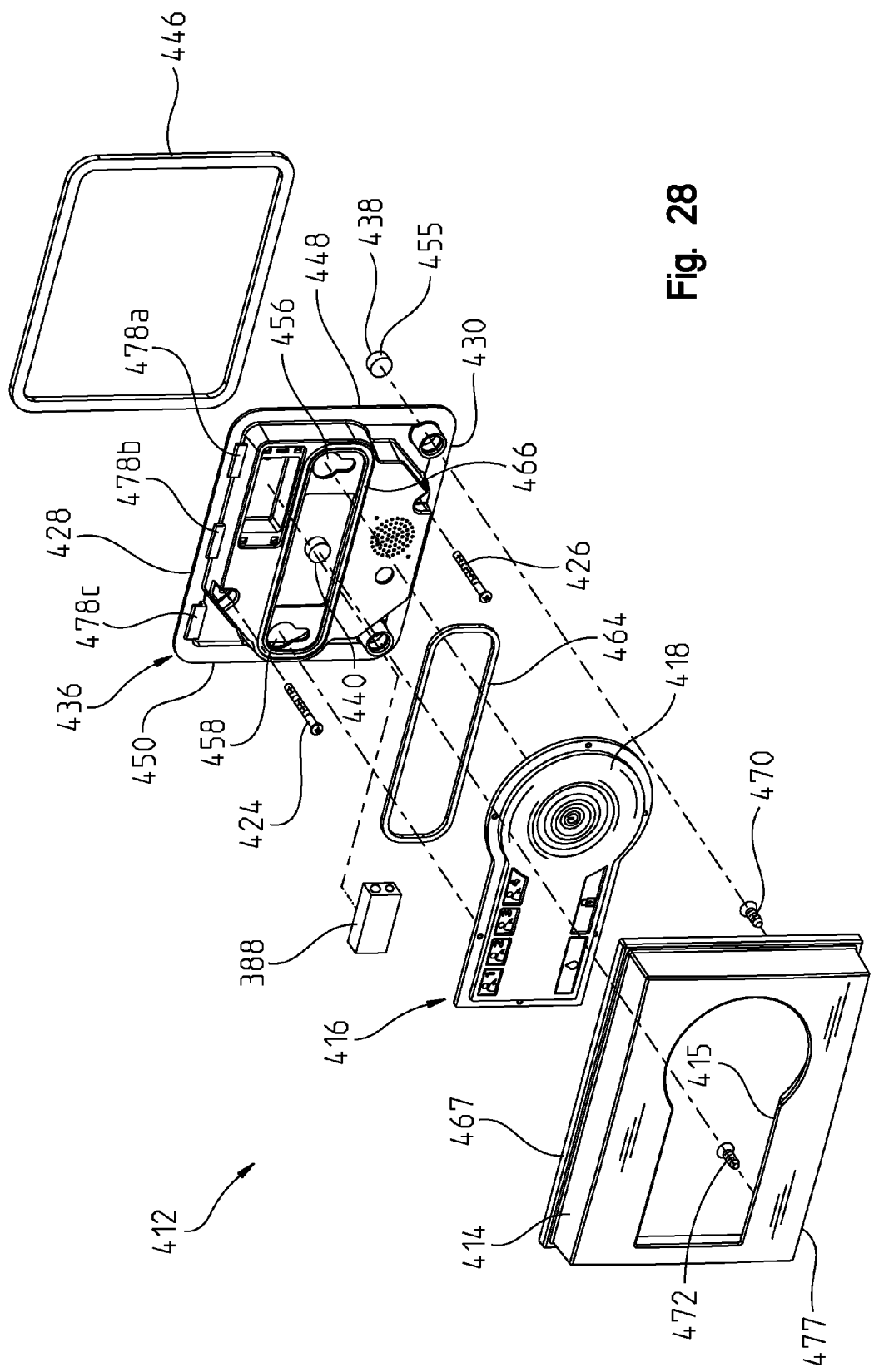
FIG. 28 is a front exploded perspective view of the main user interface of FIG. 27.
Figure 29:
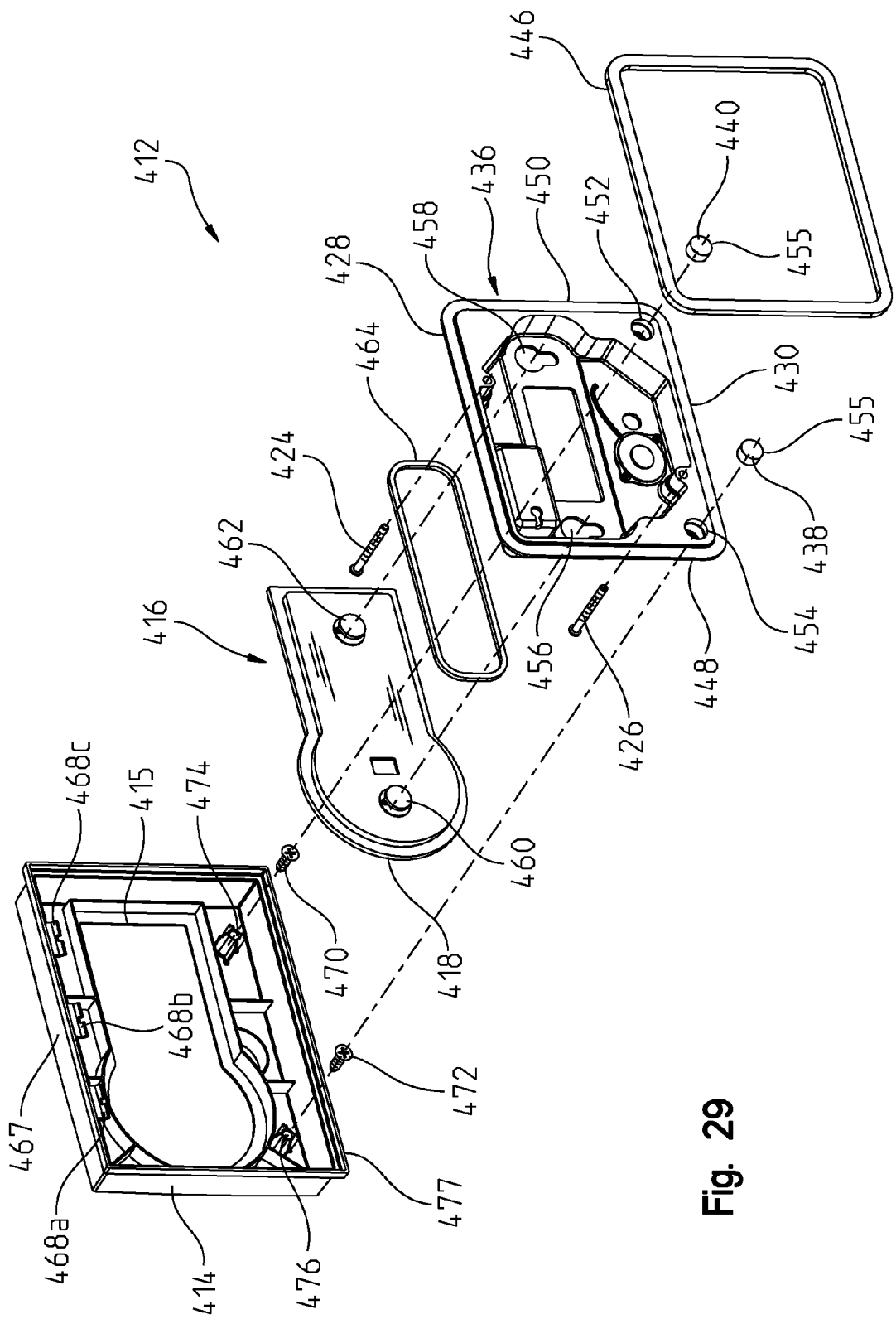
FIG. 29 is a rear exploded perspective view of the main user interface of FIG. 27.
Figure 30:
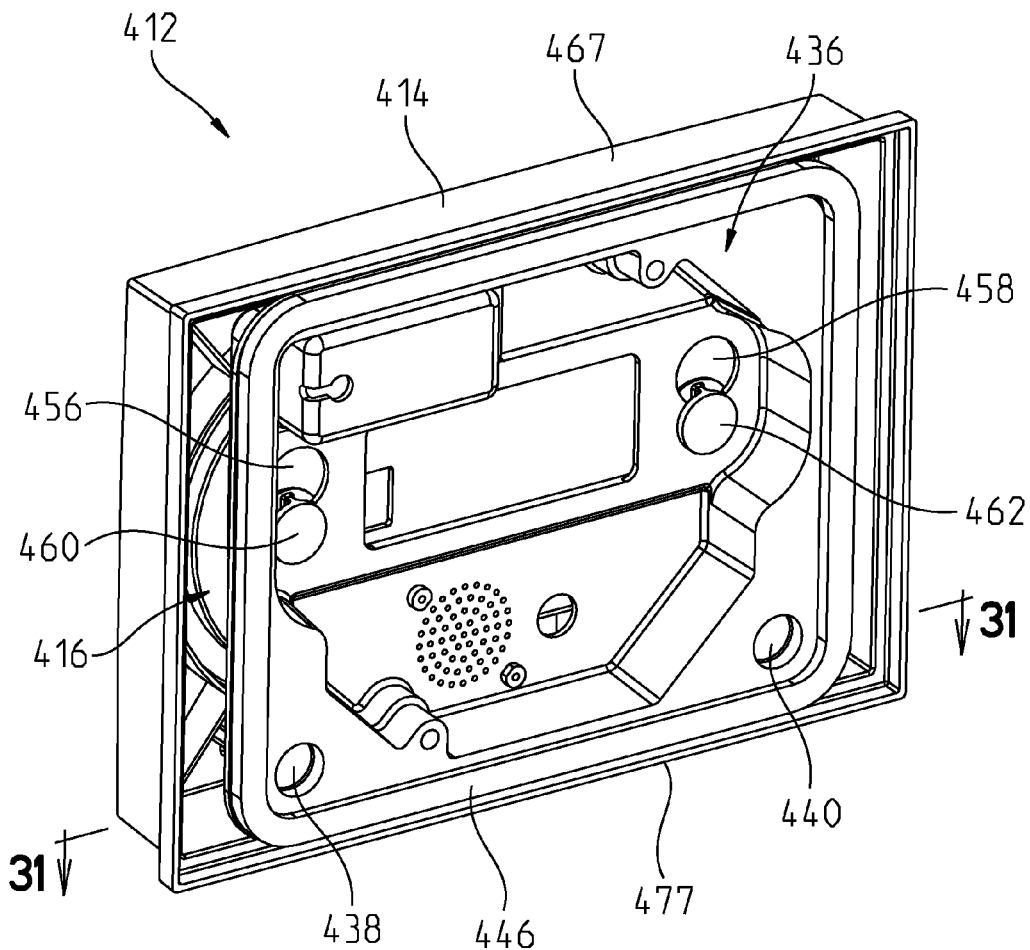
FIG. 30 is a rear perspective view of the main user interface of FIG. 27.

With reference to FIGS. 27 and 28, the escutcheon mounting assembly 412 is configured to be supported by vertical mounting surface defined by the wall 56. As shown in FIGS. 29 and 30, the escutcheon mounting assembly 412 includes a mounting base 436 supporting a user interface 416, and escutcheon 414. Magnets 438, 440 and magnetically attractive elements 470, 472 are used to couple the escutcheon 414 to the mounting base 436. The mounting base 436 couples to the wall 56 using a plurality of mounting screws 424 and 426. Illustratively, a first mounting screw 424 is secured proximate upper edge 428 of the mounting base 436 and a second mounting screw 426 is secured proximate lower edge 430 of the mounting base 436. A seal 446 is compressed between the vertical wall 56 and the mounting base 436. The seal 446 may be formed from any compressible material, such as foam.

The mounting base 436 includes upper edge 428, lower edge 430, and opposing side edges 448 and 450. Two recesses 452 and 454 are positioned near the lower edge 430 of the mounting base 436. In the illustrative embodiment, the recesses 452 and 454 contain magnets 438 and 440 of substantially the same size and shape as the apertures 452 and 454. The magnets 438 and 440 are illustratively secured to the recesses 452 and 454 of the base 436 using conventional means, such as through an adhesive or epoxy. Optionally, magnetically attractive material may be adhered to the first and second apertures 452 and 454, rather than magnets 438 and 440. Illustrative magnets 438 and 440 are rare earth magnets. In one illustrative embodiment, the magnets 438 and 440 are formed from a neodymium magnetic slurry. While the magnets 438 and 440 in the present embodiment are permanent magnets, it is envisioned that other magnets, including electromagnets, could be used. The magnets 438 and 440 illustratively generate a total coupling force of up to 6 $lb_f$ (i.e., up to 3 $lb_f$ per magnet 438 and 440).

The magnets 438 and 440 of the illustrative embodiment are coated or plated to prevent humidity and wetness from corroding and decreasing the magnetic strength. For example, the magnets 438 and 440 may include a coating 455, illustratively an epoxy material to prevent corrosion. In other illustrative embodiments, the coating 455 may be formed from a polymeric overmold.

With further reference to FIGS. 29 and 30, mounting base 436 has first and second keyhole slots 456 and 458 used to couple the user interface 416 to the mounting base 436. The user interface 416 includes first and second locking projections 460 and 462 configured to fit into the keyhole slots 456 and 458 and securely couple the user interface 416 to the mounting base 436. Positioned between the user interface 416 and the mounting base 436 is a seal 464. The seal 464 is placed against a front face 466 of the mounting base 436 (FIG. 29).

The escutcheon 414 is received over the user interface 416. Located along the upper edge 467 of the escutcheon 414 is at least one protrusion or tab 468. Illustratively, three protrusions 468a, 468b, 468c are supported proximate the upper edge 467 of the escutcheon 414. Located along a lower edge 477 of the escutcheon 414 is at least one magnetically attractive element, illustratively 410 stainless steel screws 470 and 472 received into first and second internally threaded bosses 474 and 476. The screws 470 and 472 may be replaced by other magnetically attractive elements, including magnets. The magnets 438 and 440 proximate the lower edge 430 of the mounting base 436 are attracted to the magnetically attractive elements 470 and 472, respectively, and couple the lower edge 477 of the escutcheon 414 to the lower edge 430 of the mounting base 436. The protrusions 468a, 468b, 468c proximate the upper edge 467 of the escutcheon 414 are coupled with recesses or slots 478a, 478b, 478c, respectively, that are proximate the upper edge 428 of the mounting base 436. The protrusions 468 fit within the recesses 478 to form a hinge 484 that pivotally couples the escutcheon 414 to the mounting base 436.

As shown in FIGS. 29 and 30, the keyhole slots 456 and 458 are coupled with the first and second locking projections 460 and 462 of the user interface 416. The locking projections 460 and 462 slide from the upper end of the keyhole slots 456 and 458 to the lower end to secure the user interface 416 to the mounting base 436. The escutcheon 414 is coupled to the mounting base 436 using magnetic forces. Magnets 438 and 440 adhered to opposing first and second recesses 452 and 454 proximate the lower edge 430 of the mounting base 436 are attracted to the stainless steel screws 470 and 472 proximate the lower edge 477 of the escutcheon 414. In this way, the use of magnets 438 and 440 makes the escutcheon 414 more aesthetically pleasing because they are not visible to a user. Magnets 438 and 440 are hidden fastening means, not visible on the exterior of the escutcheon 414 in the way that conventional fasteners would be, and therefore, the shower valve assembly 410 has an aesthetically pleasing appearance.

Figure 31:
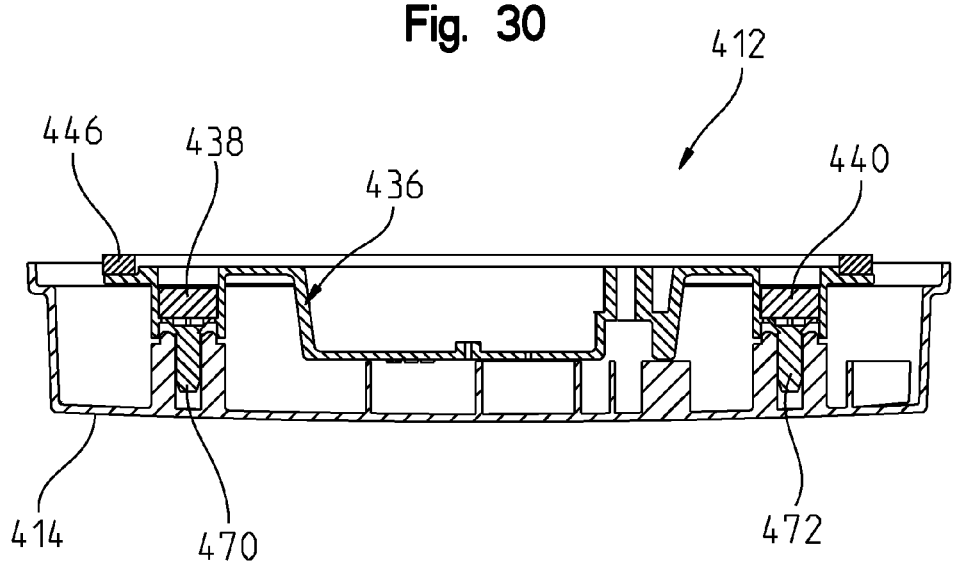
FIG. 31 is a cross-sectional view taken along line 31-31 of FIG. 30.
Figure 32A:
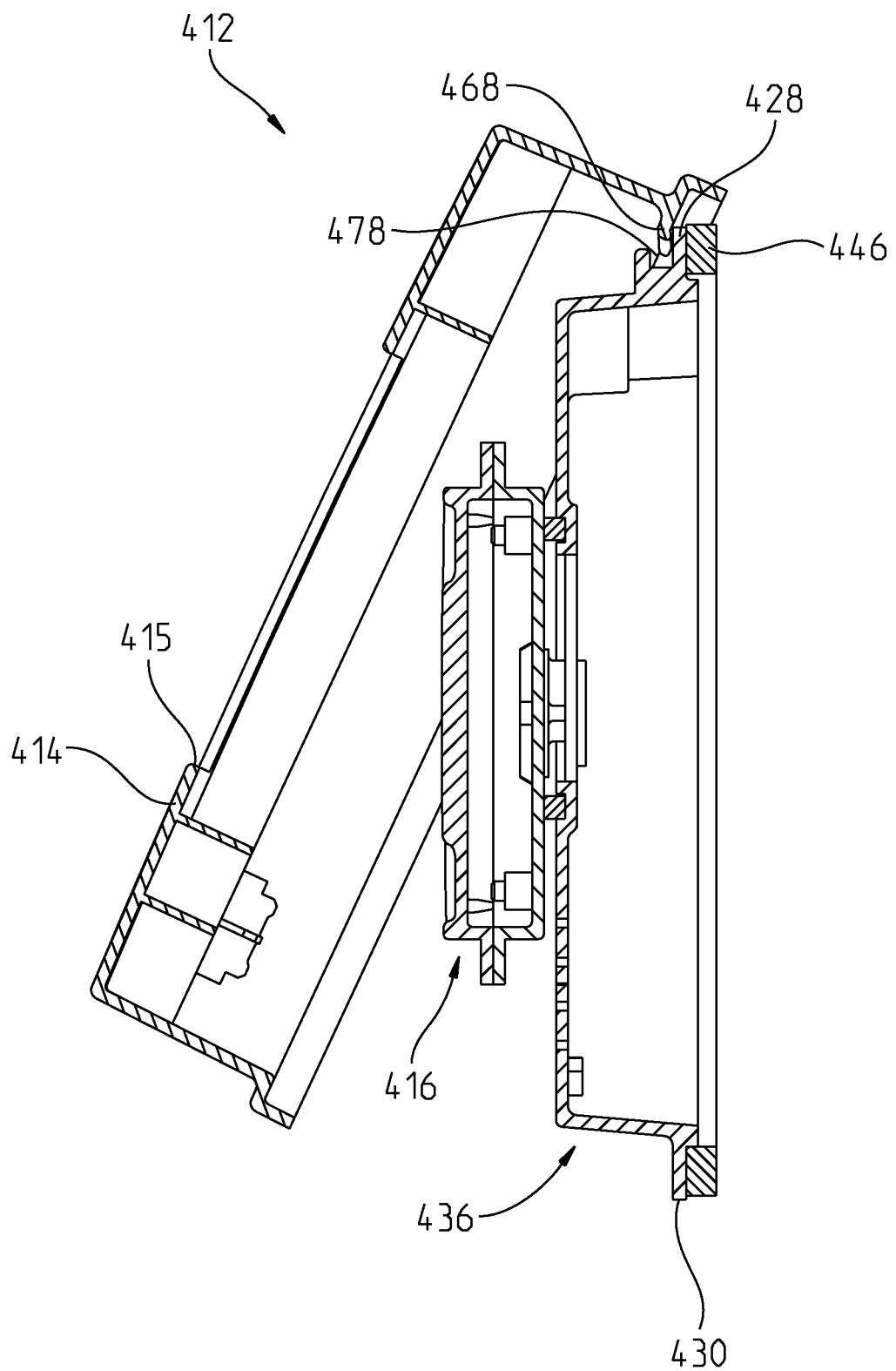
FIG. 32A is a cross-sectional view of the main user interface taken along line 32-32 of FIG. 27 and showing the hinge in an open position, wherein the escutcheon is non-parallel to the mounting base.
Figure 32B:
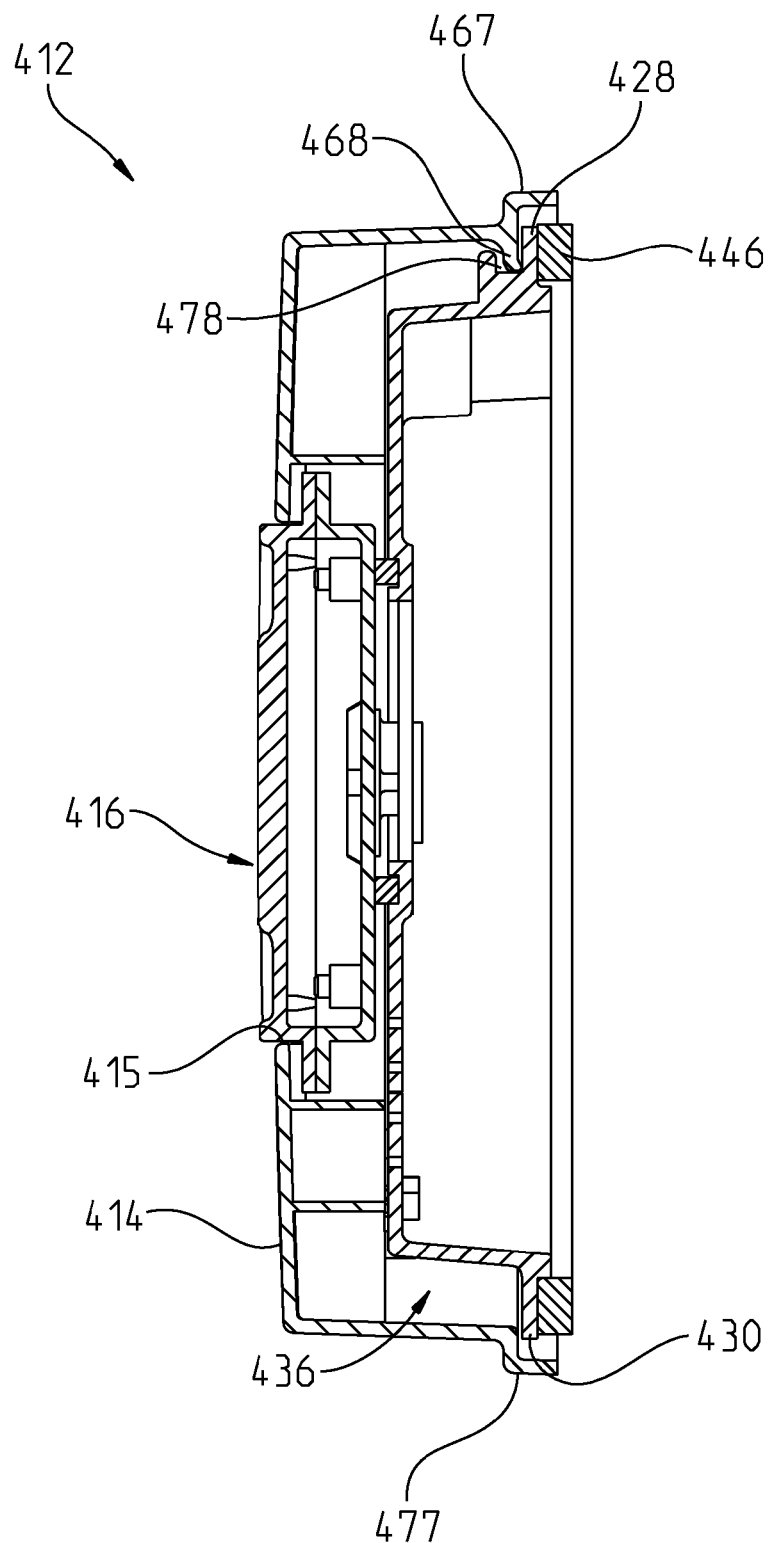
FIG. 32B is a cross-sectional view of the escutcheon mounting assembly taken along line 32-32 of FIG. 27 and showing the hinge in a closed position, wherein the escutcheon is parallel to the mounting base.
Figure 33:
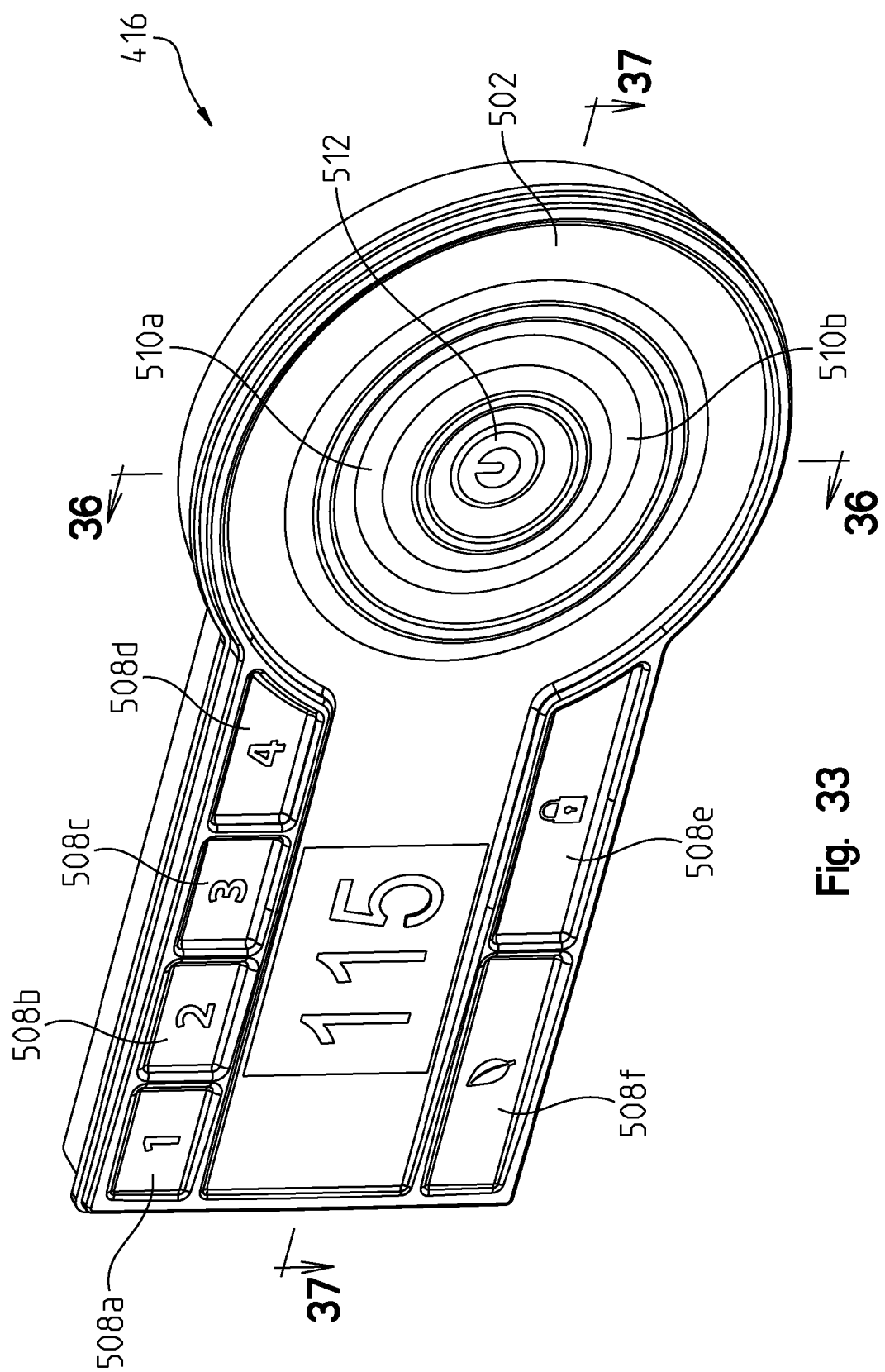
FIG. 33 is a perspective view of the main user interface module of FIG. 27.
Figure 34:
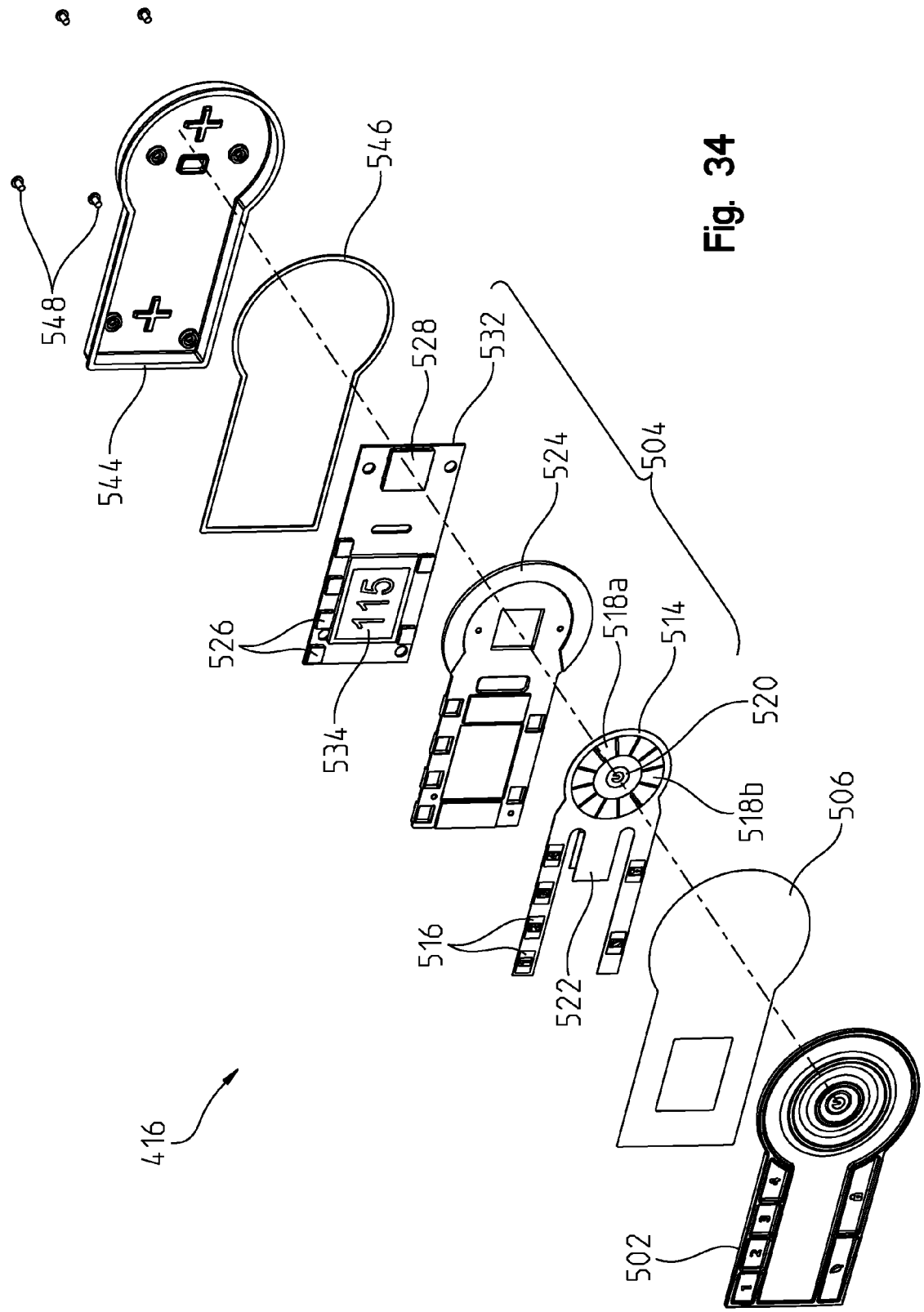
FIG. 34 is an exploded front perspective view of the user interface module of FIG. 33.
Figure 35:
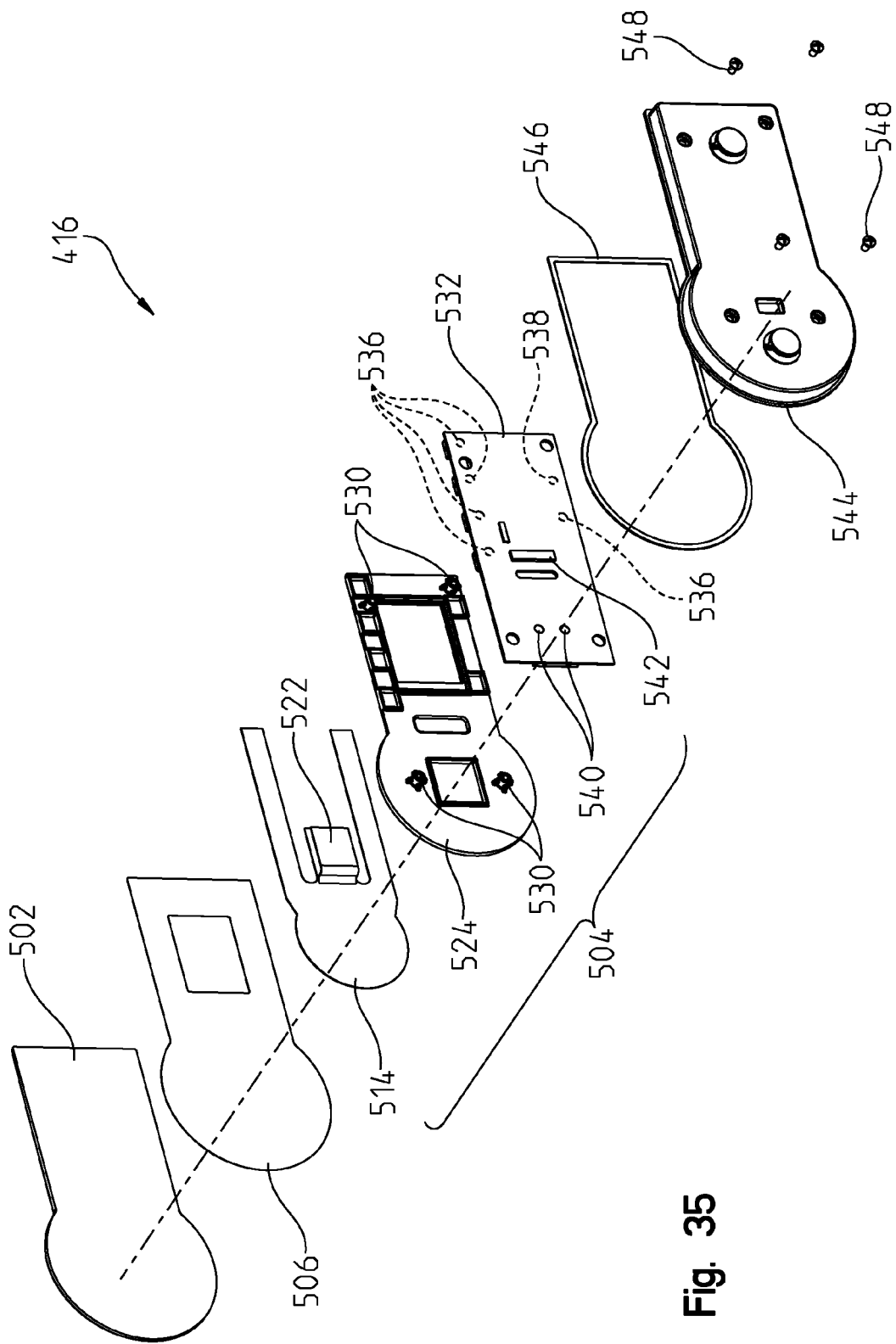
FIG. 35 is an exploded rear perspective view of the user interface module of FIG. 33.
Figure 36:
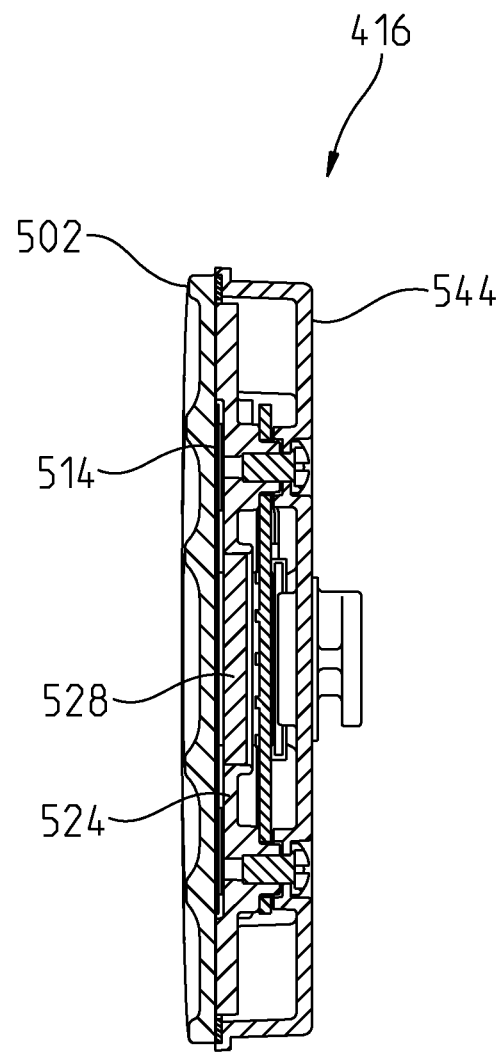
FIG. 36 is a cross-sectional view taken along line 36-36 of FIG. 33.
Figure 37:
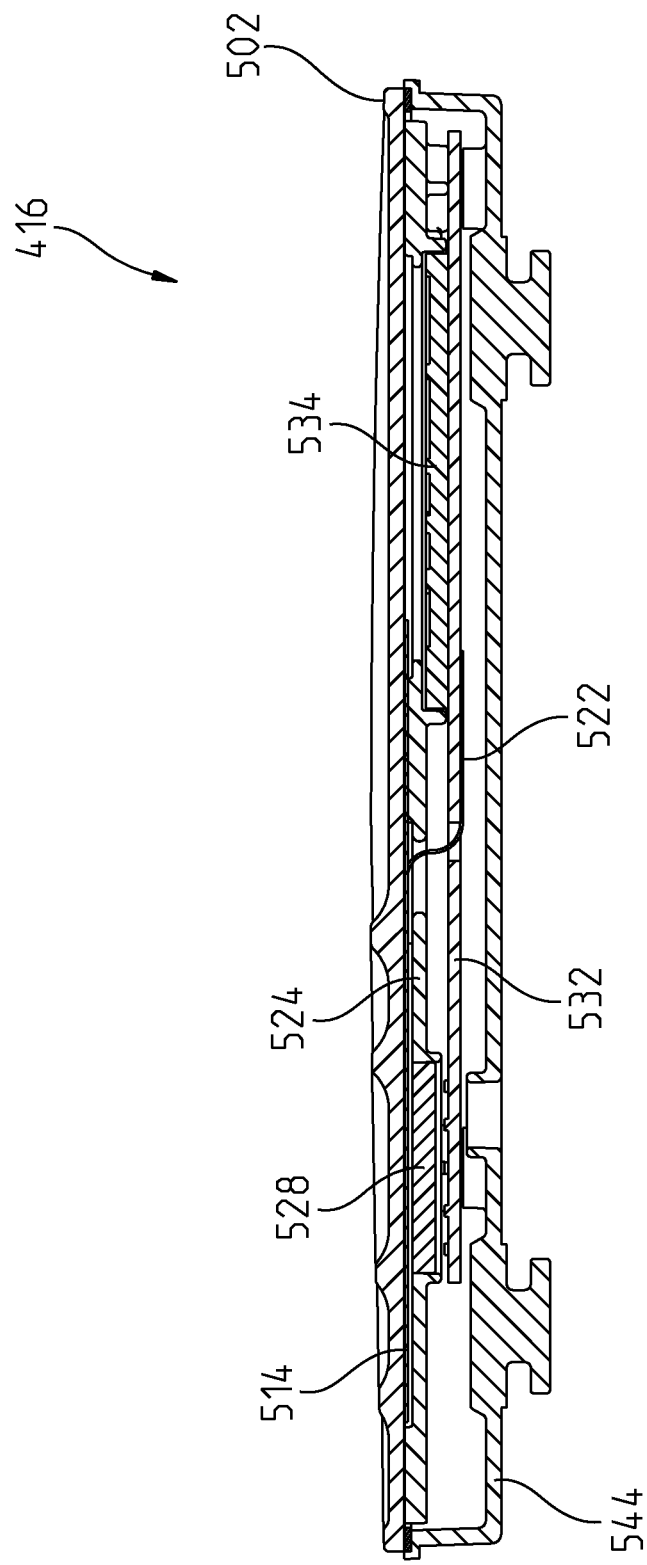
FIG. 37 is a cross-sectional view taken along line 37-37 of FIG. 33.
Figure 38:
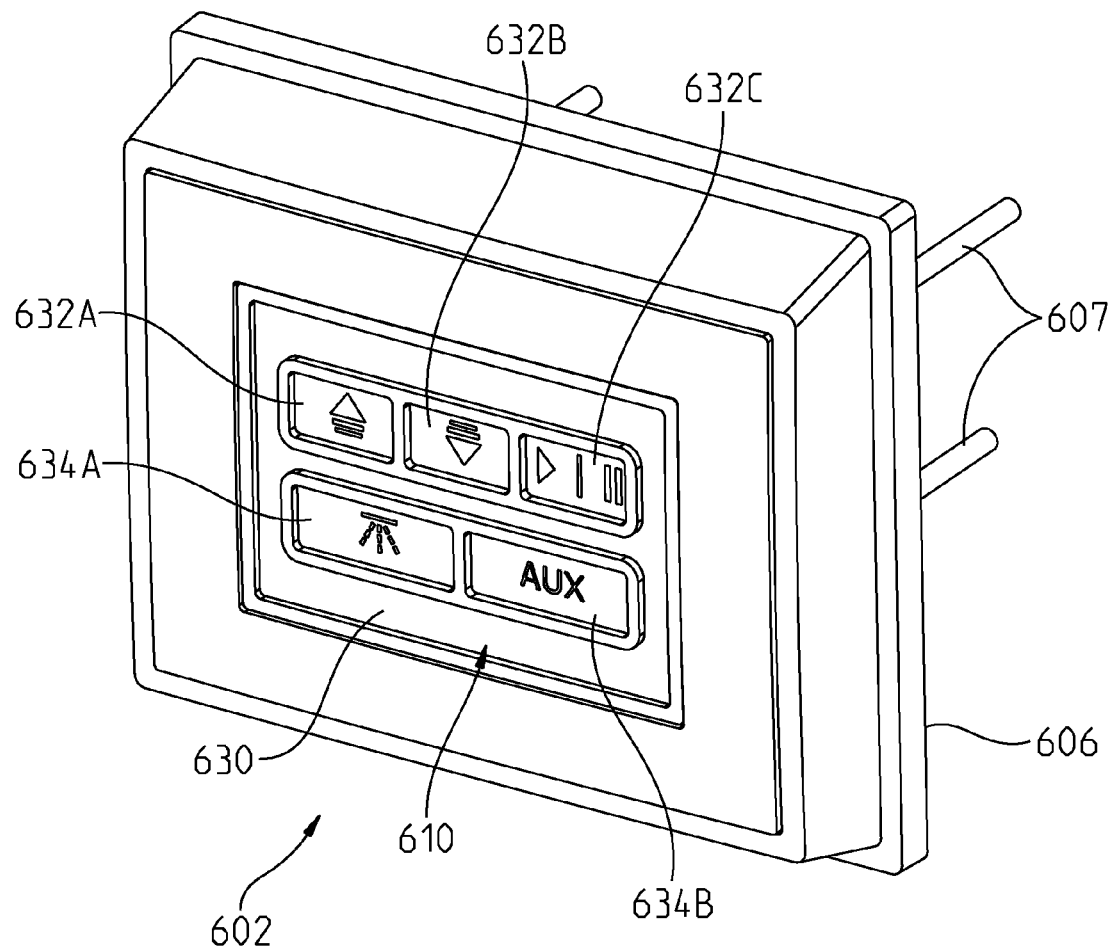
FIG. 38 is a front perspective view of an illustrative diverter valve assembly and diverter user interface.
Figure 39:
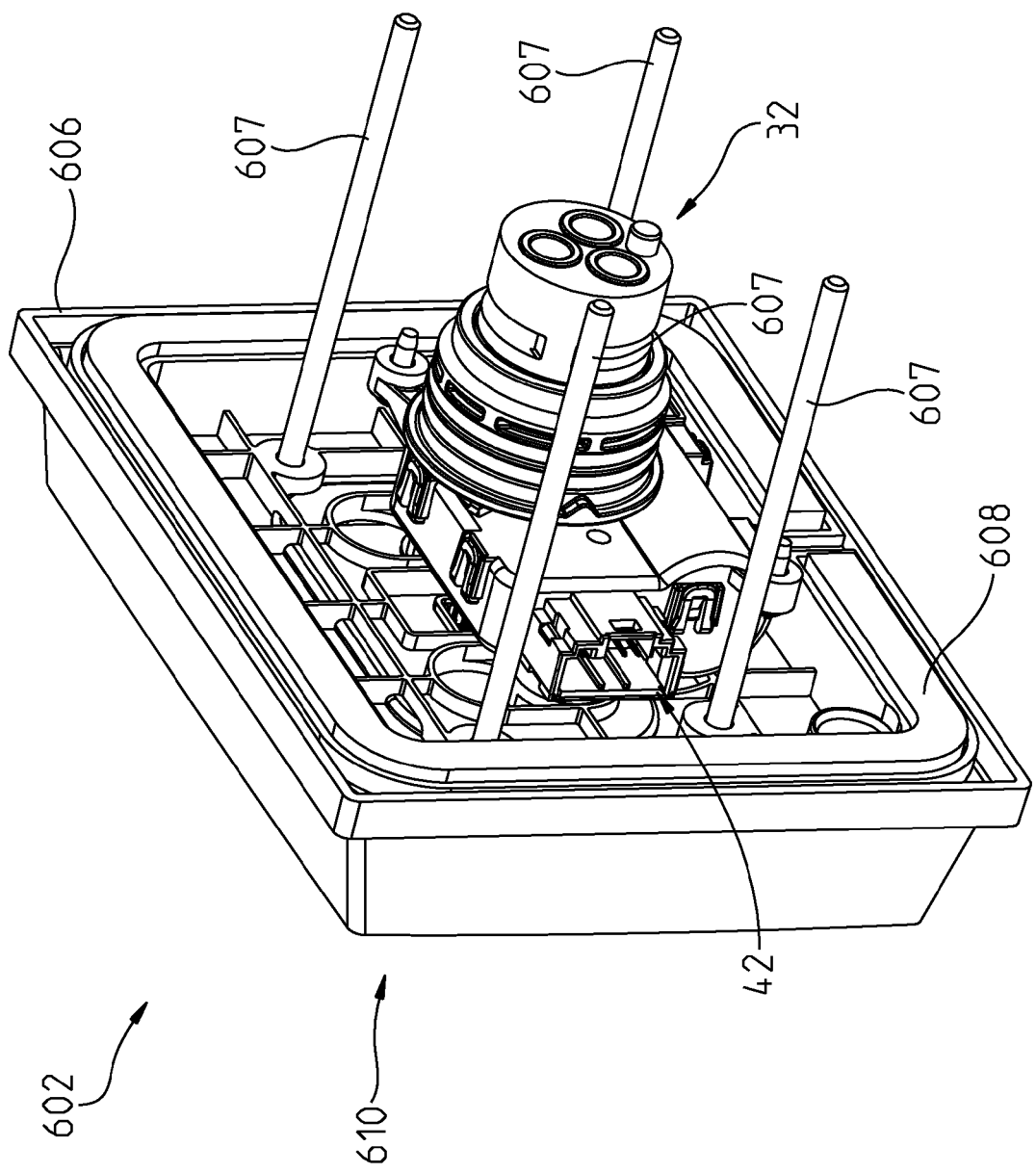
FIG. 39 is a rear perspective view of the diverter valve assembly and diverter user interface of FIG. 38.
Figure 40:
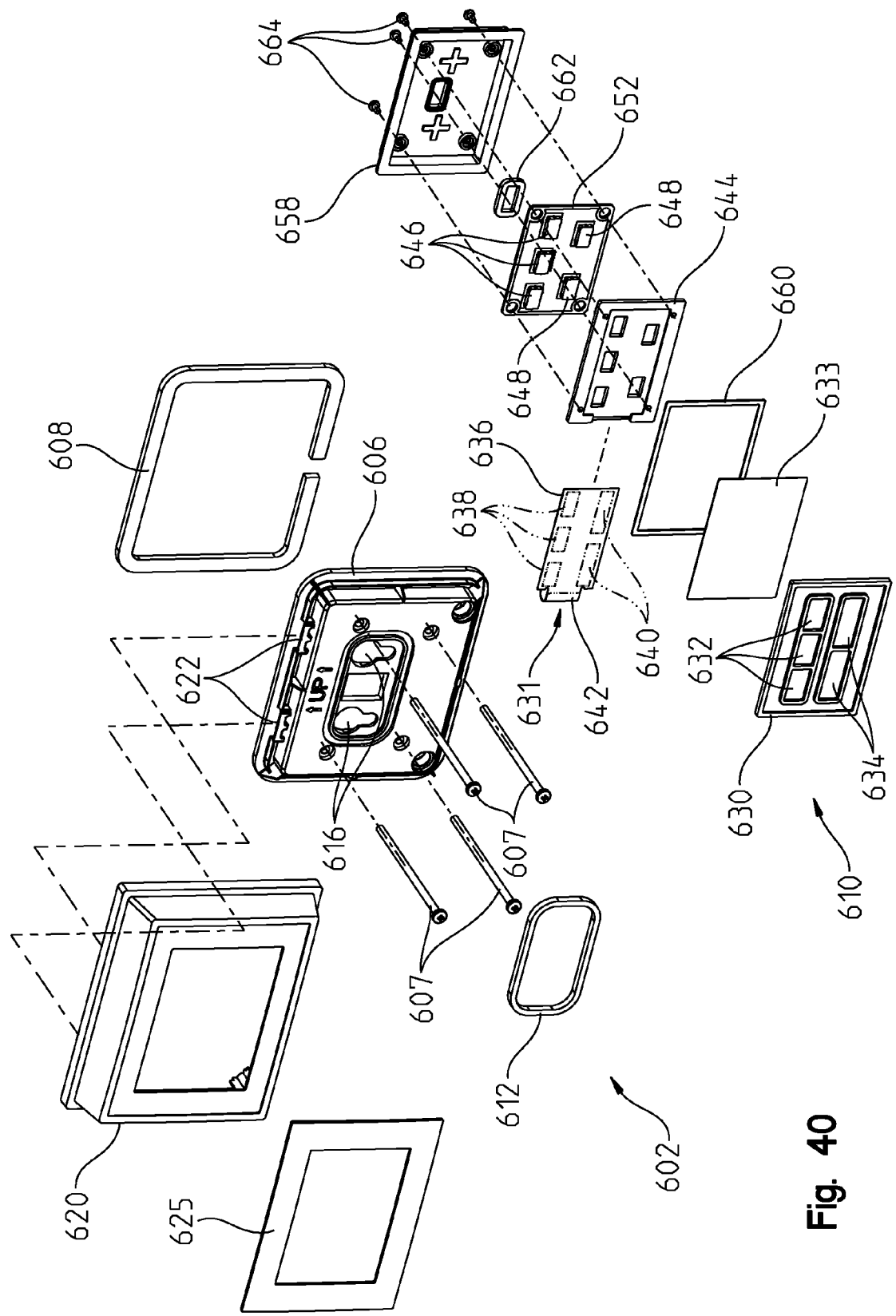
FIG. 40 is a front exploded perspective view of the diverter user interface and mount of FIG. 38.

Turning now to FIGS. 31 and 32, hinge 484 is defined by the protrusion 468 of the escutcheon 414 and the recess 478 of the base 436. The hinge 484 is movable between an open position (FIG. 32A) and closed position (FIG. 32B). The protrusions 468 proximate the upper edge 467 of the escutcheon 414 fit into the recesses 478 proximate the upper edge 428 of the mounting base 436 to form hinge 484. The hinge 484 pivotally couples the escutcheon 414 to the mounting base 436. FIG. 32A shows the hinge 484 in an open position, defined by the escutcheon 414 in a nonparallel position relative to the mounting base 436. When the hinge 484 is in the open position, the escutcheon 414 is supported by the base 436 at only the hinge 484. The magnets 438 and 440 and magnetically attractive elements 470 and 472 are not coupled together. The escutcheon 414 is configured to pivot at the hinge 484 and move downward toward the closed position, as shown in FIG. 32B.

More particularly, the closed position of the hinge 484 is defined by the escutcheon 414 in a parallel relation to the mounting base 436 (FIG. 32B). In the closed position, the escutcheon 414 is supported by both the hinge 484 proximate the upper edges 467 and 428 of the escutcheon 414 and the mounting base 436 and the magnetic coupling force resulting from the magnets 438 and 440 and the magnetically attractive elements 470 and 472 near the lower edges 430 and 477 of the mounting base 436 and the escutcheon 414.

The escutcheon mounting assembly 412 is illustratively assembled by attaching the mounting base 436 to vertical wall 56 through screws 424 and 426. Seal 446 is positioned intermediate the wall 56 and the mounting base 436. With the base 436 secured to the wall 56, seal 464 is positioned in engagement with the front face 466 of the mounting base 436 and is compressed by the attachment of the user interface 416 to the mounting base 436. The user interface 416 couples to the mounting base 436 through keyhole slots 456 and 458 and locking projections 460 and 462. Once the user interface 416 is secured to the mounting base 436, the escutcheon 414 is attached. The protrusions 468 proximate the upper edge 467 of the escutcheon 414 is received within the recesses 478 proximate the upper edge 428 of the mounting base 436. The escutcheon 414 is pivoted downwardly until the magnets 438 and 440 couple with the magnetically attractive elements 470 and 472. In this way, the escutcheon mounting assembly 412 is coupled proximate both the upper edges 428 and 467 and the lower edges 430 and 477 if the mounting base 436 and the escutcheon 414.

Additional details of the escutcheon mounting assembly 412 are disclosed in U.S. patent application Ser. No. 12/609, 489, filed Oct. 30, 2009, the disclosure of which is expressly incorporated by reference herein.

With reference to FIGS. 33-37, a further illustrative main user interface 14 includes multiple components received within a watertight enclosure defined by user interface module 416, which may be removably mounted to mounting bracket or base 436 on shower wall 56. Illustratively, a front panel 502 is coupled to an input member 504 through a transparent pressure sensitive adhesive (PSA) 506. The front panel 502 is illustratively formed of a translucent thermoplastic, such as an acrylic or polycarbonate. The front panel 502 includes a plurality of contact surfaces or buttons 508, 510, 512 to receive input from a user. Contact surfaces 510A and 510B are each arcuate, illustratively semi-circles together forming a circle surrounding a center contact surface 512.

The input member 504 illustratively comprises a flexible Mylar® board 514 containing capacitive or conductive touch pads 516, 518, 520 aligned with the contact surfaces 508, 510, 512 of the front panel 502. The touch pads 516, 518, 520 are in communication with electrically conductive traces (not shown). Illustratively, both the touch pads 516, 518, 520 and the traces are formed of a transparent conductive material, such as transparent silver or aluminum. In one illustrative embodiment, the touch pads 518 are formed in an arcuate pattern about a center pad 520. The traces electrically couple the pads 516, 518, 520 to a flexible connector tail 522.

The PSA 506 also holds an intermediate plastic mount 524 (illustratively formed of nylon), which receives diffusing members or lens 526, 528 (illustratively formed of silicone) as well as bosses 530 that define a mounting location for a printed circuit board (PCB) 532 and liquid crystal display (LCD) screen 534. The PCB board 532 is electrically coupled to controller 44, a plurality of LEDs 536, 538, 540, and LCD screen 534. LEDs 536 are illustratively blue, LED 538 is illustratively green, and LEDs 540 are illustratively bicolor (blue/red). The PCB board 532 includes a plurality of electrically conductive paths or traces that provide communication between the LEDs 536, 538, 540, the LCD screen 534, and the controller 44. The connector tail 522 of the board 514 is coupled to a connector 542 supported by the PCB board 532 and is in communication with the controller 44.

A back case 544 (illustratively formed of nylon) completes the assembly and may be secured to the front panel 502 by a foam seal 546 having adhesive on opposing faces. A plurality of screws 548 may also secure the front panel 502 to the back case 544 by entering from a back of the housing into bosses on the intermediate plastic mount 506. The PSA 506 and the foam seal 546 prevent water leakage between the back case 544 and the front panel 502.

Illustratively, a user contacting (or placing a finger in proximity to) one of the contact surfaces 508, 510, 512 activates a corresponding touch pad 516, 518, 520. Surfaces 508a-508d are presets for instructing controller 44 to adjust the mixing valve 20 and/or diverter valve 32 for a selected water temperature, flow rate, and outlet as previously stored in memory of the controller 44. Surface 508e provides a lockout function and surface 508f provides a warm-up function, as further detailed herein. Surfaces 510 permit a user to select a desired water temperature, wherein surface 510a causes an increase in temperature and surface 510b causes a decrease in temperature. User may simply touch (or place finger proximity to) the desired surface 510a, 510b to increase or decrease temperature. Alternatively, the user may sweep his or her finger in an arcuate path over the surfaces 510a, 510b in a clockwise direction to increase temperature and in a counter-clockwise direction to decrease temperature. The display 534 is configured to display the desired water temperature and actual water temperature as detected by the temperature sensor 46.

In an illustrative embodiment, the controller 44 is configured to detect and issue a low hot water warning alert to the user letting them know when the water heater is running out of water. The controller 44 accomplishes this low hot water detection and warning by monitoring the water temperature via the temperature sensor 46, and the position of the mixing valve 20 via the potentiometer 216. More particularly, the controller 44 is configured to detect a drop in measured water temperature in outlet 30 when the mixing valve 20 is in the full hot position. More particularly, the controller 44 is configured to provide an visual and/or audible warning to the user if it determines that the hot water available from the hot water supply 22 is being depleted. In the illustrative embodiment, a low hot water warning is illustratively provided under the following conditions:

1. The warm-up (or conserve) mode is used and a 100 degree warm-up (or conserve) outlet water temperature is not reached within 5 minutes (this shuts the system off instead of displaying the actual low hot water message)
2. The system has been on for 5 minutes, but is not able to maintain target outlet water temperature.
3. The system has been on for 5 or more minutes and has reached target outlet water temperature, but then drops below target outlet water temperature for 1 or more minutes.

The logic for determining if the controller 44 can maintain target temperature is: (valve position <100%) OR (actual temp within 1 deg of target temp) OR (temperature increasing >2 deg. per second). If any of the above conditions are true, then the hot water low warning will not occur.

The electronic shower system 10 is designed with backwards capability meaning that if some time in the future, the user wants to go to a mechanical system, the mixing valve 20 and the diverter valve 32 may be easily converted from an electronic shower to a manual system without changing any of the components of the rough assembly 70.

With reference to FIGS. 38-43, a further illustrative user interface 602 for use with the diverter valve drive 42 is shown. The electronic diverter user interface 602 includes a mounting plate 606 coupled to a removable user interface module 610. The mounting plate 606 which may be threadably attached to housing 81 (or similar wall mounted structure) by the use of screws 607. A sealing gasket 608 on the back side of the plate 606 seals against the finished wall 56 of the shower or tub enclosure. The mounting plate 606 may be caulked against the finished wall 56 to provide additional protection against leakage.

The user interface module 610 compresses a sealing gasket 612 to provide a seal against water leaking behind the wall. The user interface module 610 releasably locks into the mounting plate 606 by use of a locking protrusion or post 614 on the user interface module 610 being received within keyhole slots 616 in the plate 606. Tabs 618 within an escutcheon 620 engage into slots 622 on the mounting plate 606. Screws 623 threaded into the escutcheon 620 magnetically couple with magnets 624 mounted in the mounting plate 606 to affix the escutcheon 620 to the mounting plate

Figure 41:
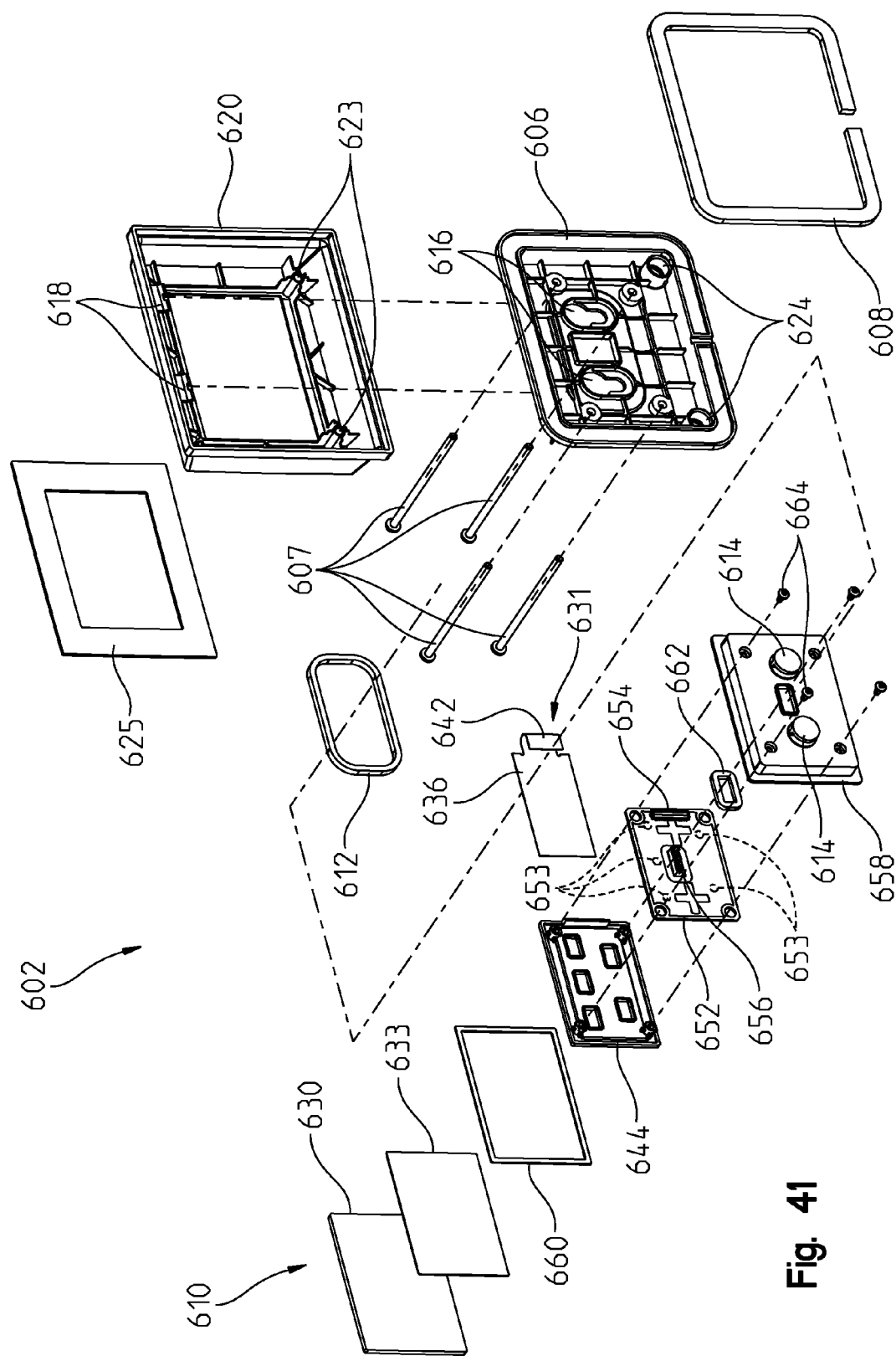
FIG. 41 is a rear exploded perspective view of the diverter user interface and mount of FIG. 38.
Figure 42:
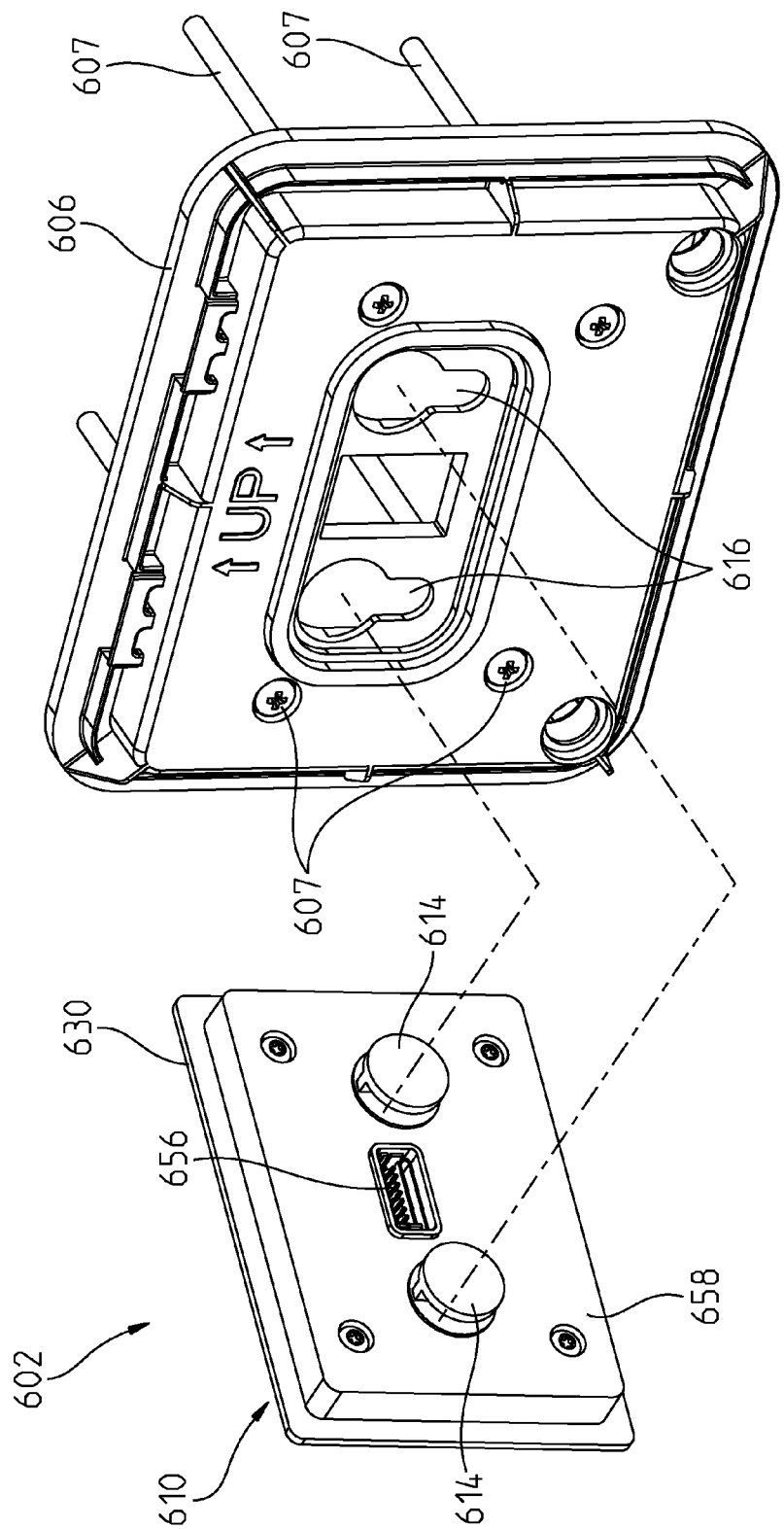
FIG. 42 is a perspective view showing the mounting configuration of the user interface of FIG. 41.
Figure 43:
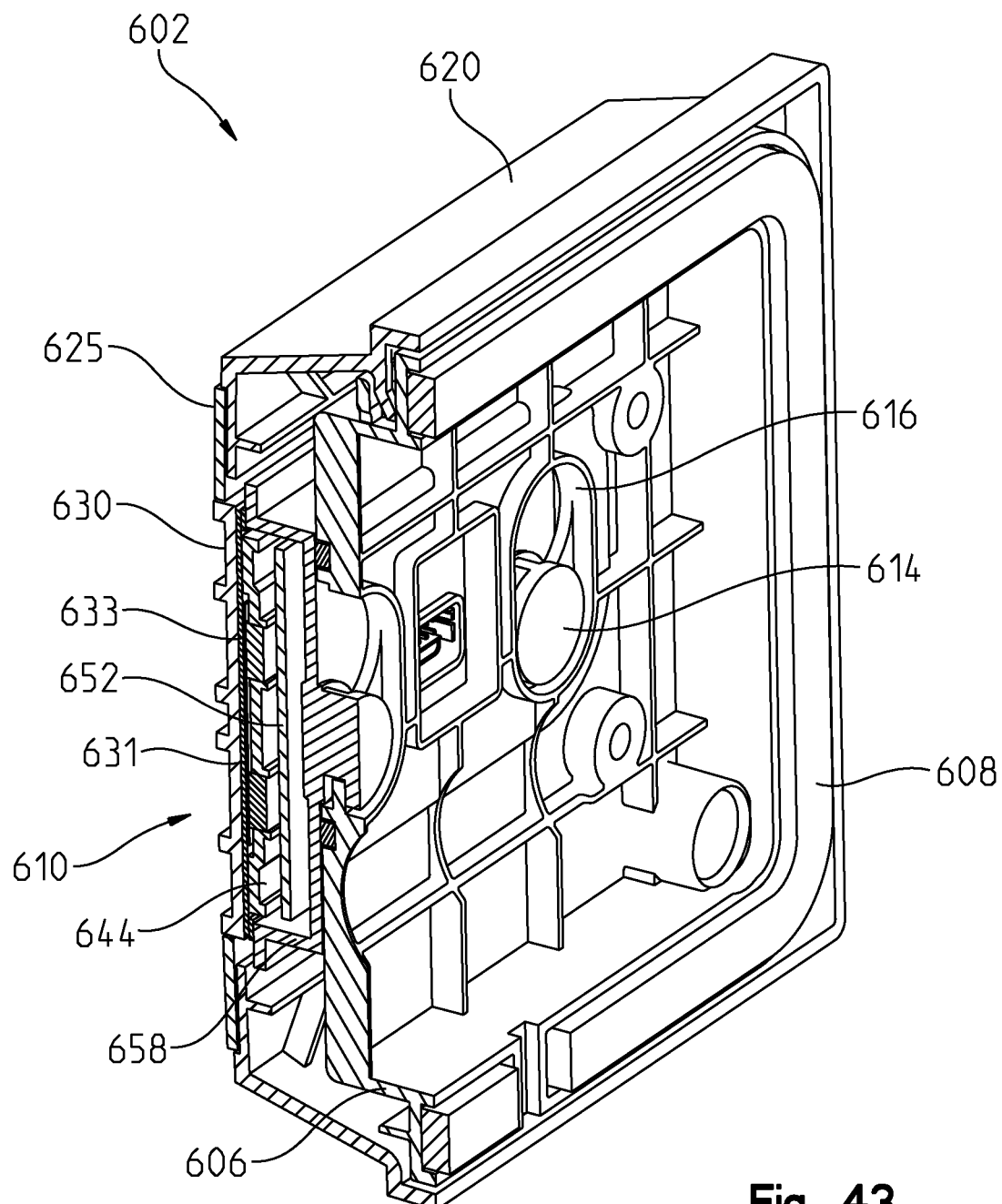
FIG. 43 is a cross-sectional view of the diverter user interface and mount of FIG. 38.

606 (FIG. 41). A trim piece 625 may be fixed to an outer surface of the escutcheon 620.

The diverter user interface module 610 includes multiple components received within a watertight enclosure which may be removably mounted to mounting bracket or base 606 on shower wall 56. Illustratively, a front panel 630 is coupled to an input member 631 through a transparent pressure sensitive adhesive (PSA) 633. The front panel 630 is illustratively formed of a translucent thermoplastic, such as an acrylic or polycarbonate. The front panel 630 includes a plurality of contact surfaces or buttons 632, 634 to receive input from a user.

The input member 631 illustratively comprises a flexible Mylar® board 636 containing conductive touch pads 638, 640 aligned with the contact surfaces 632, 634 of the front panel 630. The touch pads 638, 640 are in communication with electrically conductive traces (not shown). Illustratively, both the touch pads 638, 640 and the traces are formed of a transparent conductive material, such as transparent silver or aluminum. The traces couple the pads 638, 640 to a connector 642.

The contact surfaces 632, 634 and cooperating touch pads 638, 640 function similar to those detailed above in connection with the mixing valve user interface module 468. Button 632A may cause controller 44 to operate diverter valve drive 42 to increase flow rate, button 632B may cause controller 44 to operate diverter valve drive 42 to decrease flow rate, and button 632C may cause controller 44 to operate diverter valve drive 42 to pause flow. Button 634A may cause controller 44 to direct water to the first outlet 34, while button 634B may cause controller 44 to direct water to second outlet 36.

The PSA 633 also holds an intermediate plastic mount 644 (illustratively formed of nylon), which receives diffusing members or lens 646, 648 (illustratively formed of silicone) as well as bosses 650 that define a mounting location for a printed circuit board (PCB) 652. The PCB board 652 is coupled to controller 44 and supports a plurality of LEDs 653. LEDs 653 are illustratively blue. The PCB board includes a plurality of electrically conductive paths or traces (not shown) that provide communication between the LEDs and a receptacle connector 654. The connector 642 of the board 636 is coupled to connector 654 supported by the PCB board 652 and is in communication with the controller 44 through a connector 656 (FIG. 41).

A back case 658 (illustratively formed of nylon) completes the assembly and may be secured to the front panel 630 by a foam seal 660 having adhesive on opposing faces. A foam seal 662 is illustratively received around the connector 656 intermediate the support panel 652 and the rear case 658. A plurality of screws 664 may also secure the front panel 630 to the back case 658 by entering from a back of the housing into bosses on the intermediate plastic mount 644. The PSA 633 and the foam seals 660 and 662 prevent water leakage between the back case 658 and the front panel 630.

Figure 46:
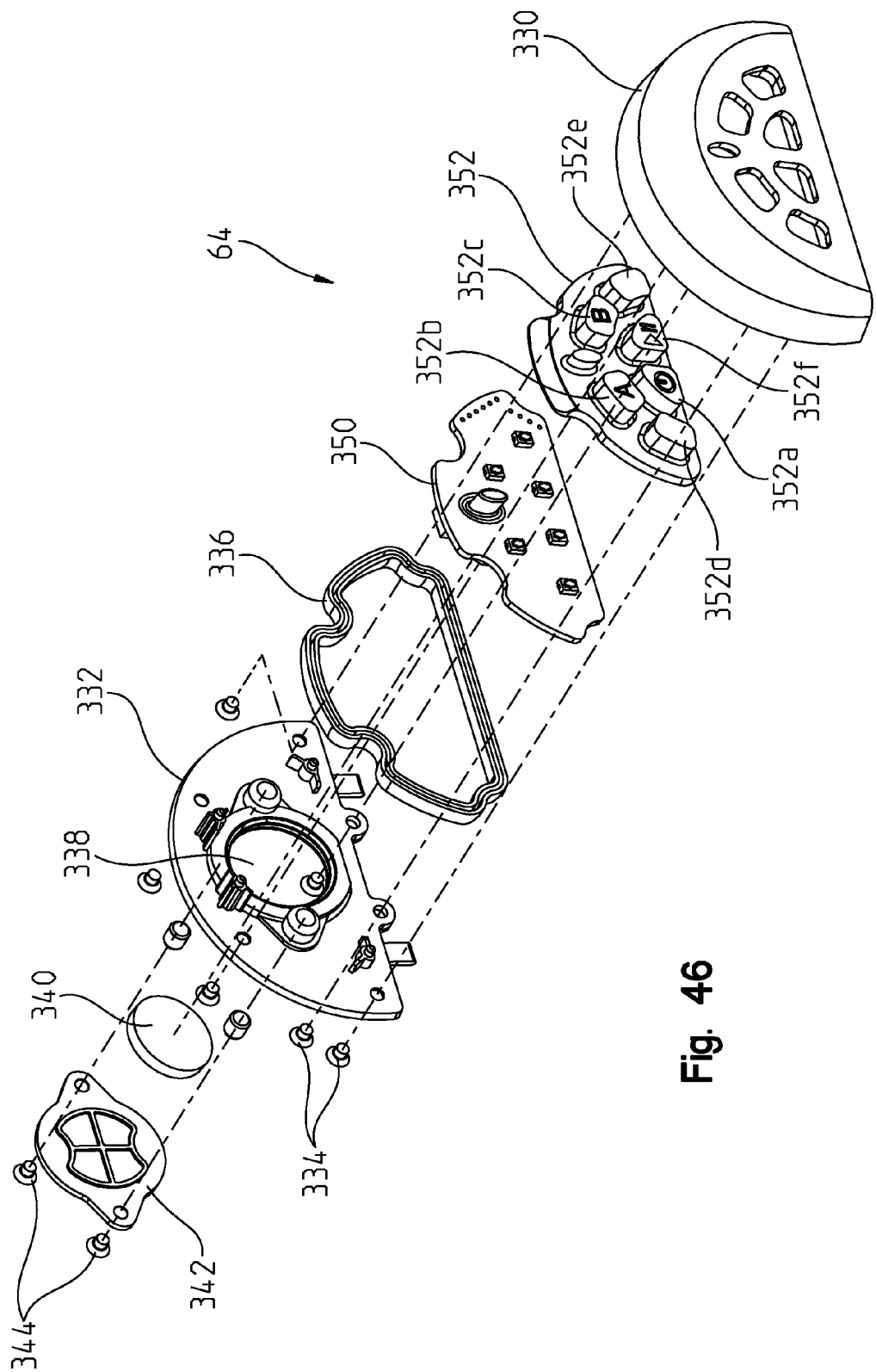
FIG. 46 is an exploded perspective view of the hand shower user interface.
Figure 47:
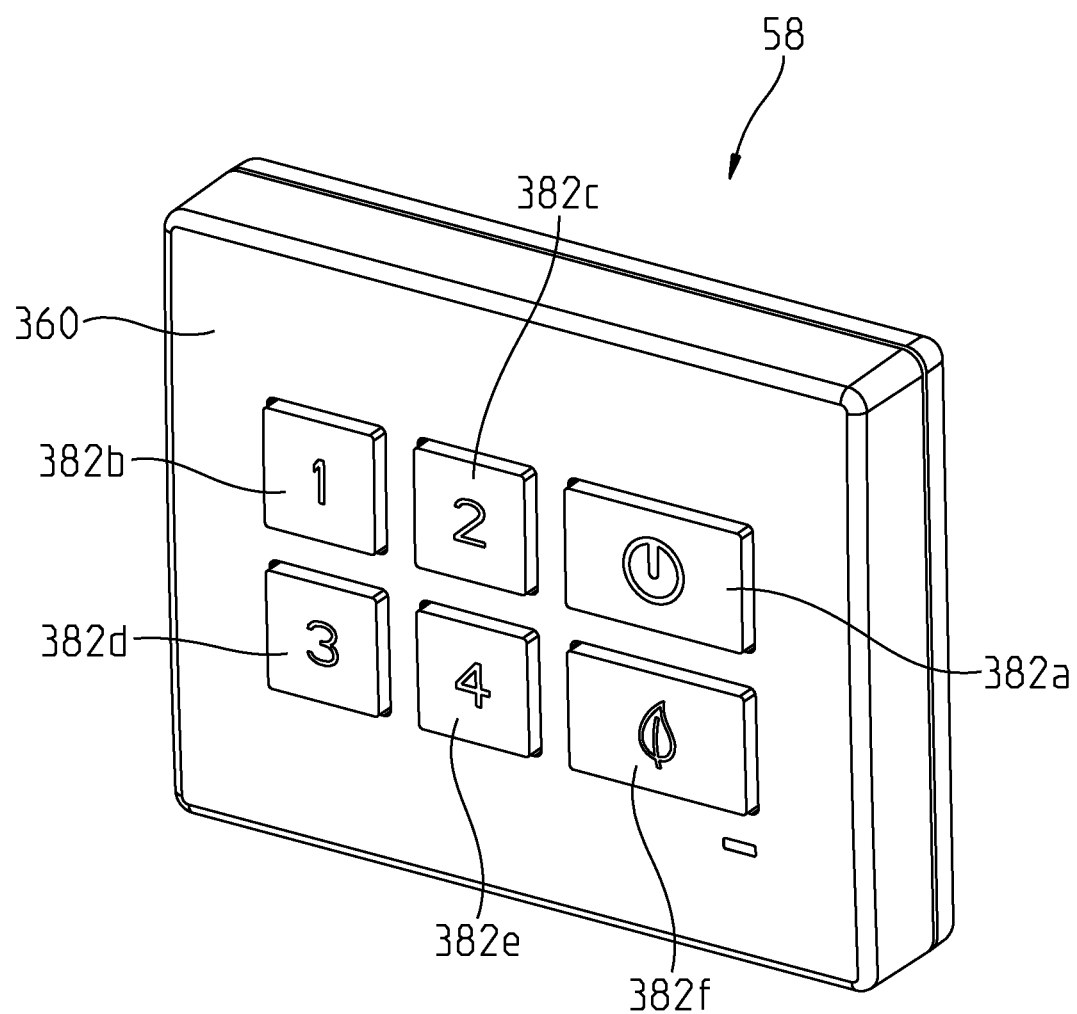
FIG. 47 is a perspective view of the remote control assembly of the electronic shower system of FIG. 2.
Figure 48:
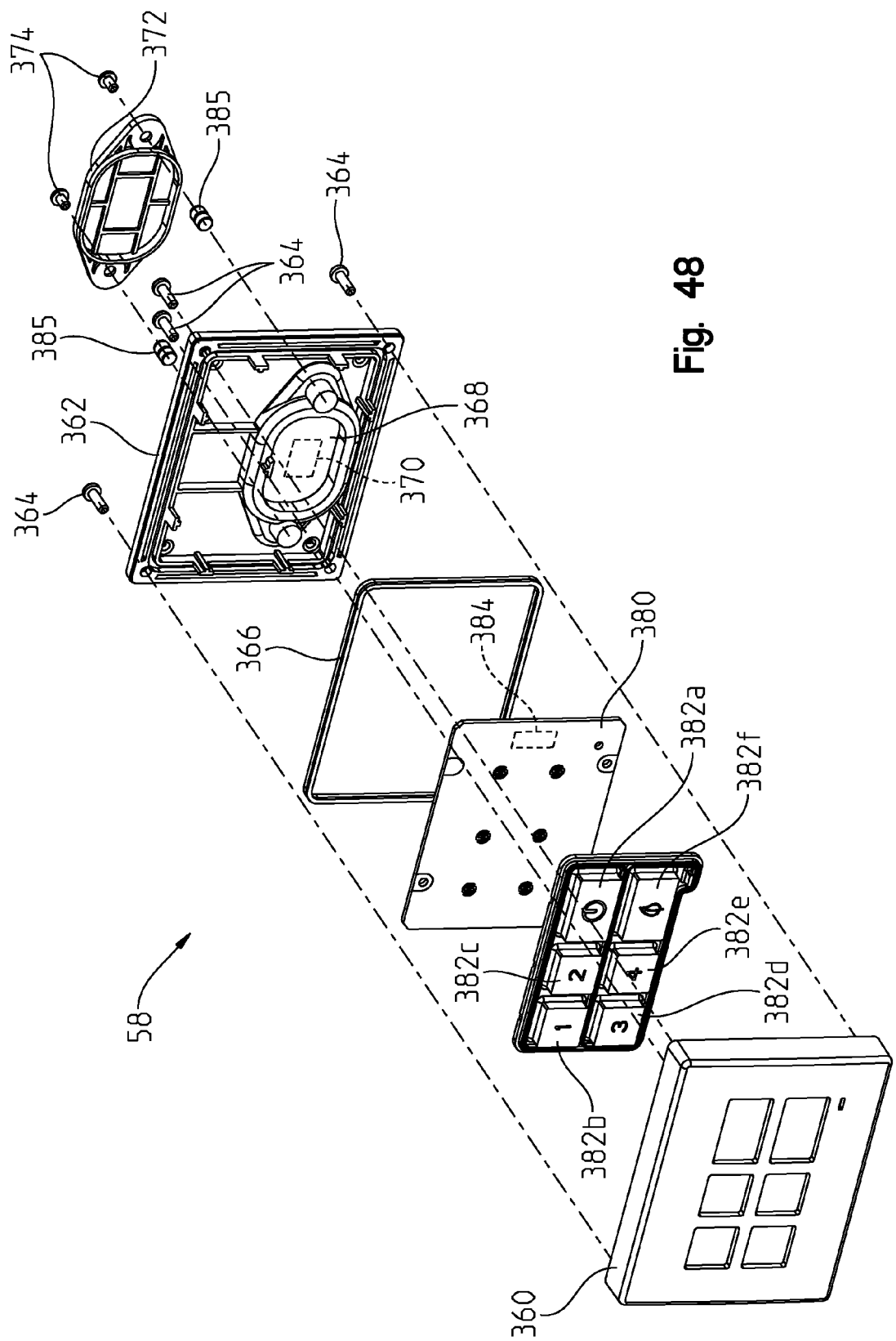
FIG. 48 is an exploded perspective view of the remote of FIG. 47.

With reference to FIGS. 46-48, an illustrative hand shower 52 is shown as including a handle 320 and a sprayhead 322. Water flow is configured to selectively flow from outlet 286 of diverter valve 32 to an inlet 324 in the handle 320 and to outlets 325 in the sprayhead 322. Conventional spray mode selector buttons 326 are provided on the rear of the sprayhead 322 to control mechanical valves in the hand shower 52 for alternating spray patterns, for example between spray, stream and pulsated stream. Hand shower user interface 64 may be removably coupled to the hand shower 52 as shown in FIG. 47. More particularly, protrusions or posts 327 on the user interface 64 are configured to be releasably coupled within keyhole slots 329 on the sprayhead 322.

With reference to FIG. 48, the hand shower user interface 64 illustratively includes a housing 328 defined by a front case 330 and a rear case 332 secured to the front case 330 by a plurality of screws 334. A gasket 336 seals the front case 330 and rear case 332. A battery compartment 338 receives a battery 340 and is defined by a battery cover 342 removably coupled to the rear case 332 through screws 344. The battery 340 provides power to a control board 350, illustratively a printed circuit board (PCB). Input buttons 352 interface with the control board and include a power button 352*a*, preset button A 352*b*, preset button B 352*c*, hot water button 352*d*, cold water button 352*e*, and pause/play button 352*f*. The control board 350 supports a transmitter 354 for providing wireless communication with the transceiver 227 of the controller 44.

Figure 44:
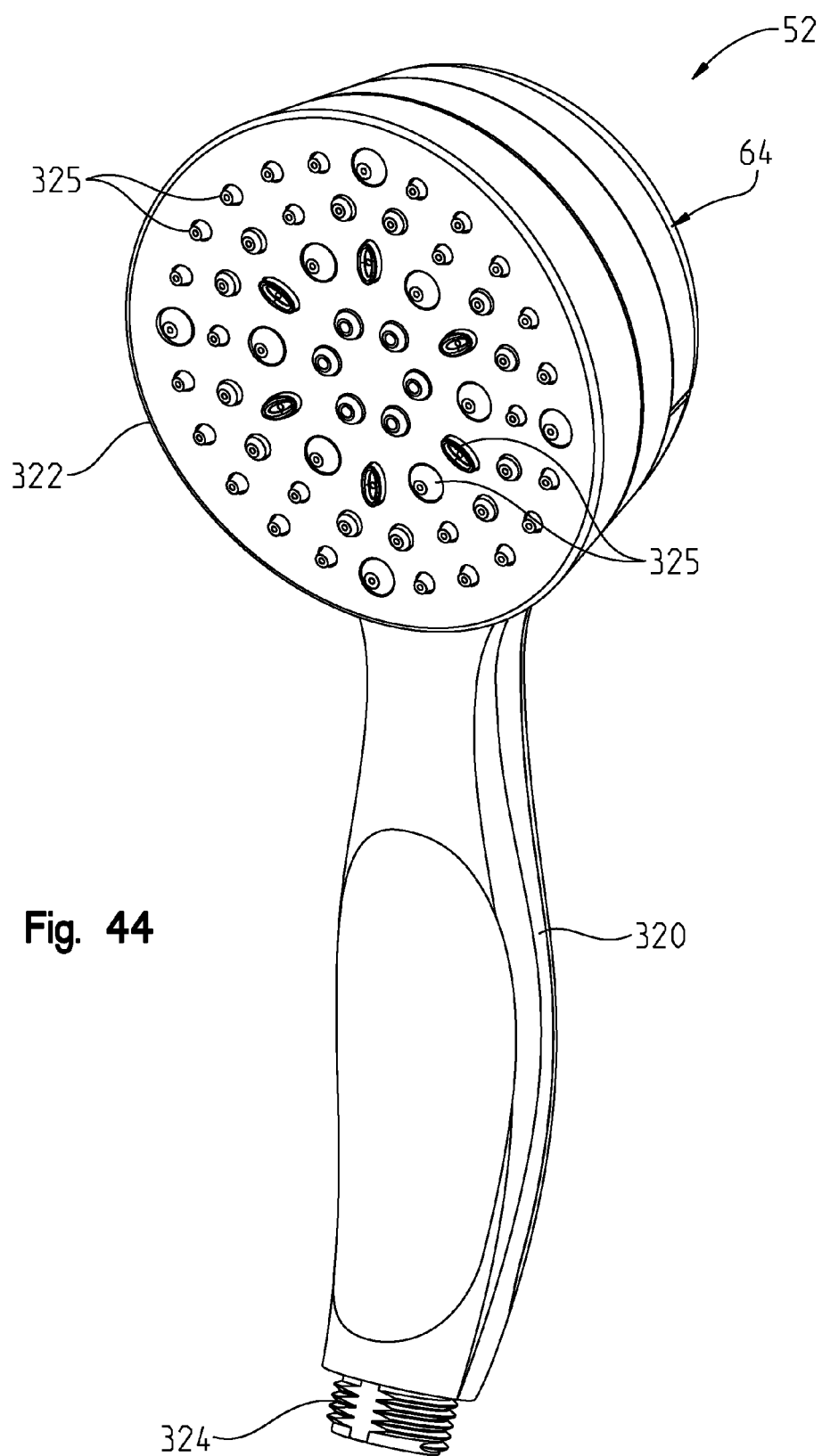
FIG. 44 is a front perspective view of the hand shower of the electronic shower system of FIG. 2.
Figure 45:
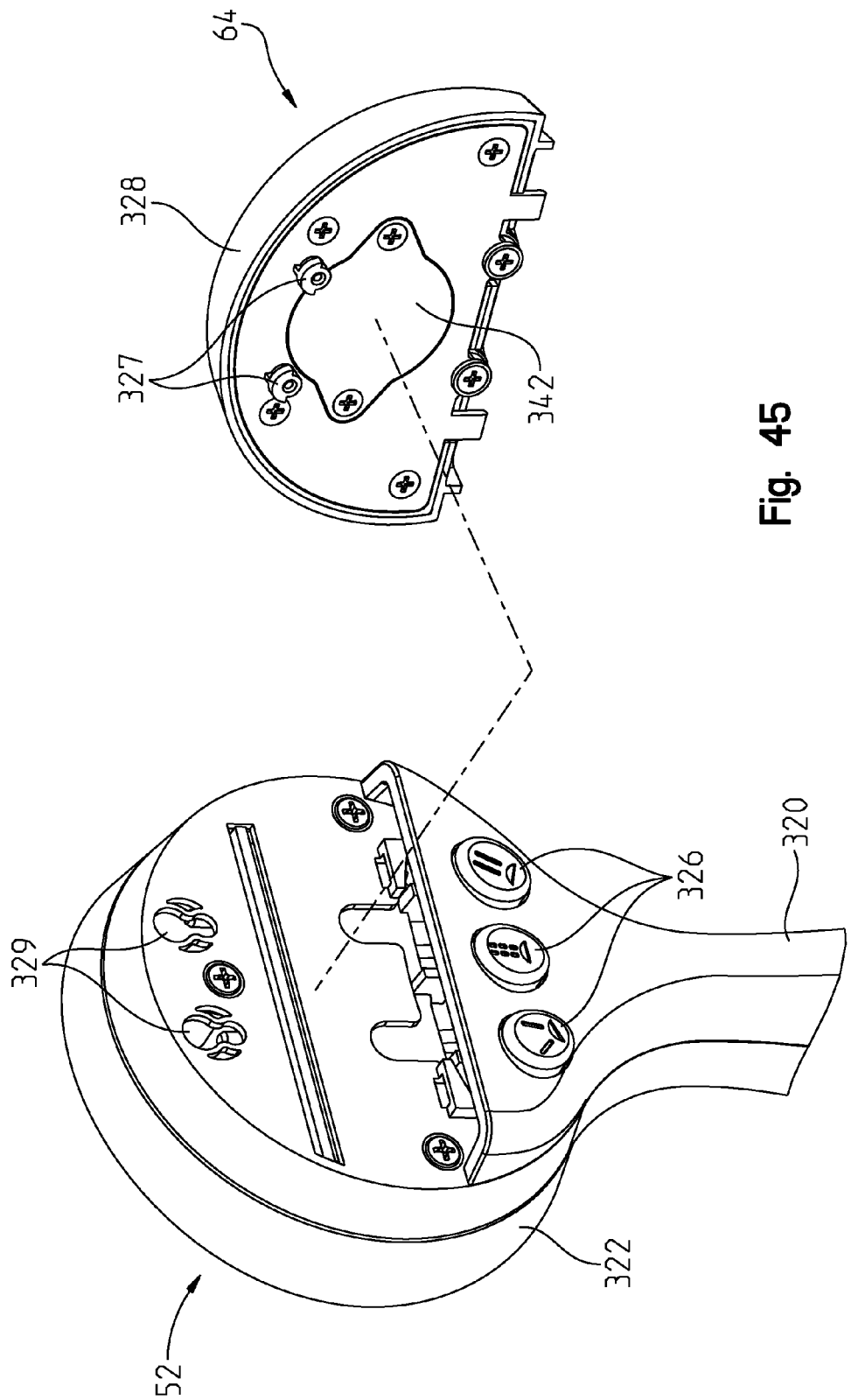
FIG. 45 is a partially exploded rear perspective view of the hand shower of FIG. 44.

The remote user interface 58 is shown in FIGS. 44 and 45 as including a front case 360 and a rear case 362 secured to the front case 360 by a plurality of screws 364. A gasket 366 seals the front case 360 and rear case 362. A battery compartment 368 receives a battery 370 and is defined by a battery cover 372 removably coupled to the rear case 362 through screws 374. The battery 370 provides power to a control board 380, illustratively a printed circuit board (PCB). Input buttons 382 interface with the control board and include a power button 382*a*, preset buttons 1-4 382*b*-382*e*, respectively, and warm-up button 382*f*. The control board 380 supports a transmitter 384 for providing wireless communication with the transceiver 227 of the controller 44. Magnets 385 may be supported by the rear surface of the rear case 360 for securing front case 360 thereto or for coupling the remote user interface 58 to an external mounting surface, such as bracket 60.

In the illustrative electronic shower system 10, there is no direct mechanical connection between the main user interface 14 and flow control assembly 12, particularly the drive assembly 18. A conventional wire harness is the only thing that physically connects the user interface 14 to the drive assembly 18 allowing installation within walls 56 having considerable amount of variation in thickness. The length of the screws 377 will be the determining factor for how much wall thickness may be accommodated. While in the illustrative embodiment, the main user interface 14 (including mounting plate 376 and user interface module 390) are mounted in axial alignment with the rough assembly 70, the user interface 14 may be mounted remotely from the rough assembly 70.

The electronic shower system 10 allows for a quick change over to a mechanical style valve should the electronic version not be desired down the road. The portion of the system 10 behind the wall 56 would not need to be replaced.

While the illustrative drive assembly 18 of the electronic shower system 10 is powered and controlled a microprocessor coupled to the main user interface 14, the drive assembly 18 may be designed as a stand-alone unit that could have its own power source and microprocessor. The drive assembly 18 may also can have multiple motors with individual shut off ports (i.e. head valves) to accomplish the same functions or if volume control was not important, solenoid valves can be used to turn water on and off to individual, or any combination, of ports. Should solenoid valves be used, a screen would be needed to filter debris in the water to protect the pilot orifices.

Figure 52:
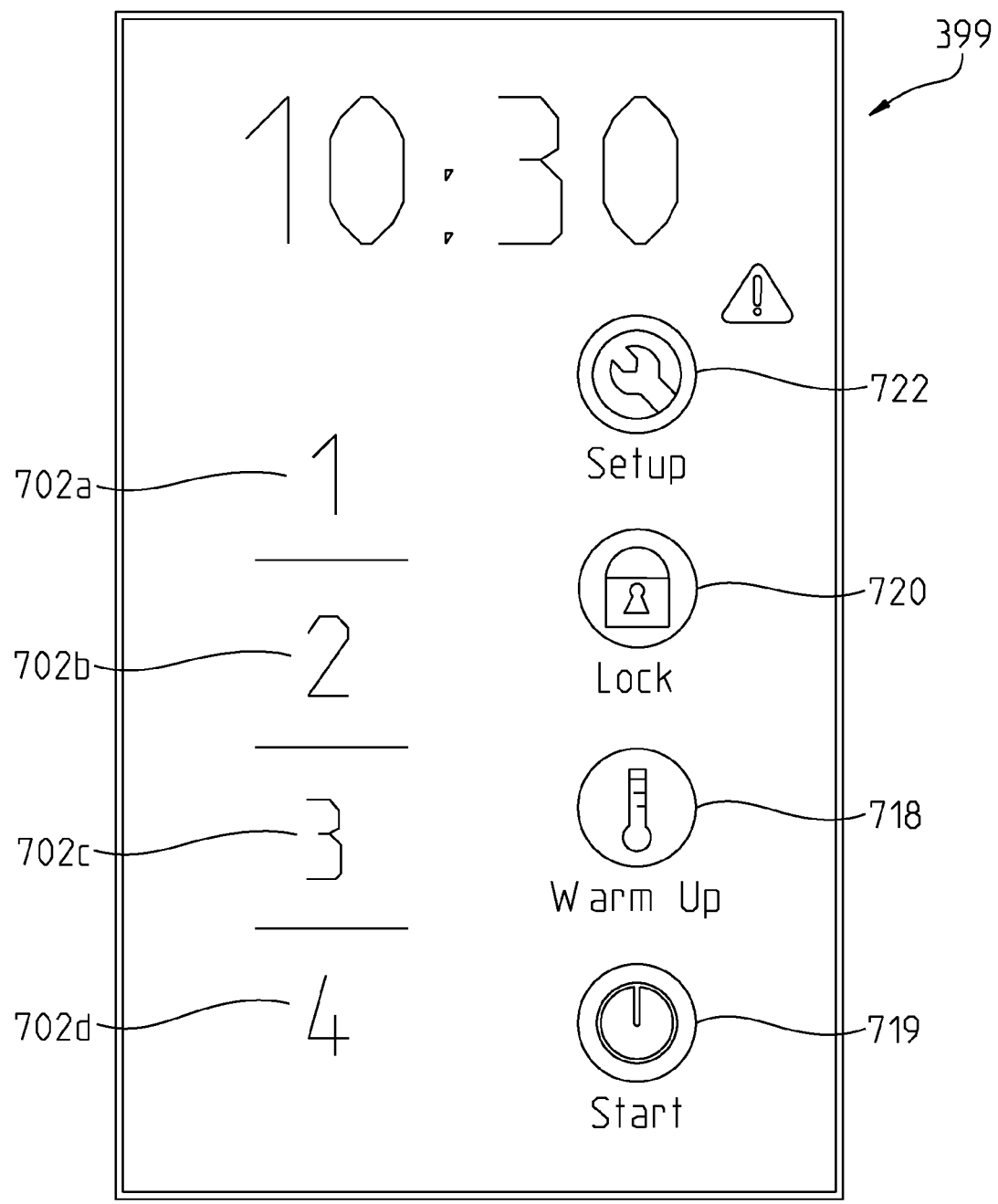
FIG. 52 shows an illustrative display on the touch screen of the main user interface, when the electronic shower system is in an OFF mode.
Figure 53:
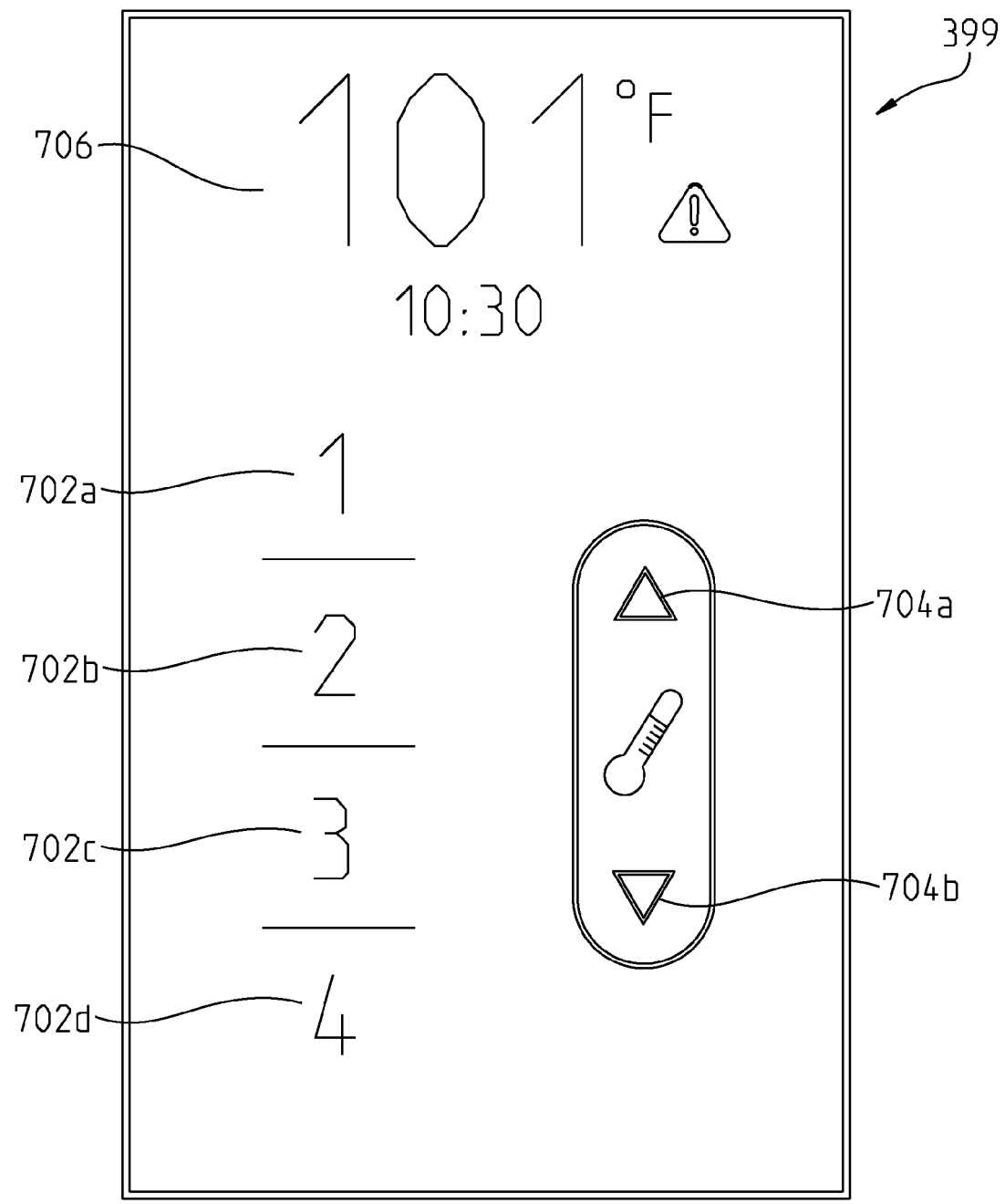
FIG. 53 shows an illustrative display on the touch screen of the main user interface, when the electronic shower system is in an ON mode, and includes a mixing valve but no diverter valve.
Figure 54:
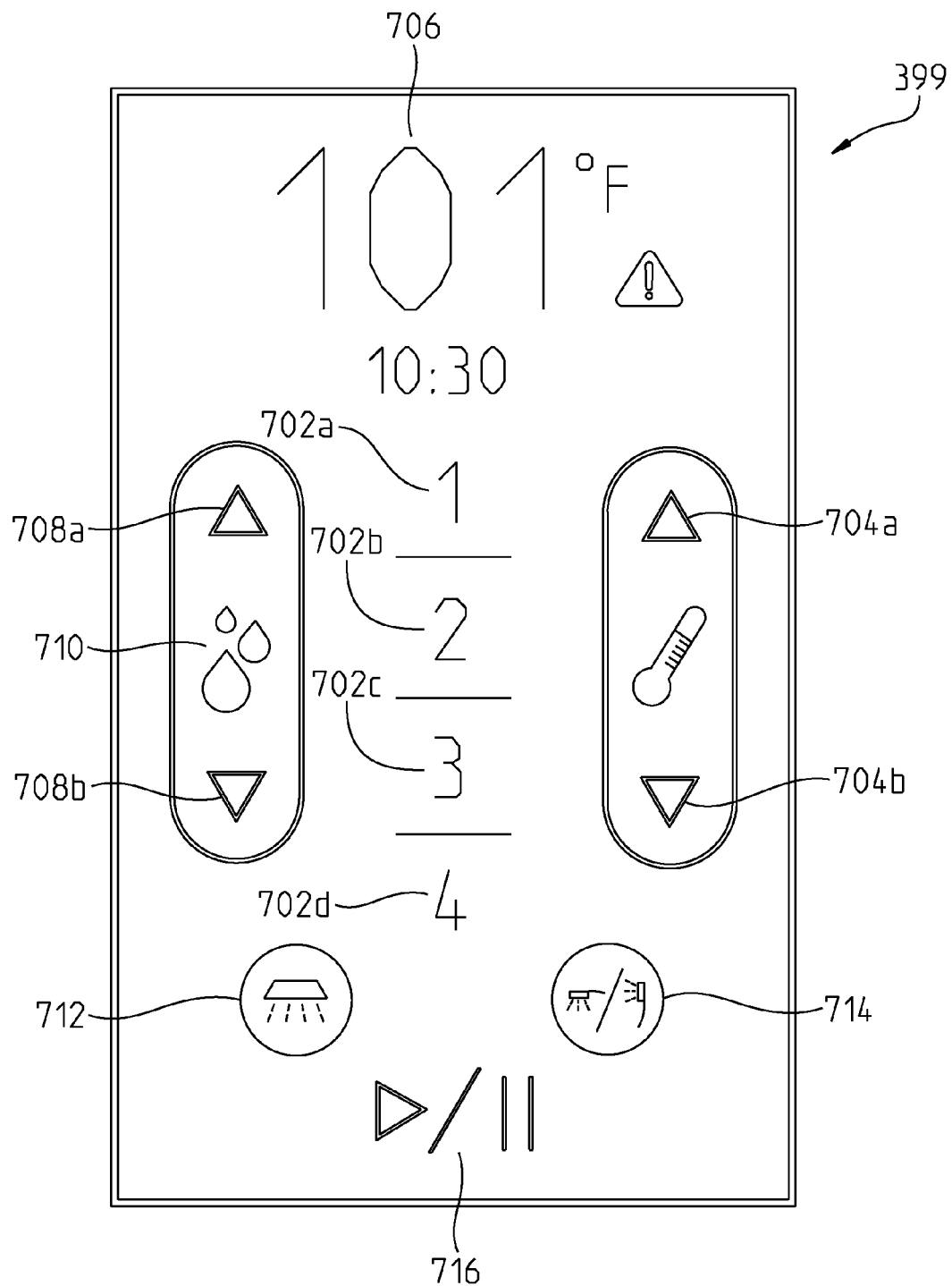
FIG. 54 shows another illustrative display on the touch screen of the main user interface, when the electronic shower system is in an ON mode, and includes a mixing valve and a diverter valve.

An illustrative method of operation of the main user interface is shown in FIGS. 46A-46J. The system may be activated from the main user interface by input through the push button or the touch screen 399. Standard images that may be displayed on the touch screen 399 are shown in FIGS. 52-54, where FIG. 52 shows an OFF mode, FIG. 53 shows a first ON mode (with no diverter valve 32 present), and FIG. 54 shows a second ON mode (with both a diverter valve 32 and a mixing valve 20 present).

Figure 49A:
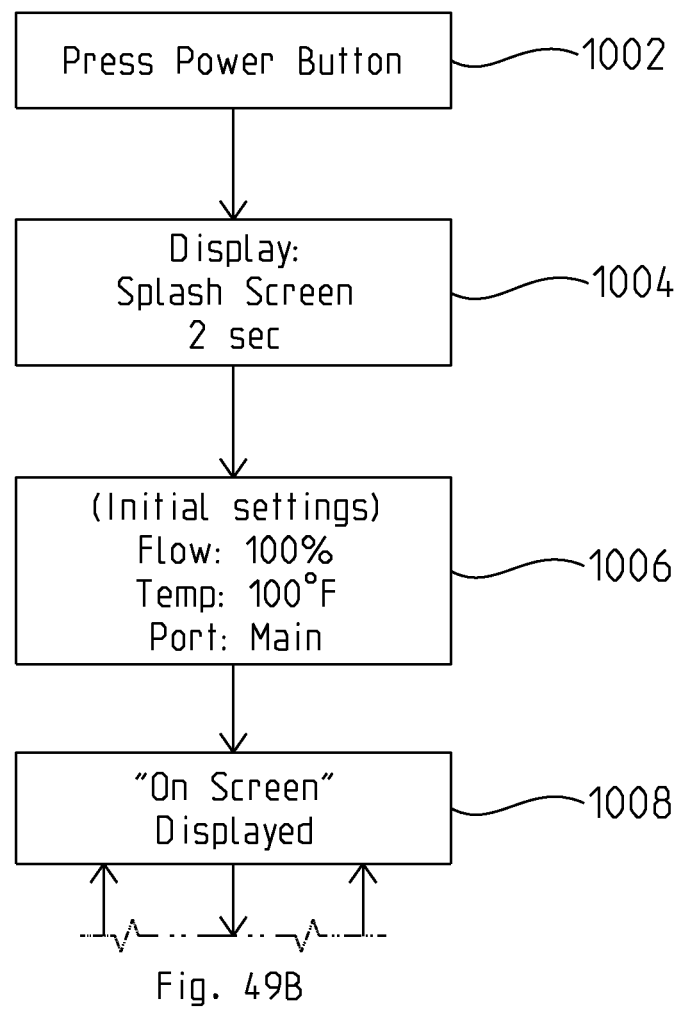

Beginning with block 1002 of FIG. 49A, if a user physically depresses the power button when the system is off or deactivated, the touch screen 399 will display an introductory image (e.g., a splash image) for a predetermined time, illustratively two seconds. At block 1006, the controller 44 provides for initial settings, illustratively a full or 100 percent flow rate, a 100 degree water temperature, and a selected outlet of the main port (e.g., the first fluid outlet 34 or overhead shower 50). At block 1008, the appropriate ON mode images (FIG. 53 or 54) are displayed on the user interface touch screen 399 (based upon whether the electronic shower system 10 includes a diverter valve 32, as further detailed herein).

Figure 49B:
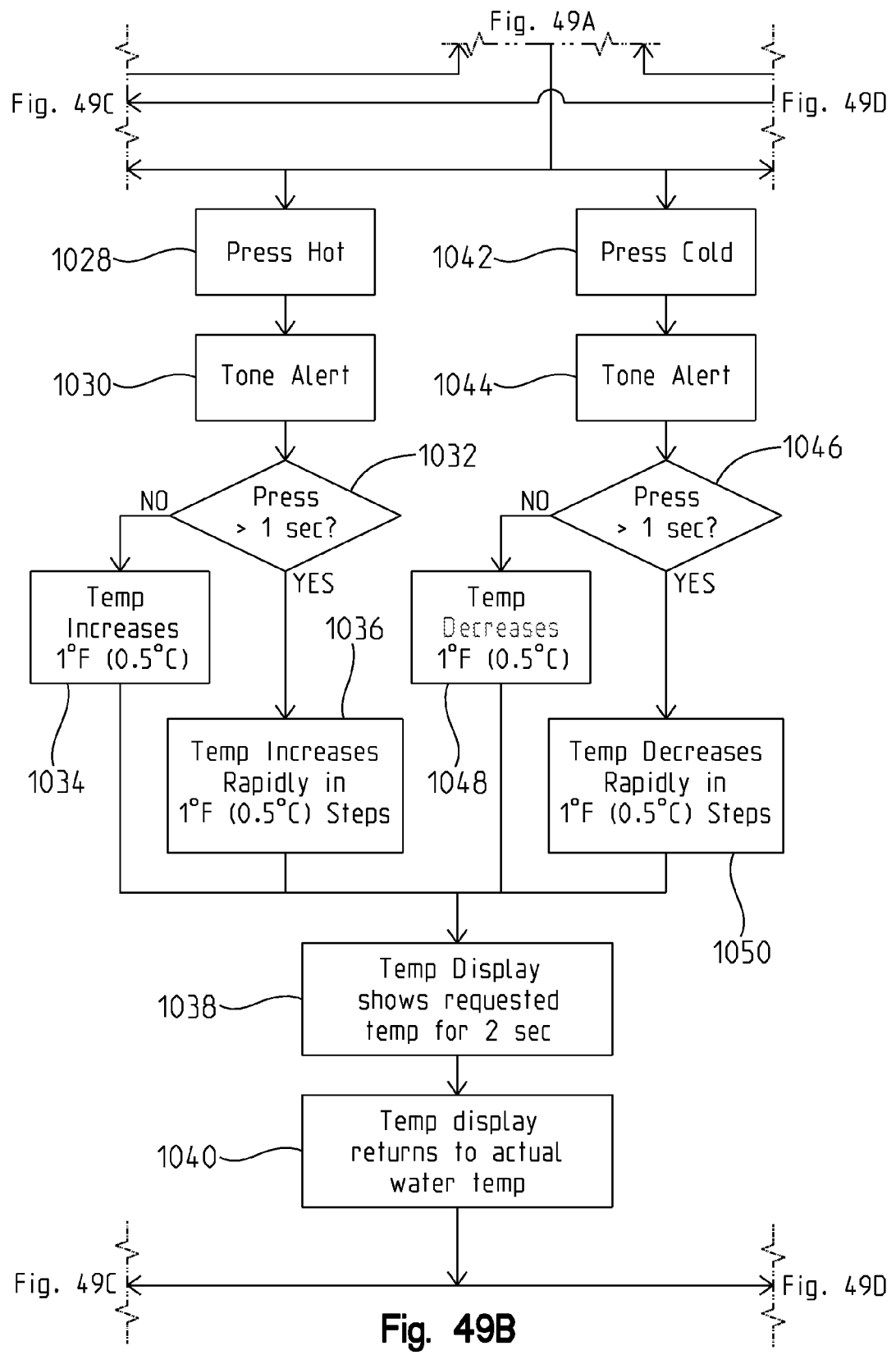
Figure 49C:
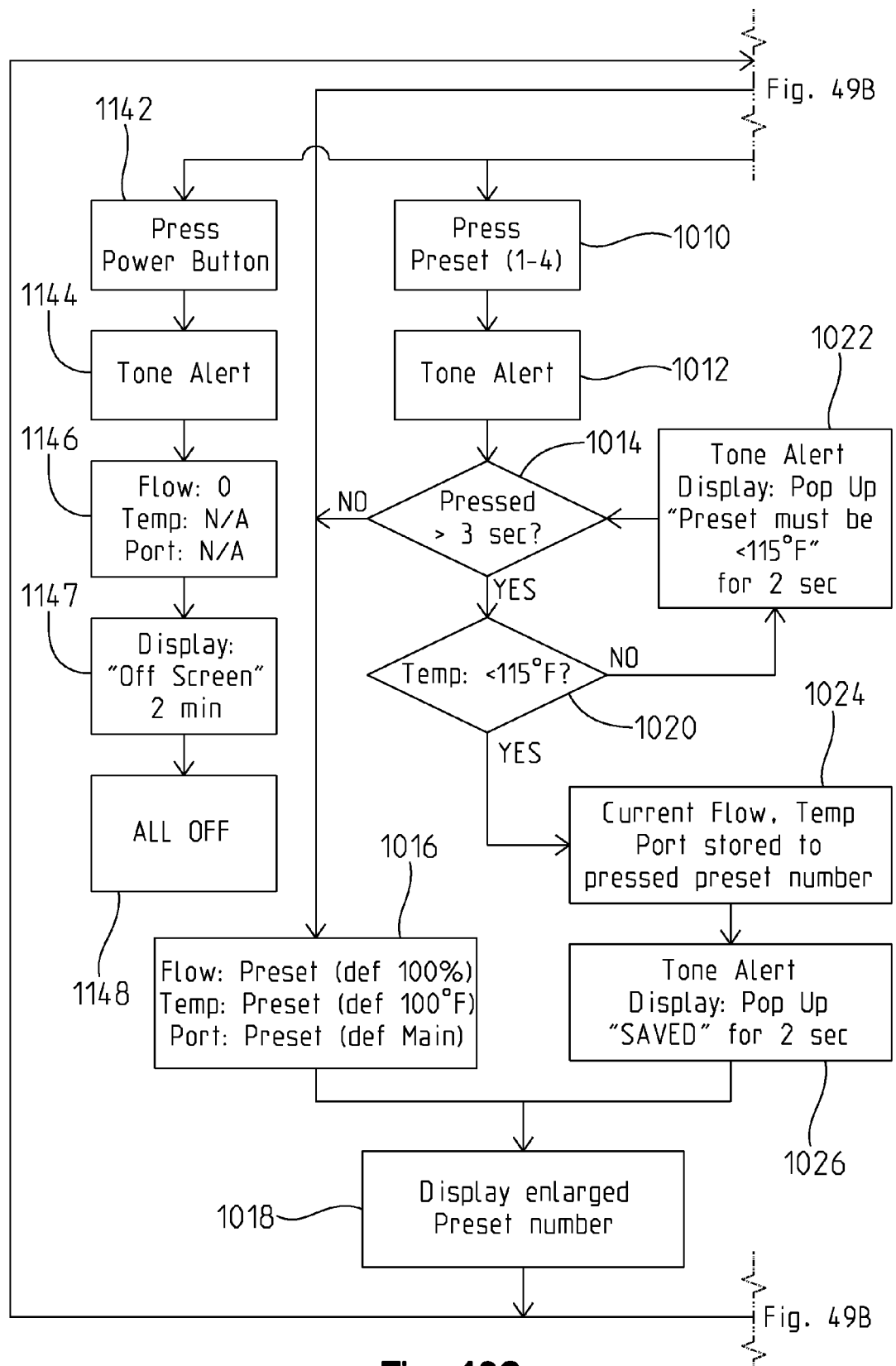

With reference now to FIGS. 49B and 49C, the method illustratively continues at block 1010 should a user press one of the presets 702a-702d on the touch screen 399. Upon depressing one of the presets 702a-702d, a tone alert is produced through the speaker 381 by the controller 44 at block 1012. At decision block 1014, the controller 44 queries whether the selected preset 702a-702d has been depressed for more than a predetermined time (e.g., three seconds). If not, then the method continues to block 1016, where the predefined flow rate, water temperature, and outlet port of the selected preset 702a-702d is set by the controller 44. If not previously stored by the user to a preset 702a-702d, the default values of 100 percent flow rate, a 100° F. water temperature, and active outlet of main port 34 are selected by the controller 44. At block 1018, the selected preset 702a-702d is identified on the display screen 399. In one illustrative embodiment, the number of the selected preset 702a-702d is enlarged for easy visual identification by the user. In other embodiments, the number of the preset 702a-702d may change color, or provide some other visual indication of selection to the user.

Returning to block 1014 of FIG. 49C, should the preset 702a-702d be pressed for more than the predetermined time (e.g., three seconds), the process continues to block 1020, where the controller 44 queries whether the temperature measured by the temperature sensor 46 is less than 115° F. If the measured temperature is not less than 115° F., then the process continues to block 1022 where a tone alert is provided by the speaker 381 and the touch screen 399 provides a pop-up image indicating that the temperature for the preset 702 must be less than 115° F. This pop-up display is illustratively shown for a predetermined time, such as two seconds. This prevents the user from defining a preset temperature of greater than 115° F. The process then returns to decision block 1014.

If the measured temperature at decision block 1020 is less than 115° F., the method continues at block 1024 where the controller stores to memory the current flow rate, temperature, and outlet port to the selected preset 702a-702d on the display. At block 1026, a tone alert is provided by the speaker 381 and the display 399 provides a pop-up image indicating that the current flow, temperature and port conditions have been saved to the desired preset number 702a-702d. This pop-up is illustratively shown on screen 399 for a predetermined defined time (e.g., two seconds).

Returning to FIGS. 49A and 49B, at the ON mode screen display (FIG. 53 or 54), should the user press a hot or temperature increase button 704a on the touch screen 399 at block 1028, then a tone alert is provided by the speaker 381 at 1030. At decision block 1032, if the hot button 704a is pressed for a predetermined time (e.g., one second) or less, the mixing valve 20 causes the outlet water temperature to increase one degree Fahrenheit at block 1034. If the user presses the hot button 704a for greater than the predetermined time (e.g., one second), then the mixing valve 20 causes the outlet water temperature increases rapidly in one degree increments or steps at block 1036. At block 1038, a temperature display 706 on touch screen 399 shows the requested temperature for a predetermined time, illustratively two seconds. At block 1030, the temperature display 706 returns to showing the actual water temperature measured by the temperature sensor 46.

Figure 49D:
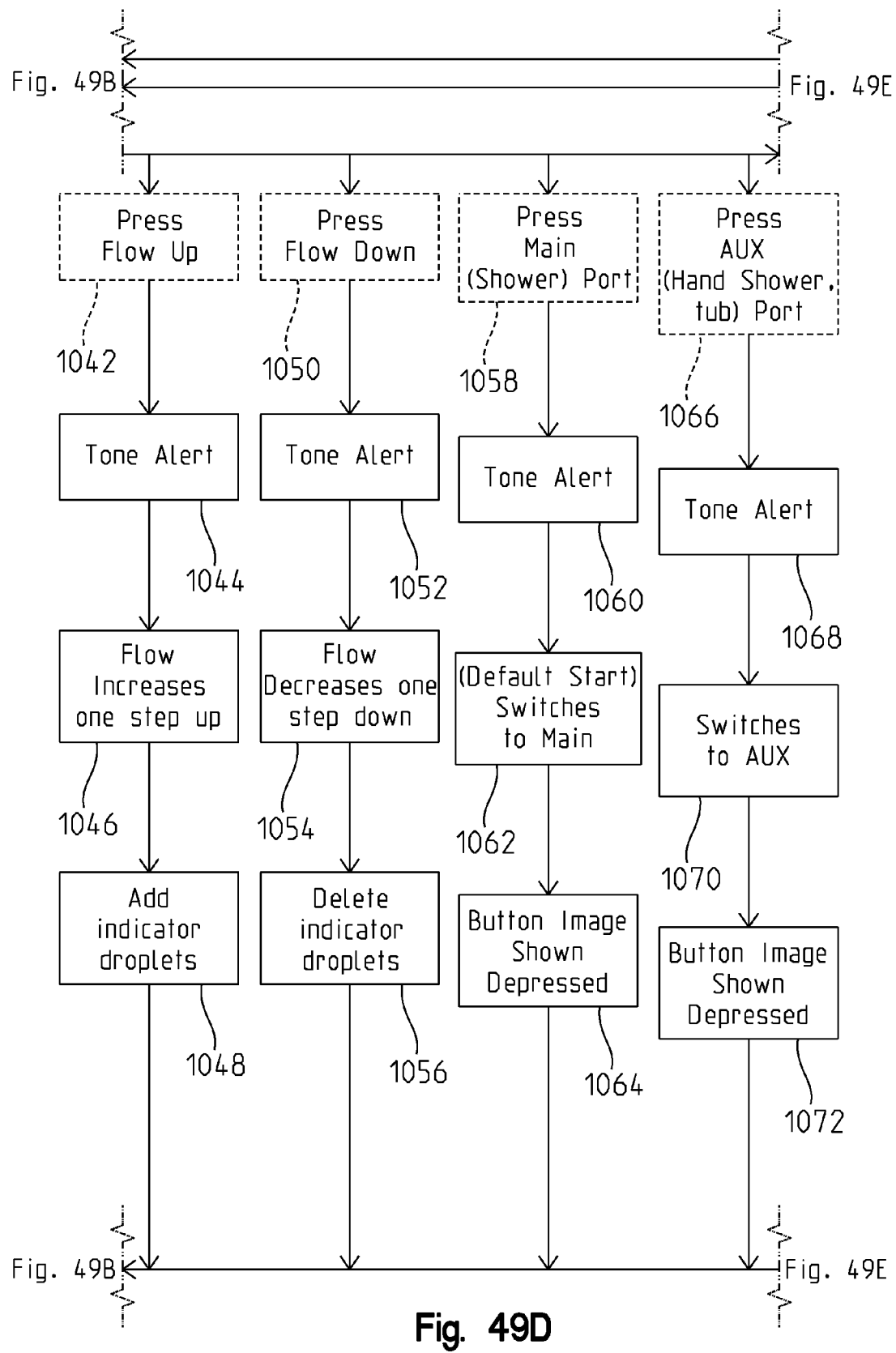
Figure 49E:
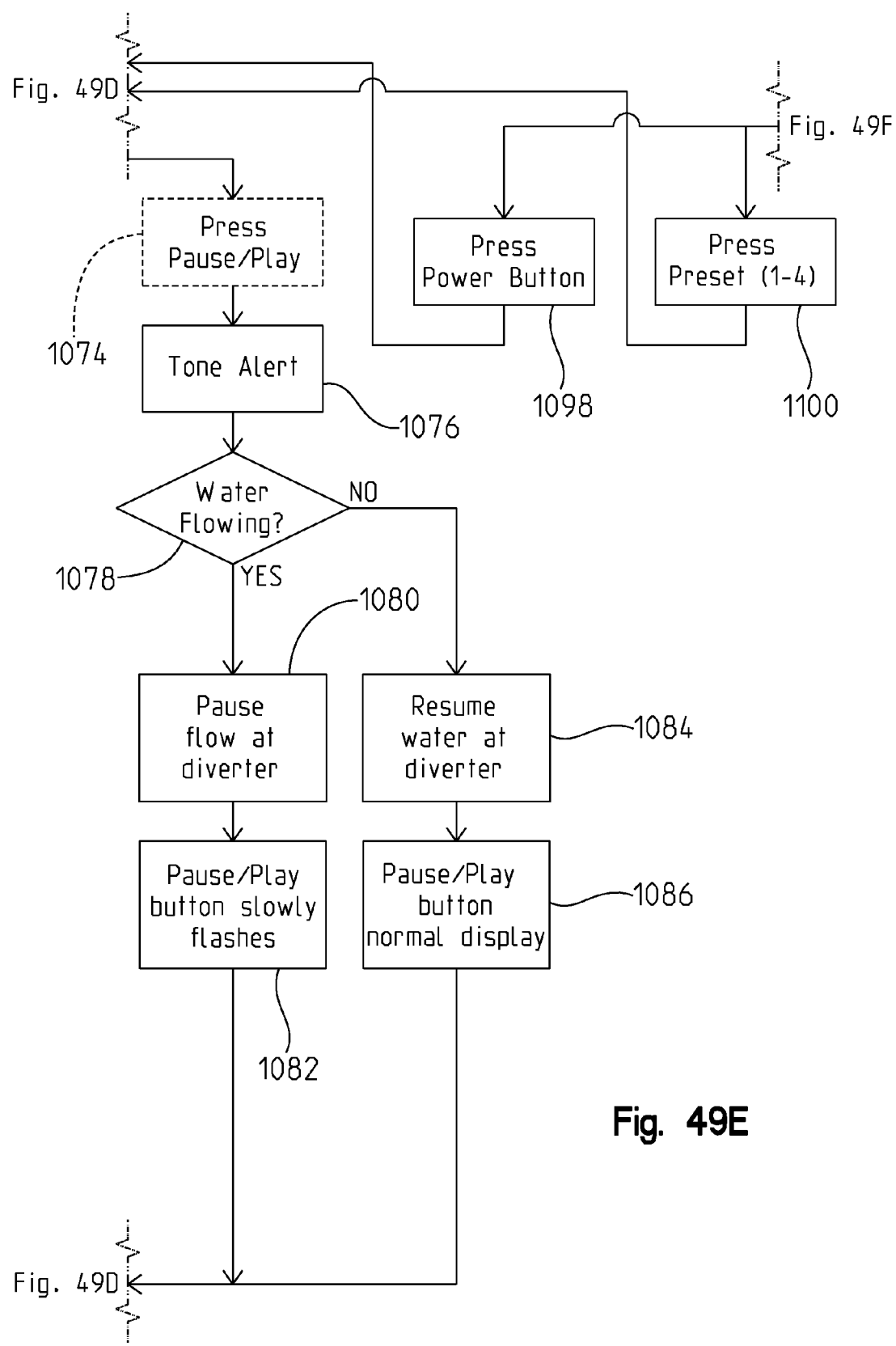

Returning to block 1042 of FIG. 49D, should the user press a cold or temperature decrease button 704b at the ON mode screen display (FIG. 53 or 54), then a tone alert is provided by the speaker 381 at block 1044. At decision block 1046, if the user presses the cold button 704b for a predetermined time (e.g., one second) or less, then the mixing valve 20 causes the outlet water temperature to increase one degree Fahrenheit at block 1048. If the user presses the cold button 704b for more than the predetermined time (e.g., one second), then the mixing valve 20 causes the outlet water temperature to decrease rapidly in one degree Fahrenheit steps at block 1050. The process then continues at block 1038, where the temperature display 706 shows the requested temperature for a predetermined time (e.g., two seconds). Thereafter, the temperature display 706 returns to the showing the actual water temperature measured by the temperature sensor 46.

With reference to FIGS. 49A and 49D, returning to the ON mode screen display of FIG. 54 at block 1008, should the user press a flow up or increase button 708a at block 1042, a tone alert is provided by the speaker 381 at block 1044. As detailed above, in the illustrative embodiment electronic shower system 10 with no diverter valve 32 as represented by FIG. 53, no flow rate control is provided independent from the mixing valve 20. Continuing at block 1046, the diverter valve 32 increases the flow rate one step upwardly. As detailed above in the illustrative embodiment, three flow rates are provided by the diverter valve 32 (e.g., low, medium, high). As such, the flow rate may increase from low to medium, or from medium to high. At block 1048, an indication of the selected flow rate is provided at a flow display 710 of the touch screen 399. In the illustrative embodiment, indicator droplets may be added to the flow display 710 to provide the user with an indication of the current flow rate. For example, one droplet may indicate a low flow rate, two droplets may indicate a medium flow rate, and three droplets may indicate a high flow rate.

By pressing a flow down or decrease button 708b at block 1050, a tone alert is provided by speaker 381 at block 1052. The diverter valve 32 causes the flow rate to decrease by one step downwardly at block 1054. More particularly, the flow rate may decrease from high to medium, or from medium to low. At block 1056 indicator droplets may be deleted from the display, again to provide feedback to the user.

Returning again to the ON mode screen display of FIG. 53 or 54 at block 1008, should the user press a main (shower) port button 712 on the user interface at block 1058, a tone alert is provided by the speaker 381 at block 1060. At block 1062, the diverter valve 32 provides water flow to the main port or first fluid outlet 34 at block 1062. The image of the button 712 on the touch screen 399 may be shown as depressed at block 1064. At block 1066, should an auxiliary port button 714 be pressed, then a tone alert is provided by speaker 381 at block 1068. At block 1070, the diverter valve 32 provides flow to the auxiliary port or second fluid outlet 36. The auxiliary port button 714 is shown depressed on the touch screen 399 at block 1072. In certain illustrative embodiments, depressing successively depressing port buttons 712 and 714 will cause the diverter valve 32 to toggle between ports or outlets 34 and 36. In other illustrative embodiments, depressing port buttons 712 and 714 may cause the diverter valve 32 to provide for concurrently flow through ports or outlets 34 and 36. The process then returns to block 1008.

Returning to the ON mode screen display of FIG. 54 at block 1074, if a pause/play button 716 is depressed a tone alert is provided by the speaker 381 at block 1076. As detailed above, in the illustrative embodiment electronic shower system 10 with no diverter valve 32 as represented by FIG. 53, no flow rate control (including pause/play functionality) is provided independent from the mixing valve 20. The process continues to decision block 1078, where the controller 44 determines whether water is flowing. If water is flowing, then at block 1080, the flow is paused by the diverter valve 32. At block 1082, the pause/play button 716 on the touch screen 399 provides an indication that water is paused, illustratively by flashing. If at block 1078, it is determined that water is not flowing, then water flow is resumed by the diverter valve 32 at block 1084. The pause/play button 716 on the touch screen 399 is then returned to a normal display at block 1086.

With reference now to FIG. 49F, the main user interface 14 may be activated by user contact with the touch screen 399 at block 1090. At block 1092, the touch screen 399 shows the splash display for a predetermined time period, illustratively for two seconds. At block 1096, the initial settings are provided with a flow rate of 100 percent, a water temperature of 100° F., and the main port. At block 1096, the OFF mode screen of FIG. 52 is displayed. If a power or start button 719 is subsequently pressed at block 1098 (FIG. 49A), the process continues to block 1008 where operation may proceed as detailed above. Alternatively, at block 1100, if any of the presets 708a-708d are depressed, the process proceeds to block 1016 (FIG. 49C) where operation may continue as detailed above.

Figure 49G:
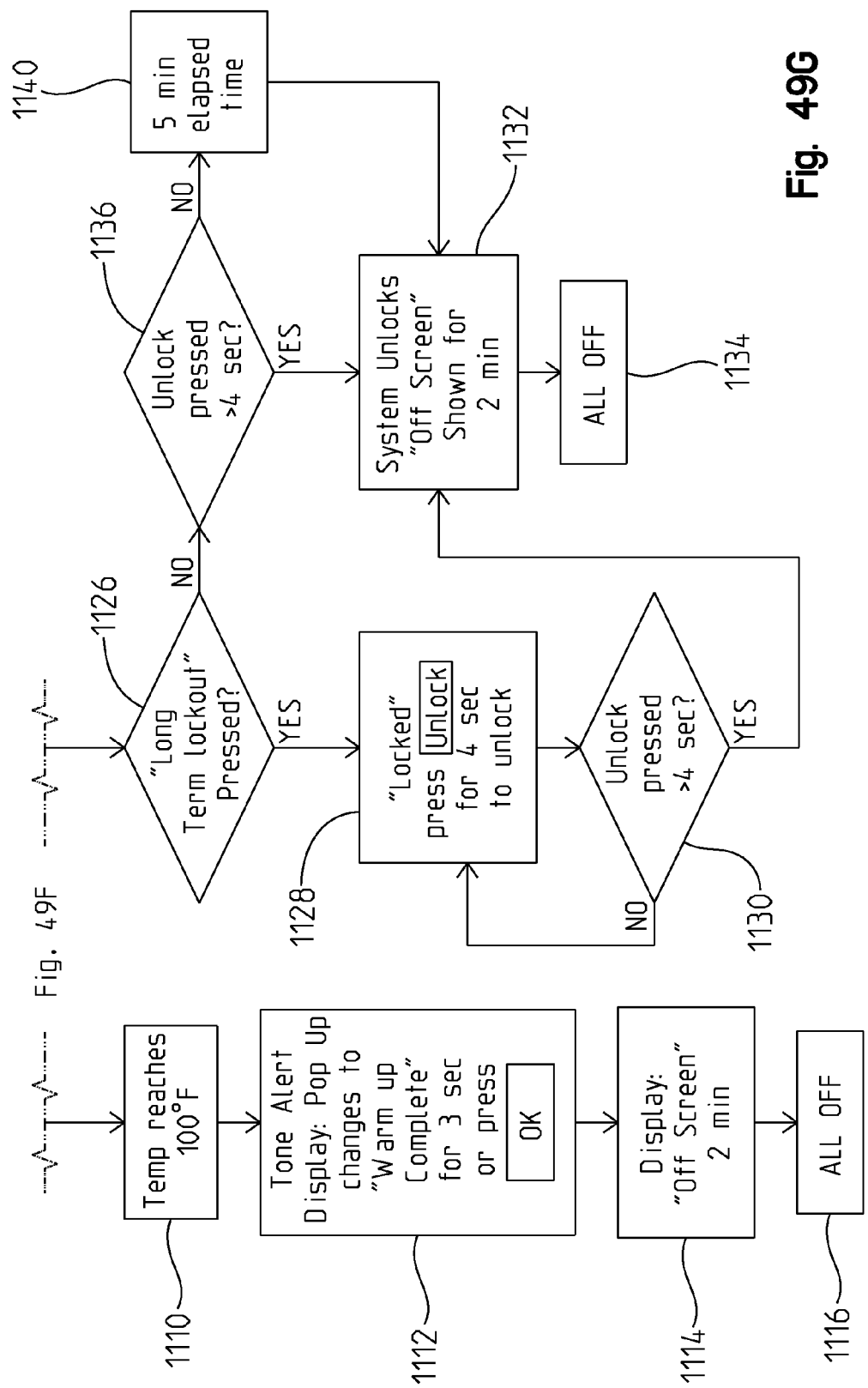

Returning to block 1096 of FIG. 49F, if at block 1102 a warm up button 718 on the OFF mode display (FIG. 52) is depressed, a tone alert is provided by the speaker 381 at block 1104. At block 1106, the ON mode screen is displayed and the controller 44 provides the default conditions of flow rate of 100 percent, a temperature of 100° F., and activation of the main port 34. At block 1108, a pop-up is provided on the display providing an indication of the "warming up" function and the temperature measured by the temperature sensor 46. The process then continues to block 1110 as shown in FIG. 49G, where when the temperature reaches 115° F., a tone alert is provided by the speaker 381 at block 1112. Also at block 1112, a pop-up display is provided that indicates to the user that the warm up is complete. This pop-up display may be shown for a predetermined time period (e.g., three seconds) or may be removed by the user pressing an OK button the display screen 399. At block 1114, the OFF mode screen is displayed for a predetermined time period, illustratively two minutes. After two minutes, the process continues to block 1116, where the system 10 is deactivated.

Returning to the OFF mode screen (FIG. 52) at block 1096 of FIG. 49F, if a lock button 720 is depressed at block 1120, then a tone alert is provided by speaker at block 1122. The screen 399 shows a locked screen indication with a five minute countdown. At this point, the user may depress a long term lock button or an unlock button on the screen 399. By depressing the long term lock, the system 10 will be locked for an extended time period. By depressing the unlock button, the system 10 will be immediately unlocked. More particularly, if the long term lock-out is pressed at decision block 1126, then at block 1128 the screen 399 will indicate that the system 10 is locked and that the unlock button will need to be depressed for four seconds in order to unlock the system 10. If the unlock button is pressed for more than four seconds at block 1130, the system 10 returns to block 1128. If the unlock button is depressed for greater than four seconds, the system 10 continues to block 1132 where the controller 44 unlocks and the OFF mode screen is shown for two minutes. After two minutes, the system 10 is deactivated at block 1134.

Returning to decision block 1126 of FIG. 49G, if the long term lock out is not pressed, then at decision block 1136 the controller 44 determines whether the unlock has been pressed for more than four seconds. If yes, then the controller 44 unlocks the screen 399 and the OFF mode display is shown for two minutes. If not, then the controller 44 proceeds to block 1140 where a five minute elapsed time begins. After five minutes at block 1140, the controller 44 unlocks and the OFF mode display is shown for two minutes at block 1132. Again, after two minutes, the system 10 is deactivated at block 1134.

Returning to FIG. 49C, at block 1142, if the power button 403 is pressed, a tone alert is provided by the speaker 381 at block 1144. At block 1146, the flow is reduced to zero by the diverter valve 32. At block 1147, the OFF mode display is shown for two minutes. At block 1148, the system 10 is deactivated after two minutes.

Figure 49H:
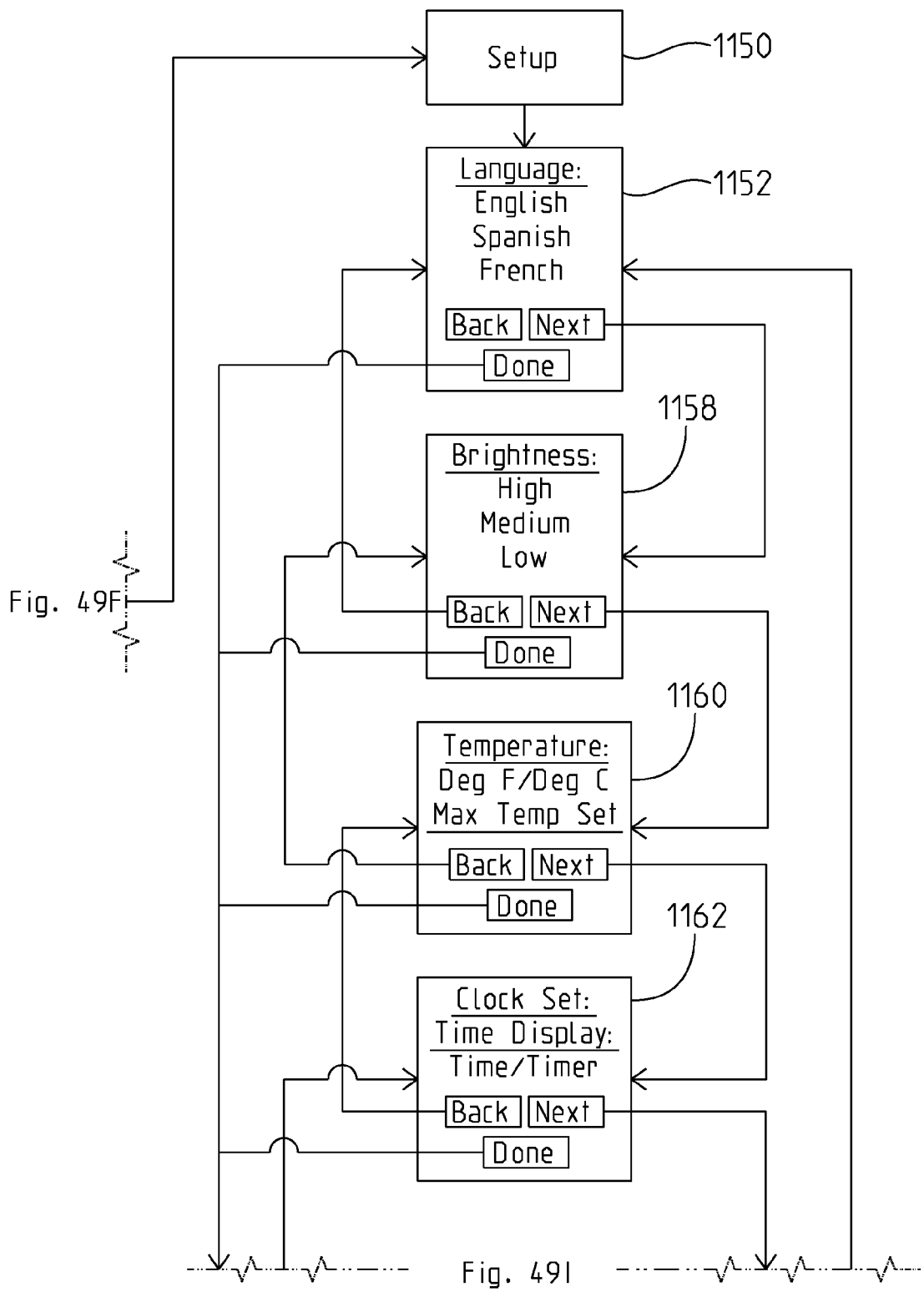
Figure 49I:
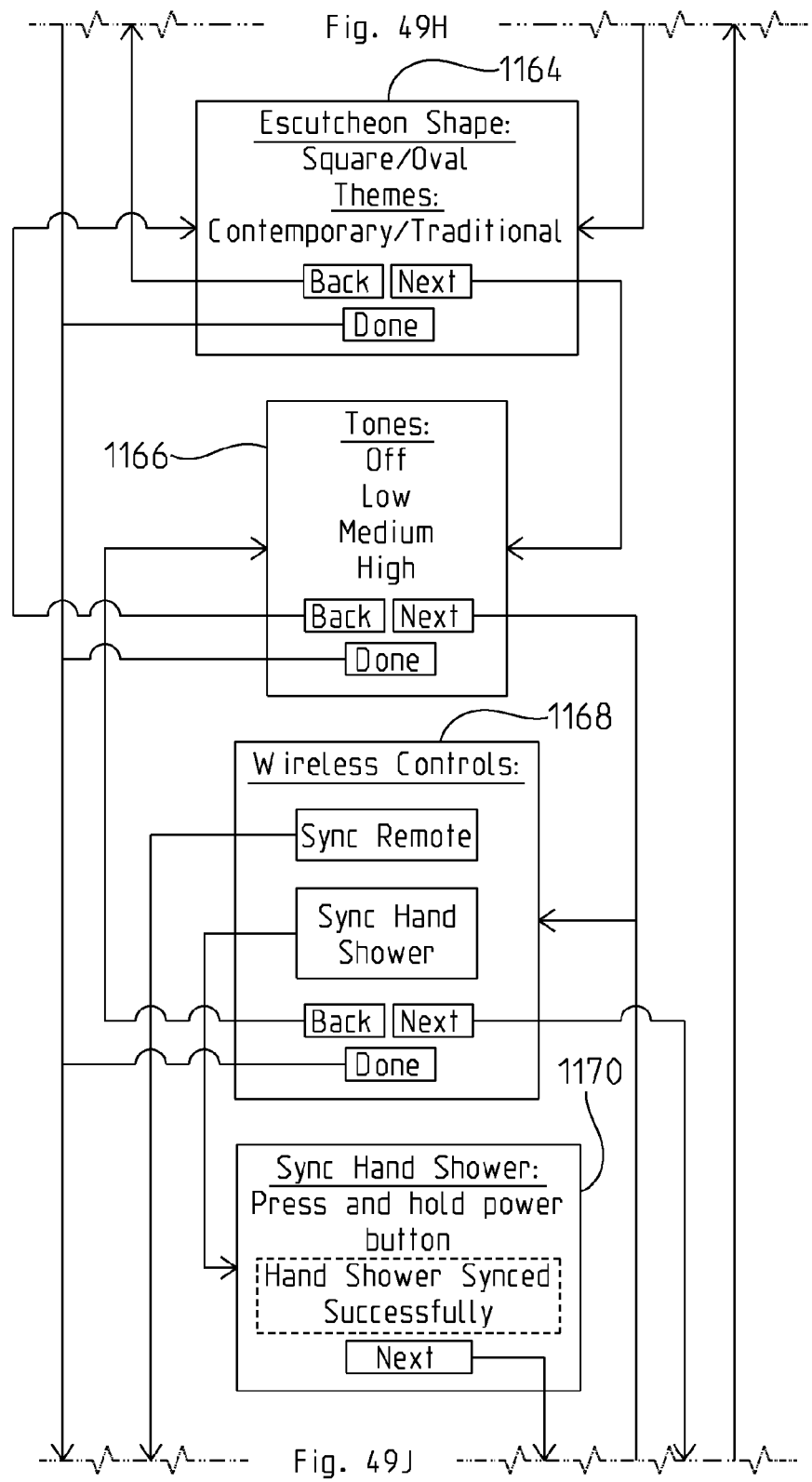
Figure 49J:
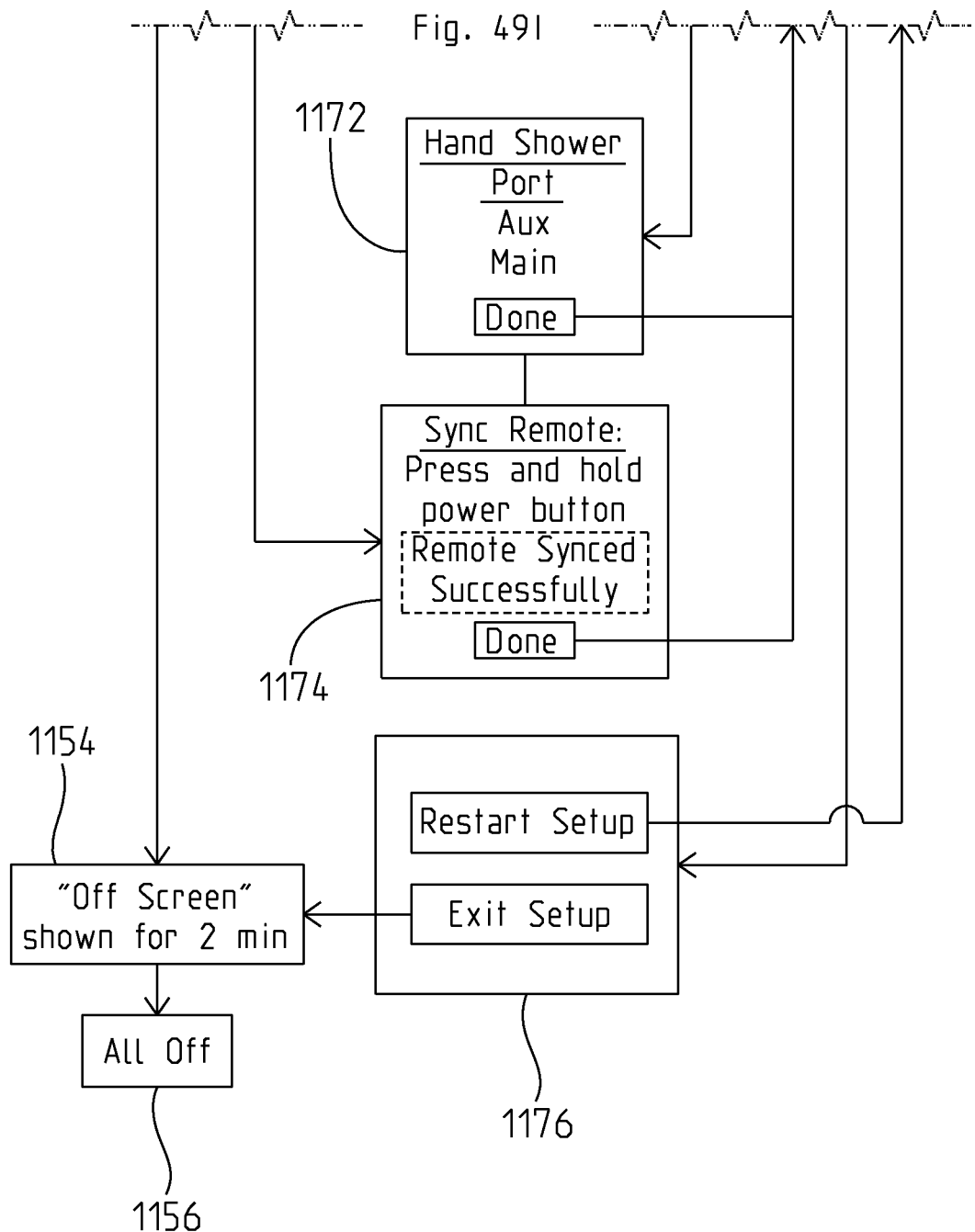

With reference to FIG. 49H, by depressing a set up button 722 on the OFF mode display at block 1150, the controller 44 enters a set up subroutine. At block 1152, language may be selected by scrolling through a menu display on screen 399. Input blocks such as Back, Next, and Done may be pressed by the user. Depressing the Back button will return to the OFF mode display, depressing the Done button will cause the controller to display the OFF mode display for a predetermined time period, illustratively two minutes, at block 1154 (FIG. 49J). At block 1156, the system 10 turns off or deactivates. Depressing the Next button causes the set up subroutine to continue at block 1158.

At block 1158, brightness of the touch screen 399 may be set between high, medium and low. Again, user inputs of Back, Next and Done may be input by the user by touching the screen 399. By depressing the Next button, the set up subroutine continues at block 1160, where temperature settings may be controlled.

At block 1162 clock criteria may be set. Again, user inputs of Back, Next and Done may be input by the user by touching the screen 399. At block 1164, criteria of the user interface touch screen 399 may be determined. More particularly, the escutcheon shape and themes may be set. For example, the escutcheon shape may be determined either square or oval, while the theme may be contemporary or traditional.

At block 1166, audible tone volume for speaker 381 may be set from off, low, medium or high. At block 1168, wireless interface controls may be set. More particularly, the remote user interface 58 and/or the hand shower user interface 64 may be synched with the main user interface 14. When synching the remote user interface 58, the process continues to block 1174. When synching the hand shower user interface 64, the process continues to block 1170.

Upon completing the wireless control synchronization at block 1158 and depressing the Next button, block 1176 provides for input to either restart set up or exit set up. Upon exiting set up, the process proceeds to block 1154 where the OFF mode display is shown for a predetermined time, illustratively two minutes. The system 10 then deactivates at block 1156.

With reference now to FIGS. 50A-50D, an illustrative operation of the hand shower user interface 64 is shown. The method illustratively begins by the user pressing the power button 352a at block 1202, or one of the preset buttons A and B 352b and 352c at block 1204. At block 1206, the controller 44 queries whether the system 10 is on. If the system 10 is on, then the process continues to decision block 1208 where the controller 44 queries whether the power button 352a was initially pressed. If the power button 352a was initially pressed, then the process continues to block 1210 where the flow rate is set to zero. At block 1212, the controller 44 displays on the main user interface screen 399 the OFF mode screen (FIG. 52) for a predetermined time, illustratively two minutes. After a two minute time period, the system 10 deactivates at block 1214. Returning to decision block 1208, if the power button 352a was not initially pressed, the process continues to decision block 1216 where the controller 44 queries whether the auxiliary or hand shower port 36 is active. If yes, then the process continues to decision block 1218 where the controller 44 determines whether the selected preset button 352b or 352c has been pressed for more than three seconds. If yes, the process continues to block 1220, where the controller 44 queries whether the temperature is less than 115° F. If no, the process continues to block 1222 where a tone alert is provided by the speaker 381 and the display 399 provides a pop-up indicating the preset must be less than 115° F. This pop-up is displayed for a predetermined period, illustratively two seconds. The process then returns to decision block 1218.

Returning to decision block 1220, if the temperature is less than 115° F., the process continues to block 1224 where the current flow rate, temperature and port are stored to the pressed preset button 352b or 352c. At block 1226, a tone alert is provided by the speaker 381 and a pop-up is displayed on screen 399 indicating that one of the selected presets 352b and 352c has been saved. This pop-up is shown for a predetermined period, illustratively two seconds. The process then continues to block 1228 where the ON screen is displayed and the controller 44 operates the drive assembly 18 with the preset settings.

Returning to decision block 1206 of FIG. 50A, if the controller 44 determines that the system 10 is not on, then the controller 44 displays the splash screen for a predetermined time period, illustratively two seconds at block 1230. Continuing at block 1232, the controller determines whether the power button 352a was initially pressed. If yes, then the process continues to block 1228 where the ON mode screen is displayed on the screen 399 and the controller 44 operates the drive assembly 18 with the initial settings of a 100 percent flow rate, a 100° Fahrenheit temperature, and auxiliary or hand shower port 36.

At block 1246, if the user depresses the cold button 352e, then the process continues to block 1248 where the controller 44 queries whether the button has been pressed for more than one second. If no, then at block 1250, the temperature increases one degree Fahrenheit. If yes, then the temperature increases rapidly in one degree increments or steps at block 1252. The system then continues to block 1242 where the temperature display shows a requested temperature for a predetermined time period, illustratively two seconds. At block 1244, the temperature display returns to the actual water temperature from the temperature sensor. The system then returns to block 1228 where the ON screen is displayed.

Figure 50B:
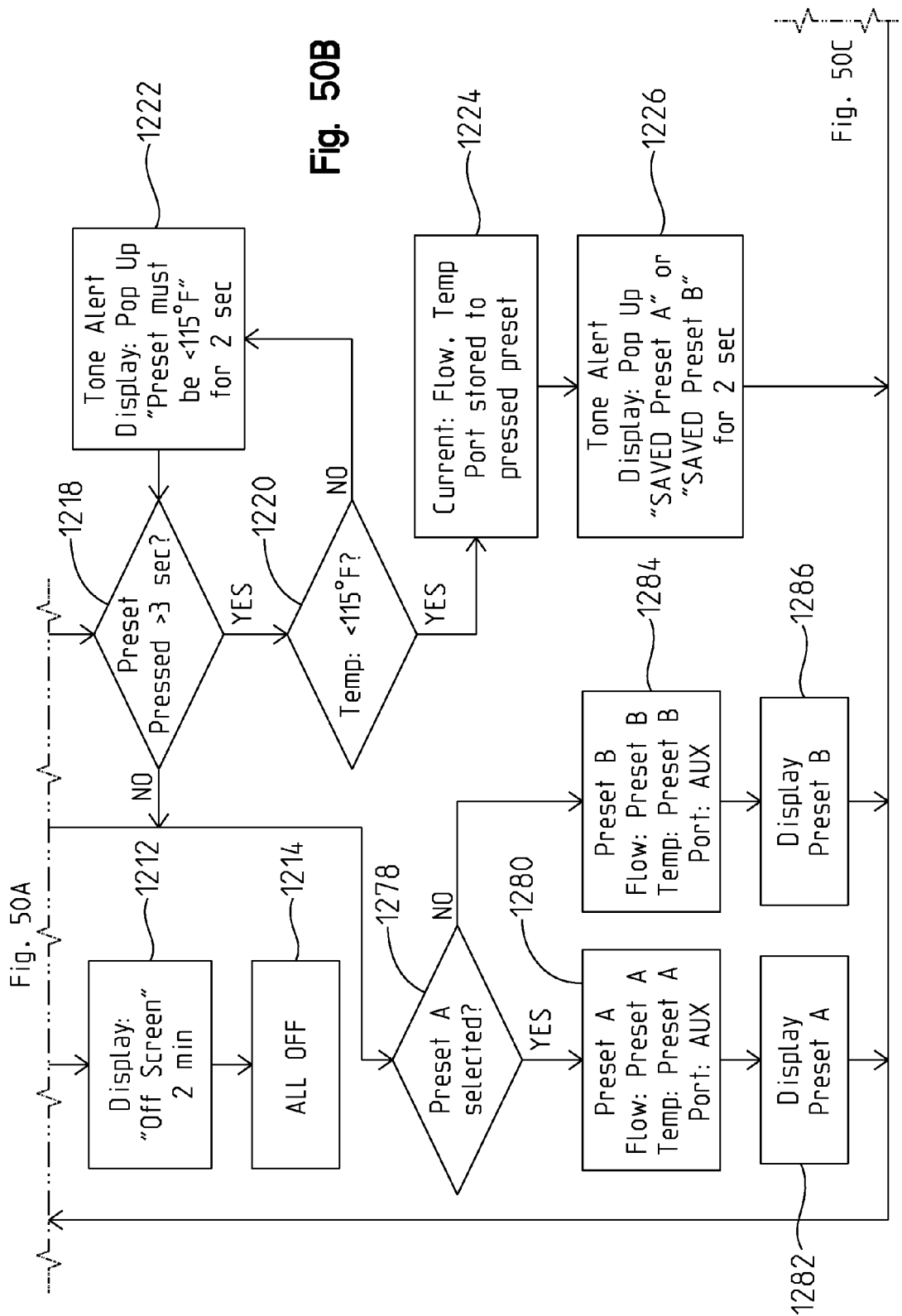
Figure 50C:
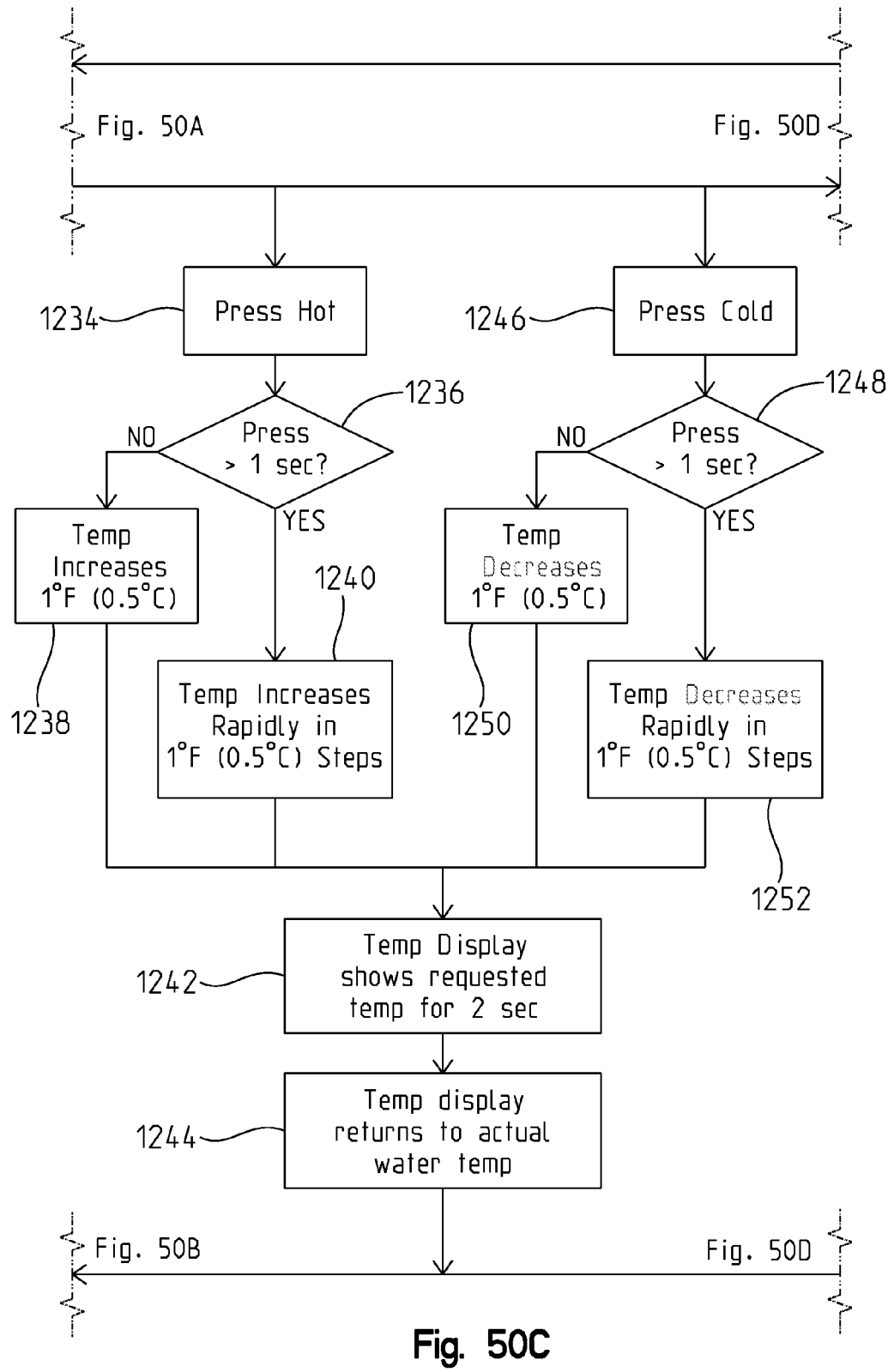

Turning now to FIG. 50C, if the user presses the hot button 352d on the hand shower user interface 64 at block 1234, then the controller 44 queries at decision block 1236 whether the hot button 352d has been pressed for more than one second. If no, then the controller 44 causes mixing valve 20 to increase temperature one degree Fahrenheit at block 1238. If yes, then the temperature increases rapidly in one degree increments or steps. At block 1242, the temperature display 706 on screen 399 shows the requested temperature for a predetermined time period illustratively two seconds. At block 1244, the temperature display 706 returns to displaying the actual water temperature from the temperature sensor 46. The process then returns to block 1228 where the ON mode screen is displayed on the screen 399.

Referring now to FIG. 50D, at block 1254, if the user presses the pause/play button 352f, the controller 44 at block 1256 determines whether water is flowing. If no, then the controller 44 determines whether the diverter valve 32 is present. If no diverter valve 32 is present the diverter cable is shorted to the PCB board. At block 1260, the flow rate is provided at 100 percent, and at block 1262, the pop-up display of "hand shower pause" is removed from the main user interface screen 399. Returning to block 1258, if the diverter valve 32 is present, then at block 1264, water flow is resumed at the diverter valve 32. At block 1266, the pause/play display on the screen 399 changes, the system then returns to block 1228, and the ON mode screen is displayed. Returning to decision block 1256, if water is flowing, the process continues to decision block 1268, where the controller 44 determines whether the diverter valve 32 is present. If the diverter valve 32 is not present, then the flow is set at zero and such information is stored until the system 10 is turned off or the pause/play button 352f is pressed. At block 1272, a pop-up display on the screen 399 provides an indication to the user that the hand shower 52 is paused and to either press the play/pause button 352f on the hand shower or OK on the main user interface screen 399 to resume water flow. The process then continues to block 1228 where the ON mode screen is displayed on screen 399.

Returning to decision block 1268, if the diverter valve 32 is present, the controller 44 continues to block 1274 where water flow is paused at the diverter valve 32. At block 1276, the pause/play display changes on the main user interface display screen 399. The process then returns to block 1228 where the ON mode screen is displayed on the screen 399.

Figure 51A:
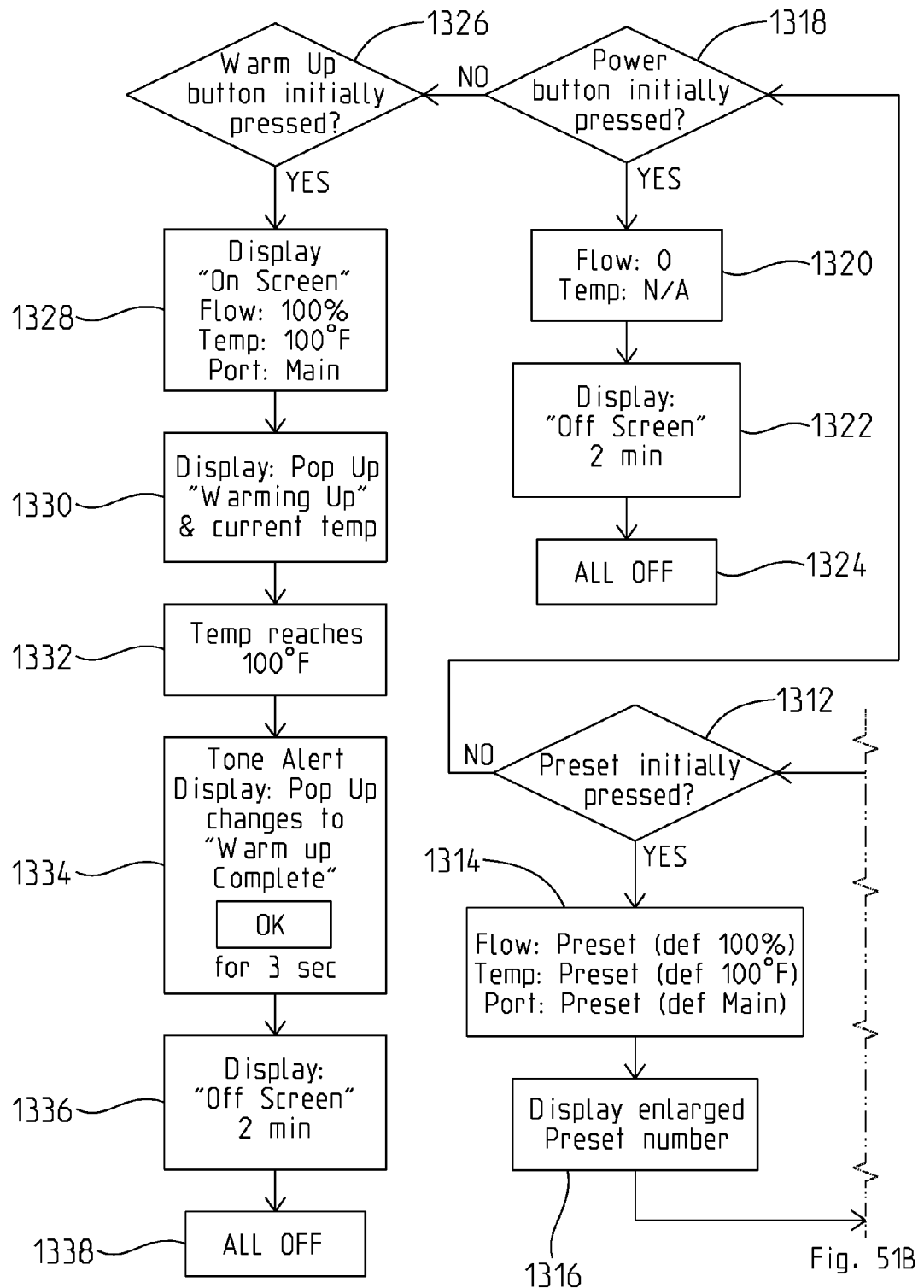
FIGS. 51A-51C are flow charts showing an illustrative method of operation of the remote user interface.
Figure 51B:
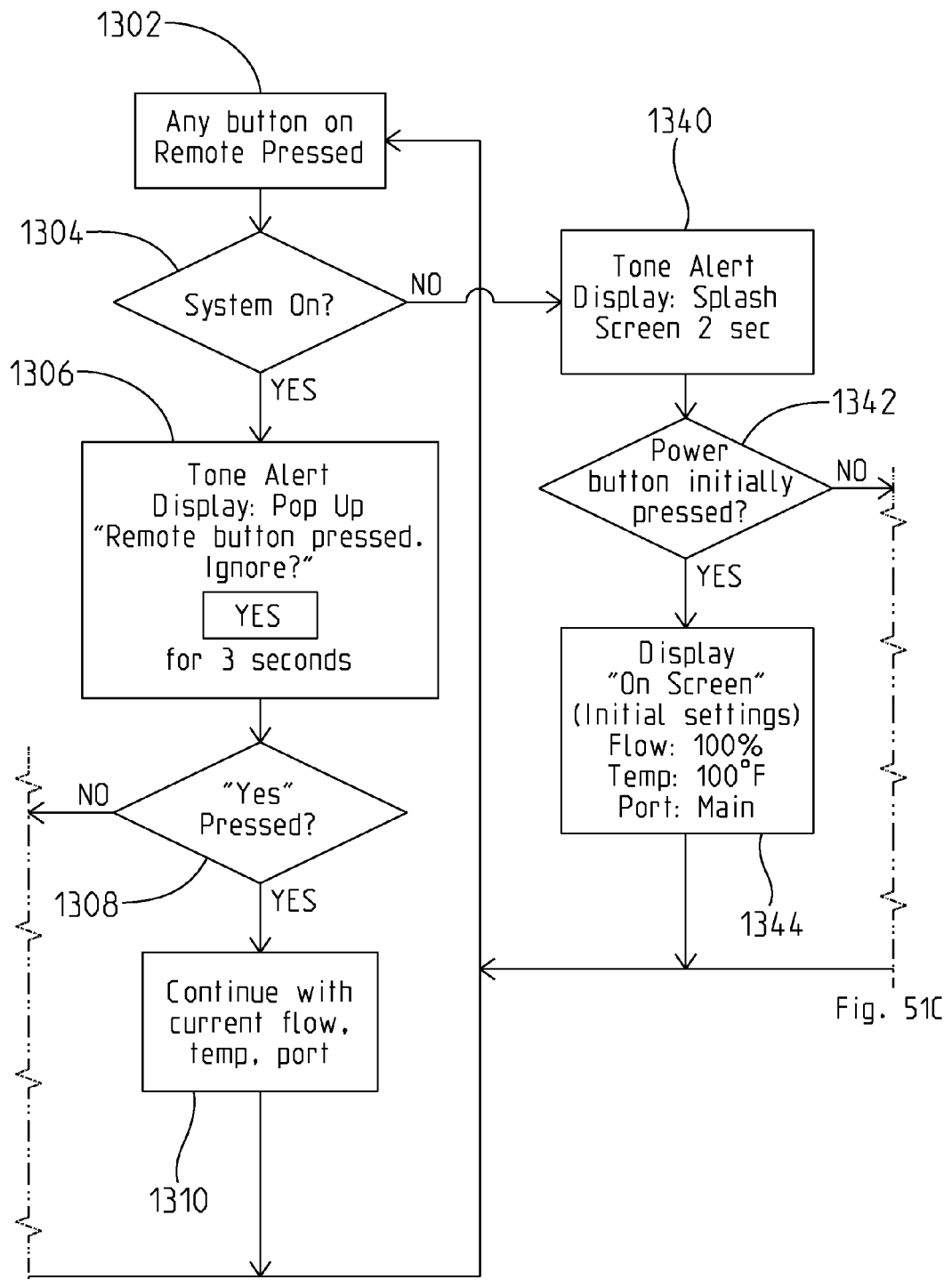
Figure 51C:
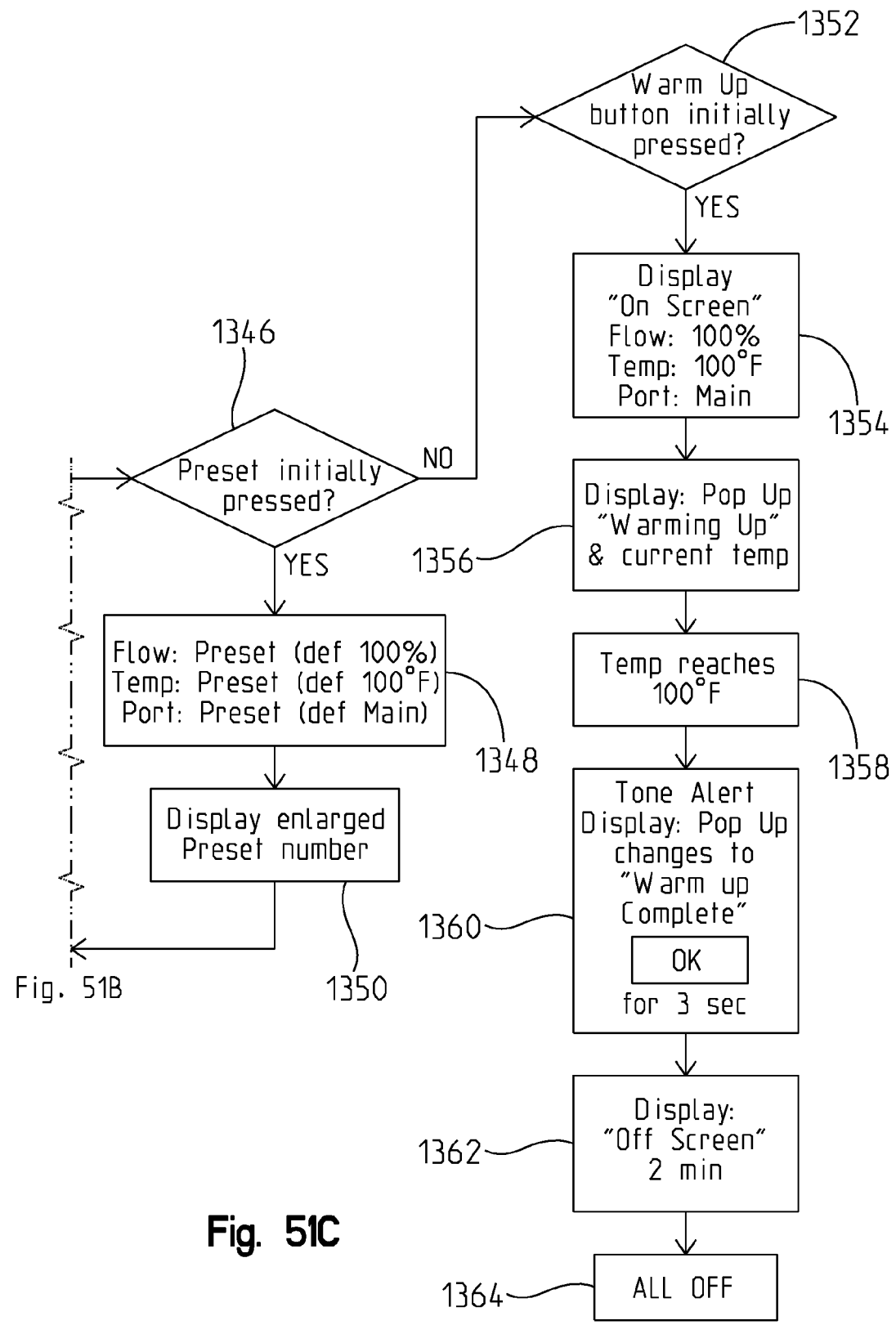

Referring now to FIGS. 51A-51C, an illustrative method of operation of the remote user interface 58 is shown. Beginning with block 1302 of FIG. 52B, if any button 382 on the remote 158 is pressed, the system proceeds to decision block 1304. At decision block 1304, the controller 44 queries whether the system 10 is on or active. If yes, then the controller 44 causes speaker 381 to generate a tone alert and a pop-up on the display screen 399 indicating that the remote button 382 has been pressed and inquiring whether the user wishes to ignore the remote activation. If yes is depressed on the touch screen 399 at block 1308, the process continues to block 1310. At block 1310, the current temperature, flow rate and port continue. If no, then the process continues to block 1312, where the controller 44 determines whether one of the preset buttons 382b-382e was initially pressed. If yes, then at block 1314, the selected preset button flow rate temperature and port is activated. Again the default preset flow is 100 percent, temperature is 100° F., and port is main 34. At block 1316, an indicator of the selected preset is provided on the display screen 399, illustratively an enlarged number. The process then returns to block 1302.

Returning to decision block 1312, if one of the preset buttons 382b-382e was not initially pressed, then the process proceeds to decision block 1318. At block 1318, the controller decides whether the power button 382a was initially pressed. If yes, then at block 1320, since the system 10 is determined to be ON at block 1304, the flow rate is reduced to zero. At block 1322, the controller 44 displays the OFF mode screen for a predetermined time period, illustratively two minutes. The process then continues to block 1324 where the system 10 is deactivated.

Returning to decision block 1318, if the power button 382a was not initially pressed, then the process continues to decision block 1326. At block 1326, the controller 44 determines whether the warm up button 382f was initially pressed. If yes, then the controller 44 displays the ON mode screen at block 1328. At block 1328, the flow rate is set at 100 percent, temperature at 100° F., and the main port 34 activated. At block 1330, the controller 44 provides a pop-up on the display on screen 399 indicating that the system is "warming up" and displaying the current temperature. At block 1332, once the measured temperature reaches 100° F., then a tone alert is provided by speaker 381 at block 1334. Also at block 1334, the controller 44 provides a pop-up at the display screen 399 indicating that the "warm up is complete." This display also provides for user input through an OK button on screen 399 for a predetermined time period, illustratively three seconds. At block 1336, the OFF mode screen is displayed on screen 399 for a predetermined time period, illustratively two minutes. At block 1338, the system 10 is deactivated.

Returning to block 1304, if the system 10 is not on following the pressing of button 382 on the remote 58, the process continues to block 1340 where a tone alert is provided by speaker 381 and an introductory or splash screen is displayed on screen 399 for a predetermined time period, illustratively two seconds. At block 1342, the controller 44 queries whether the power button 382a was initially pressed. If yes, then the ON mode screen is displayed on screen 399 at block 1344, and the initial settings of 100 percent flow rate, 100° F. temperature, and main port 34 are selected by the controller 44.

Returning to decision block 1342, if the power button 382a was not initially pressed, then the process continues to block 1346 where the controller 44 queries whether one of the preset buttons 382-382e was initially pressed. If yes, then the selected preset flow, temperature and port are selected. Again the default is 100 percent flow rate, 100° F. temperature, and main port 34. At block 1350, an indicator of the selected preset is provided on the main display screen 399, illustratively by enlarging the selected preset number.

Returning to block 1346, if one of the preset buttons 382b-382e was not initially pressed, then the process continues to block 1352 where the controller determines whether the warm up button 382f was initially pressed. If yes, then at block 1354 the ON mode screen display is provided on screen 399 with the default settings of 100 percent flow rate, 100° F. temperature, and main port 34. At block 1356, the controller 44 provides a pop-up "warming up" on the display screen 399 and also shows the current temperature. At block 1358, once the temperature reaches 100° F., then the process continues to block 1360 where a tone alert is provided by speaker 381 and the display pop-up on screen 399 changes to "warm up complete." Also at block 1360, an OK input button is provided for a predetermined time period, illustratively three seconds. At block 1360, the OFF mode screen is shown on screen 399 for a predetermined time period, illustratively two minutes. At block 1364, the system 10 is deactivated.

Although the invention has been described in detail with reference to certain preferred embodiments, variations and modifications exist within the spirit and scope of the invention as described and defined in the following claims.

The invention claimed is:

1. An electronic shower system comprising:
   a rough assembly including a housing, a mixing valve body supported by the housing and including a hot water inlet, a cold water inlet and an outlet, the rough assembly received within a cavity of a shower wall and coupled behind an outer surface of the shower wall;
   a valve assembly including a mixing valve received within the mixing valve body, the mixing valve including a control valve plate and a stem operably coupled to the control valve plate, the control valve plate including a hot water control aperture and a cold water control aperture;
   a drive assembly including a mixing valve drive operably coupled to the stem of the mixing valve, wherein the drive assembly is configured to rotate the stem, thereby rotating the hot water control aperture and the cold water control aperture of the control valve plate of the mixing valve to control the proportion of water from the hot water inlet and the cold water inlet provided to the outlet of the mixing valve body;
   a pressure balancing valve fluidly coupled to the mixing valve and configured to accommodate pressure variations of water supplied to the hot water inlet and the cold water inlet, the pressure balancing valve including a first tube defining a first outlet passageway, a second tube defining a second outlet passageway, and a spool, the hot and cold water control apertures of the control valve plate being in selective alignment with the first and second outlet passageways, respectively, the spool including a first portion fluidly coupled to the hot water inlet and a second portion fluidly coupled to the cold water inlet, the spool configured to move in response to changes in differential pressure between the first portion and the second portion;
   wherein the valve assembly includes an off position in which no water flows from the hot water inlet through the hot water control aperture of the control valve plate, and no water flows from the cold water inlet through the cold water control aperture of the control valve plate;
   a main user interface including a controller in electrical communication with the drive assembly, the main user interface coupled in front of the outer surface of the shower wall and covering the cavity of the shower wall receiving the rough assembly; and
   a battery operably coupled to the controller, wherein the controller is configured to detect the loss of external power, and the battery is configured to operate the mixing valve for a predetermined time when the controller detects that the mixing valve is open and the loss of external power.

2. The electronic shower system of claim 1, further comprising:
   a diverter valve body supported by the housing and fluidly coupled to the mixing valve body;

a diverter valve received within the diverter valve body; and a diverter valve drive operably coupled to the diverter valve.

3. The electronic shower system of claim 1, wherein the valve assembly is fluidly coupled to an overhead showerhead supported by the shower wall, the rough assembly and the user interface being positioned in substantial vertical alignment below the overhead showerhead.

4. The electronic shower system of claim 1, wherein the user interface includes a mount coupled to the rough assembly in front of the outer surface of the shower wall, and a user interface module configured to receive input from the user and releasably coupled to the mount.

5. The electronic shower system of claim 4, wherein the user interface module comprises a touch screen.

6. The electronic shower system of claim 1, wherein the mixing valve drive includes a motor configured to operate the mixing valve, and a manual override including an input button for disengaging the motor from the mixing valve based upon manual input from a user.

7. The electronic shower system of claim 1, further comprising a remote user interface in wireless communication with the controller, wherein the controller provides priority to operation of the main user interface over the remote user interface.

8. The electronic shower system of claim 7, wherein operation of the remote user interface provides an override notification at the main user interface.

9. The electronic shower system of claim 1, further comprising a hand shower including a hand shower user interface in wireless communication with the controller.

10. The electronic shower system of claim 9, wherein the hand shower user interface is removably coupled to the hand shower.

11. An electronic shower user interface comprising:
a mount configured to be secured to a vertical wall;
a user interface module including a touch sensor received within a sealed enclosure;
a controller in communication with the user interface;
a coupler to releasably secure the user interface to the mount;
a mixing valve fluidly coupled to a hot water supply and a cold water supply, and a mixing valve drive operably coupled to the mixing valve for controlling the proportion of water from the hot water supply and the cold water supply provided to an outlet, wherein the user interface module is positioned in front of the vertical wall, and the mixing valve is positioned behind the vertical wall and the user interface module;
a position sensor in communication with the controller to detect the position of the control valve plate; and
a battery operably coupled to the controller, wherein the controller is configured to detect the loss of external power and the battery is configured to operate the mixing valve drive for a predetermined time when the controller detects that the mixing valve is open and the loss of external power.

12. The electronic shower system of claim 11, wherein the touch sensor comprises a resistive touch screen.

13. The electronic shower system of claim 11, further comprising a diverter valve fluidly coupled to the mixing valve, and a diverter valve drive operably coupled to the diverter valve for controlling the delivery of water from the mixing valve to at least one of the plurality of outlets, wherein the diverter valve is positioned behind the vertical wall and the user interface module.

14. The electronic shower system of claim 11, wherein the mixing valve drive includes a motor configured to operate the mixing valve, and a manual override including an input button for disengaging the motor from the mixing valve based upon manual input from a user.

15. The electronic shower system of claim 11, further comprising a remote user interface in wireless communication with the controller, wherein the controller provides priority to operation of the user interface module over the remote user interface.

16. The electronic shower system of claim 15, wherein operation of the remote user interface provides an override notification at the user interface module.

17. The electronic shower system of claim 16, wherein the hand shower user interface is removably coupled to the hand shower.

18. The electronic shower system of claim 11, further comprising a hand shower including a hand shower user interface in wireless communication with the controller.

19. An electronic shower system comprising:
a mixing valve fluidly coupled to a hot water supply and a cold water supply;
a mixing valve drive operably coupled to the mixing valve for controlling the proportion of water from the hot water supply and the cold water supply provided to an outlet;
a diverter valve fluidly coupled to the mixing valve;
a diverter valve drive operably coupled to the diverter valve for controlling the delivery of water from the mixing valve to at least one of a plurality of outlets;
a controller operably coupled to the mixing valve drive and the diverter valve drive;
a position sensor in communication with the controller to detect a position of the mixing valve; and
a battery operably coupled to the controller, wherein the controller is configured to detect the loss of external power and the battery is configured to operate the mixing valve drive for a predetermined time when the controller detects that the mixing valve is open and the loss of external power.

20. The electronic shower system of claim 19, further comprising a temperature sensor positioned downstream from the mixing valve and in communication with the controller.

21. The electronic shower system of claim 20, wherein the controller is configured to determine the lack of available hot water from the hot water supply based upon the orientation of the mixing valve and temperature sensed by the temperature sensor.

22. The electronic shower system of claim 20, wherein the controller provides a warm up function based upon input from the temperature sensor.

23. The electronic shower system of claim 19, wherein the diverter valve drive controls the flow rate of water delivered to the selected at least one outlet.

24. The electronic shower system of claim 19, further comprising a pressure balancing valve fluidly coupled to the mixing valve.

25. The electronic shower system of claim 24, wherein the pressure balancing valve includes a spool including a first portion fluidly coupled to the hot water supply and a second portion fluidly coupled to the cold water supply, the spool configured to move in response to changes in differential pressure between the first portion and the second portion.

26. The electronic shower system of claim 19, wherein the mixing valve drive includes a motor configured to operate the mixing valve, and a manual override including an input button for disengaging the motor from the mixing valve based upon manual input from a user.

27. The electronic shower system of claim 19, wherein the mixing valve and the mixing valve drive are received with a housing supported behind a shower wall, and a user interface is operably coupled to the housing and supported in front of the shower wall.

28. An electronic shower system comprising:
a mixing valve fluidly coupled to a hot water supply and a cold water supply;
a mixing valve drive operably coupled to the mixing valve for controlling the proportion of water from the hot water supply and the cold water supply provided to an outlet;
a controller in electrical communication with the mixing valve drive;
a position sensor operably coupled to the mixing valve drive for detecting a position of the mixing valve, the position sensor in electrical communication with the controller;
a temperature sensor configured to measure the temperature of water supplied by the mixing valve, the temperature sensor in electrical communication with the controller;
wherein the controller associates the sensed position of the mixing valve from the position sensor with the measured temperature of water from the temperature sensor to predict valve position for a desired outlet water temperature;
a battery operably coupled to the controller, wherein the controller is configured to detect the loss of external power and the battery is configured to operate the mixing valve drive for a predetermined time when the controller detects that the mixing valve is open and the loss of external power.

29. The electronic shower system of claim 28, wherein the mixing valve drive includes an electric motor, a drive gear operably coupled to the motor, a driven gear operably coupled to the mixing valve, and a transmission coupling the drive gear with the driven gear, the position sensor including a position gear operably coupled to the transmission.

30. The electronic shower system of claim 29, wherein the transmission includes a belt, and the position sensor includes a potentiometer operably coupled to the position gear.

31. The electronic shower system of claim 30, wherein the mixing valve drive further includes a spring biased tensioner operably coupled to the belt.

32. The electronic shower system of claim 29, wherein the driven gear and the position gear include indicators, the home position of the mixing valve being defined when the indicators are aligned and directed toward each other, the home position being the closed position of the mixing valve.

33. The electronic shower system of claim 28, further comprising:
a diverter valve fluidly coupled to the mixing valve; and
a diverter valve drive operably coupled to the diverter valve for controlling the delivery of water from the mixing valve to at least one of a plurality of outlets, the diverter valve drive in electrical communication with the controller.

34. The electronic shower system of claim 33, wherein the diverter valve directs water to a selected outlet and the flow rate of water delivered to the selected outlet.

* * * * *